US012795046B2

(12) United States Patent
Bhatawdekar et al.

(10) Patent No.: US 12,795,046 B2
(45) Date of Patent: Nov. 10, 2026

(54) DETERMINING VIDEO CALL EFFECTIVENESS SCORES FOR ACCOMPLISHING TARGET GOALS

(71) Applicant: Dropbox, Inc., San Francisco, CA (US)

(72) Inventors: Ameya Bhatawdekar, Issaquah, WA (US); Geoff Hulten, Lynnwood, WA (US); Kelsey Glatz, Redondo Beach, CA (US); Sateesh Srinivasan, Redwood City, CA (US)

(73) Assignee: Dropbox, Inc., San Francisco, CA (US)

(*) Notice: Subject to any disclaimer, the term of this patent is extended or adjusted under 35 U.S.C. 154(b) by 193 days.

(21) Appl. No.: 18/415,024

(22) Filed: Jan. 17, 2024

(65) Prior Publication Data

US 2025/0203043 A1 Jun. 19, 2025

Related U.S. Application Data

(60) Provisional application No. 63/611,612, filed on Dec. 18, 2023.

(51) Int. Cl.
*H04N 7/15* (2006.01)
*G06F 3/01* (2006.01)
(Continued)

(52) U.S. Cl.
CPC ............. *H04N 7/152* (2013.01); *G06F 3/013* (2013.01); *G06N 5/02* (2013.01); *G06V 20/41* (2022.01);
(Continued)

(58) Field of Classification Search
CPC ........ H04N 7/152; H04N 7/147; H04N 7/155; G06F 3/013; G06N 5/02; G06N 5/022;
(Continued)

(56) References Cited

U.S. PATENT DOCUMENTS 6,705,869 B2 3/2004 Schwartz
9,257,115 B2 2/2016 Waibel
(Continued)

FOREIGN PATENT DOCUMENTS

EP 3309731 A1 4/2018

OTHER PUBLICATIONS

Final Office Action from U.S. Appl. No. 18/415,011 mailed on Aug. 1, 2025, 19 pages.
(Continued)

*Primary Examiner* — Phung-Hoang J Nguyen
(74) *Attorney, Agent, or Firm* — Keller Preece PLLC

(57) ABSTRACT

The present disclosure is directed toward systems, methods, and non-transitory computer readable media for generating and providing intelligent insights for video calls and other virtual meetings. In some embodiments, the disclosed systems analyze stored meeting data from past video calls and other virtual meetings to generate intelligent insights for an upcoming video call. The disclosed systems also generate and provide intelligent insights or coaching tools for ongoing video calls. As part of the intelligent coaching tools for ongoing video calls, the disclosed systems can generate predictions for accomplishing target goals for the video calls. Further, the disclosed systems can generate intelligent insights or coaching tools after video calls take place.

20 Claims, 29 Drawing Sheets

(51) Int. Cl.

| | |
|---|---|
| ***G06N 5/02*** | (2023.01) |
| ***G06V 20/40*** | (2022.01) |
| ***G06V 40/10*** | (2022.01) |
| ***G06V 40/16*** | (2022.01) |
| ***G06V 40/20*** | (2022.01) |
| ***G09B 19/04*** | (2006.01) |
| ***G10L 25/48*** | (2013.01) |
| ***H04L 12/18*** | (2006.01) |
| ***H04L 67/306*** | (2022.01) |
| ***H04N 7/14*** | (2006.01) |

(52) U.S. Cl.
CPC .......... *G06V 40/103* (2022.01); *G06V 40/174* (2022.01); *G06V 40/176* (2022.01); *G06V 40/23* (2022.01); *G09B 19/04* (2013.01); *G10L 25/48* (2013.01); *H04L 12/1822* (2013.01); *H04L 67/306* (2013.01); *H04N 7/147* (2013.01); *H04N 7/155* (2013.01)

(58) Field of Classification Search
CPC .... G06V 20/41; G06V 40/103; G06V 40/174; G06V 40/176; G06V 40/23; G09B 19/04; G10L 25/48; H04L 12/1822; H04L 67/306
See application file for complete search history.

(56) References Cited

U.S. PATENT DOCUMENTS

| | | | | |
|---|---|---|---|---|
| 10,122,848 | B2 | 11/2018 | Sales et al. | |
| 10,255,563 | B2 | 4/2019 | Stickler et al. | |
| 10,262,195 | B2 | 4/2019 | Conway et al. | |
| 10,832,009 | B2 | 11/2020 | Bonin et al. | |
| 10,956,875 | B2 | 3/2021 | Nelson et al. | |
| 11,024,328 | B2 | 6/2021 | Jung et al. | |
| 11,159,767 | B1 | 10/2021 | Kamisetty et al. | |
| 11,379,772 | B2 | 7/2022 | Oberman et al. | |
| 11,663,024 | B2 | 5/2023 | Decrop et al. | |
| 11,736,309 | B2 | 8/2023 | Rey et al. | |
| 11,798,549 | B2 | 10/2023 | Braganza et al. | |
| 2002/0151297 | A1 | 10/2002 | Remboski et al. | |
| 2008/0147706 | A1* | 6/2008 | Anglin | G06Q 10/10 707/999.102 |
| 2013/0144603 | A1 | 6/2013 | Lord et al. | |
| 2015/0181020 | A1 | 6/2015 | Fitzsimmons et al. | |
| 2017/0270822 | A1 | 9/2017 | Cohen | |
| 2017/0272394 | A1 | 9/2017 | Ding et al. | |
| 2018/0101281 | A1 | 4/2018 | Nelson et al. | |
| 2018/0189267 | A1* | 7/2018 | Takiel | G10L 15/19 |
| 2018/0226069 | A1 | 8/2018 | Fleischman et al. | |
| 2019/0042086 | A1 | 2/2019 | White et al. | |
| 2020/0118010 | A1 | 4/2020 | Lee et al. | |
| 2021/0120206 | A1 | 4/2021 | Liu et al. | |
| 2021/0176427 | A1 | 6/2021 | Sutasirisap et al. | |
| 2021/0314523 | A1 | 10/2021 | Kamisetty et al. | |
| 2022/0086393 | A1* | 3/2022 | Peters | H04N 7/147 |
| 2022/0113998 | A1 | 4/2022 | Martin | |
| 2022/0139252 | A1 | 5/2022 | Sawyer et al. | |
| 2022/0157189 | A1 | 5/2022 | Harlow et al. | |
| 2022/0182253 | A1 | 6/2022 | Pawar et al. | |
| 2022/0199079 | A1 | 6/2022 | Hanson et al. | |
| 2022/0207392 | A1 | 6/2022 | Hou et al. | |
| 2022/0293107 | A1 | 9/2022 | Leaman et al. | |
| 2022/0407732 | A1 | 12/2022 | Hellman et al. | |
| 2023/0046248 | A1 | 2/2023 | Veyseh et al. | |
| 2023/0177356 | A1 | 6/2023 | Choi et al. | |
| 2023/0385778 | A1 | 11/2023 | Johnson, III et al. | |
| 2024/0021217 | A1* | 1/2024 | Van Rensburg | H04N 7/157 |
| 2024/0073054 | A1 | 2/2024 | Hong et al. | |
| 2024/0087606 | A1 | 3/2024 | Miller et al. | |
| 2024/0127079 | A1* | 4/2024 | Agley | G09B 5/06 |
| 2024/0195915 | A1 | 6/2024 | Koneru et al. | |
| 2024/0386015 | A1 | 11/2024 | Crabtree et al. | |
| 2024/0395259 | A1 | 11/2024 | Hilmarsson et al. | |
| 2024/0412720 | A1* | 12/2024 | Vasylyev | G06F 16/90332 |

OTHER PUBLICATIONS

Non-Final Office Action from U.S. Appl. No. 18/414,996, mailed Sep. 16, 2025, 12 pages.
Non-Final Office Action from U.S. Appl. No. 18/415,011, mailed Mar. 25, 2025, 15 pages.
Notice of Allowance for U.S. Appl. No. 18/415,011 mailed on Nov. 7, 2025, 7 pages.
Notice of Allowance from U.S. Appl. No. 18/415,011 mailed Dec. 17, 2025, 7 pages.
Non-Final Office Action from U.S. Appl. No. 18/415,036, mailed Feb. 13, 2026, 9 pages.
Notice of Allowance from U.S. Appl. No. 18/414,996 mailed Feb. 11, 2026, 02 pages.
Notice of Allowance from U.S. Appl. No. 18/414,996 mailed Jan. 28, 2026, 5 pages.

* cited by examiner

DETERMINING VIDEO CALL EFFECTIVENESS SCORES FOR ACCOMPLISHING TARGET GOALS

CROSS-REFERENCE TO RELATED APPLICATIONS

The present application claims priority to, and the benefit of, U.S. Provisional Application No. 63/611,612 entitled GENERATING COACHING INSIGHTS FOR VIDEO CALLS, filed Dec. 18, 2023, which is hereby incorporated by reference in its entirety.

BACKGROUND

Advancements in computing devices and networking technology have given rise to a variety of innovations in virtual meeting software, including video calling and digital group discussion boards. For example, existing virtual meeting systems can capture and transmit video streams across devices all over the world to seamlessly facilitate video calls. Existing systems can also transmit, along with video streams, digital messages or content items shared by connected devices as part of video calls (or other virtual meetings). Indeed, modern online virtual meeting systems can provide access to video data and other digital content for user accounts to collaborate across diverse physical locations and over a variety of computing devices. Despite these advances, however, existing digital content systems continue to suffer from a number of disadvantages, particularly in terms of flexibility and efficiency.

As just suggested, some existing virtual meeting systems are inflexible. In particular, many existing systems are rigidly fixed to providing video stream data to participating devices of an ongoing virtual meeting virtual meeting, irrespective of previous or upcoming virtual meetings (e.g., video calls). Indeed, because of the computational hurdles involved in facilitating seamless video calls across diverse devices and locations, existing systems are often hyper focused on currently ongoing video calls and are thus limited in their capacity to generate intelligent meeting insights from other data beyond the currently transmitted video streams (and accompanying data).

Due at least in part to their inflexible natures, many existing virtual meeting systems are also inefficient. To elaborate, because existing systems are often designed solely and specifically to facilitate seamless video calls, some existing systems do not natively include additional functionality for generating and providing intelligent (e.g., predictive) insights based on previous and/or upcoming video calls (or other virtual meetings). Consequently, such existing systems often require separate computer applications to determine contextual information for video calls, such as determining previous video call data and/or searching through and identifying content items relating to current or upcoming video calls (which functionality is still limited). As a result of running multiple computer applications to access respective functions on each one, some existing systems require excessive user inputs to navigate among the various applications and interfaces. These existing systems are thus not only navigationally inefficient in requiring such large numbers of user interactions, but running the multiple applications and processing the excessive numbers of user interactions involved in existing systems consumes excessive computing resources such as processing power and memory that could otherwise be preserved with more efficient systems.

SUMMARY

This disclosure describes one or more embodiments of systems, methods, and non-transitory computer readable storage media that provide benefits and/or solve one or more of the foregoing and other problems in the art. For instance, the disclosed systems provide a new method and system for generating and providing intelligent insights for video calls and other virtual meetings. In some embodiments, the disclosed systems analyze stored meeting data from past video calls and other virtual meetings to generate intelligent insights for an upcoming video call. For example, the disclosed systems determine a drop-off topic discussed by attendees at termination of a previous video call to use as the basis for generating a suggested phrase for display at initiation (e.g., starting or beginning of video streams) of an upcoming video call. Indeed, the disclosed systems can extract and analyze data from video streams, agendas, user accounts, stored content items, and other sources pertaining to previous video calls to inform the process of generating suggested phrases and other intelligent meeting insights for upcoming video calls.

The disclosed systems also generate and provide intelligent insights or coaching tools for ongoing video calls. To elaborate, the disclosed systems can monitor and analyze data for a currently ongoing video call, such as discussion topics and video stream data indicating camera enablement, body language, facial expressions, and/or eye movement, to generate intelligent coaching notifications during the ongoing video call. For instance, the disclosed systems can perform a continuous semantic search throughout the duration of the ongoing video call to identify content items corresponding to discussion topics that come up during the call. The disclosed systems can also adapt a notification within the ongoing video to suggest sharing different content items (or to provide different suggested phrases) as discussion topics change over time. As part of the intelligent coaching tools, the disclosed systems can also generate and provide effectiveness scores to convey how effectively a user account is communicating within the ongoing video call based on vocabulary data, sentence structure data, body language data, and other information.

As part of the intelligent coaching tools for ongoing video calls, the disclosed systems can generate predictions for accomplishing target goals for the video calls. More specifically, the disclosed systems can determine a target goal for an ongoing video call based on analyzing an agenda for the call. The disclosed systems can also monitor discussion topics over time throughout the ongoing video call to generate probability predictions, or video call effectiveness scores, of accomplishing the target goal based on the video call's trajectory. In some embodiments, the disclosed systems utilize a video call prediction model to generate video call effectiveness scores by comparing target goal embeddings with topic discussion embeddings extracted from video call data.

Further, the disclosed systems can generate intelligent insights or coaching tools after video calls take place. In particular, the disclosed systems can extract video call data from one or more past video calls, where the video call data includes data for body language, sentence structure, vocabulary, speech speed, eye movement, and facial expressions. From the video call data, the disclosed systems can generate a communication effectivity score for a user account and can further generate suggestions for how to improve the communication effectivity score in future video calls. Indeed, the disclosed systems can provide visual notifications for display within a video call to depict a communication effectivity score along with suggestions for improving.

BRIEF DESCRIPTION OF THE DRAWINGS

This disclosure will describe one or more example implementations of the systems and methods with additional specificity and detail by referencing the accompanying figures. The following paragraphs briefly describe those figures.

DETAILED DESCRIPTION

Figure 1:
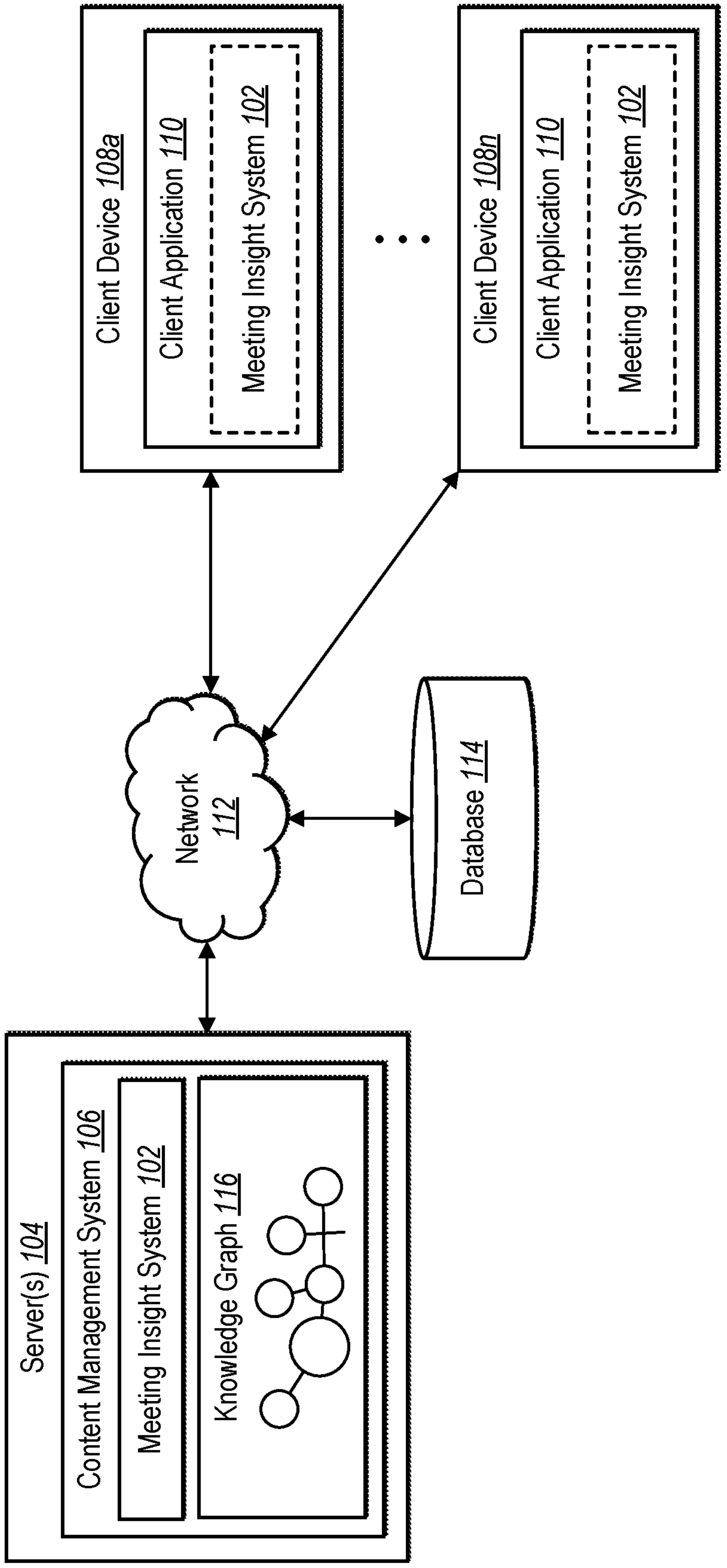
FIG. 1 illustrates a schematic diagram of an example environment of a meeting insight system in accordance with one or more embodiments.

This disclosure describes one or more embodiments of a meeting insight system that generates and provides intelligent insights and/or coaching tools relating to video calls and other virtual meetings. While this disclosure separates the discussion into overarching topics according to various functions or capabilities of the meeting insight system, the meeting insight system can also combine functions from each (or a subset) of the topical discussions of each section. The following paragraphs provide an overview or an introduction to each of the following concepts in order: i) pre-meeting insights for upcoming video calls, ii) in-meeting coaching tools for ongoing video calls, iii) predicting accomplishment of target goals for ongoing video calls, and iv) post-meeting insights after video calls. Thereafter, additional detail regarding each of the main topics is provided in relation to the figures.

To generate insights at the various stages, the meeting insight system can generate and analyze a knowledge graph to define and determine relationships between past video calls (and other meetings), content items, and user accounts. For example, the meeting insight system can generate a knowledge graph from video call data (and non-video-call meeting data), content item data, and/or user account data indicating discussion topics, agenda items, invitees, attendees, recurrence (e.g., periodicity of repeat instances of a meeting), tone, body language, facial expressions, eye movement, vocabulary, sentence structure, speech speed, and/or other data. The meeting insight system generates the knowledge graph to include nodes representing video calls, content items, and/or user accounts and edges to represent relationships between the nodes (based on the extracted video call data, content item data, and user account data). Additional detail regarding generating and analyzing the knowledge graph is provided below with reference to the figures.

Introduction to Pre-Meeting Insights

As just mentioned, to generate pre-meeting insights, the meeting insight system can analyze a knowledge graph defining relationships between past video calls (or other meetings). In particular, the meeting insight system can determine closer relationships between past meetings whose nodes are connected by shorter edges within the knowledge graph than other nodes whose edges are longer. In addition, the meeting insight system can generate and determine distances for new nodes added to the knowledge graph for upcoming video calls. Accordingly, the meeting insight system can determine relationships between past video calls and upcoming video calls.

In some embodiments, the meeting insight system can detect an upcoming video call (e.g., from calendar data of a user account) and can identify a previous video call that is most closely related to the upcoming video call (e.g., by comparing edge distances in the knowledge graph). In some cases, the most closely related video call is one that shares a threshold number (or percentage) of common attendees or invitees, that has a similar target goal as indicated by meeting agendas, and/or that is part of recurring set of meeting instances with the same title.

The meeting insight system can also determine a drop-off topic for the previous video call that indicates a discussion topic at a time of termination for the previous video call. Thus, upon initiation of the upcoming video call, the meeting insight system can generate a suggested phrase to present via a client device of a user account to pick up the upcoming video call where the previous video call left off. In certain embodiments, the meeting insight system can generate the suggested phrase based on a tone of the conversation at termination of the previous video call (e.g., to ease tension) and/or can generate a notification suggesting a user account share a content item pertaining to the drop-off topic.

Introduction to In-Meeting Coaching

As mentioned above, in certain embodiments, the meeting insight system can generate in-meeting insights for ongoing meetings based on a knowledge graph. In particular, the meeting insight system can analyze a knowledge graph to determine relationships between content items, between past video calls (or other meetings), and/or between content items and video calls. For instance, the meeting insight system can determine a relationship between a content item and a past video call where the content item relates to a topic determined to be a discussion topic of the past video call.

In some embodiments, the meeting insight system detects or determines a discussion topic for an ongoing video call. For example, the meeting insight system analyzes video call data extracted from an ongoing video call to determine subject matter discussed by the attendees. The meeting insight system can also perform a continuous semantic search based on the discussion topic. Specifically, the meeting insight system can perform a semantic search that continuously adapts to changes in discussion topic to identify stored content items (for a particular user account and/or for a group of user accounts with access to shared content items) corresponding to the discussion topic as it changes over time. In some cases, the meeting insight system can also provide a notification for sharing a content item identified via the semantic search with one or more user accounts attending the ongoing video call.

In addition (or alternatively) to generating recommendations for providing content items during an ongoing video call, the meeting insight system can generate other coaching insights as well, such as communication effectivity scores based on video call data indicating body language, vocabulary, speech speed, sentence structure, facial expressions, and/or eye movement. The meeting insight system can also generate and provide suggested phrases based on shared interests with other user accounts in attendance, shared content items with the other user accounts, a tone of conversation for the ongoing video call, corrections of incorrect statements, improving communication effectivity scores (e.g., to improve attentiveness during the video call), and/or refocusing the ongoing video call if it is off track.

Introduction to Predicting Accomplishment of Target Meeting Goals

As also mentioned above, the meeting insight system can generate predictions of whether an ongoing video call will accomplish one or more target goals. For example, the meeting insight system can utilize a video call prediction model to process video call data to generate a video call effectiveness score for an ongoing video call. In some cases, the meeting insight system generates a video call effectiveness score as a prediction of whether the ongoing video call will accomplish a target goal. Indeed, the meeting insight system can generate or extract a target goal embedding from an agenda associated with the ongoing video call and can compare the target goal embedding with one or more topic discussion embeddings extracted from discussion topics during the ongoing video call to determine a trajectory of the call and whether it will accomplish the target goal.

In some embodiments, the meeting insight system generates the video call effectiveness score as a probability of accomplishing the target goal (e.g., reflective of a distance between a topic discussion embedding and a target goal embedding). The meeting insight system can also update the video call effectiveness score during the ongoing video call to reflect changes in the probability over time as discussion topics change. In addition, the meeting insight system can provide a visual representation of a video call effectiveness score for display on a client device during an ongoing video call.

Introduction to Post-Meeting Insights

As further mentioned above, in some embodiments the meeting insight system generates post-meeting insights for past video calls. For example, the meeting insight system generates a post-meeting insight in the form of a communication effectivity score that reflects how effective a user account is at communicating based on video call data from one or more past video calls. In some cases, the meeting insight system analyzes video call data, such as vocabulary data, speech speed data, sentence structure data, body language data, eye movement data, and/or facial expression data to determine a communication effectivity score for a user account.

The meeting insight system can generate a communication effectivity score as a measure for a single (e.g., most recent) video call or as a cumulative measure over a plurality of previous video calls. The meeting insight system can also update the communication effectivity score based on new video call data from new video calls that take place. In some cases, the meeting insight system can also provide a visual representation of the communication effectivity score for display on a client device within a user interface of a video call application (e.g., during a new video call). The meeting insight system can also generate and provide suggestions for improving the communication effectivity score for display on the client device.

As suggested above, the meeting insight system can provide several improvements or advantages over existing virtual meeting systems. For example, some embodiments of the meeting insight system can improve flexibility over prior systems. As opposed to existing systems that are rigidly fixed to only providing current video stream data, the meeting insight system can generate intelligent pre-meeting insights, ongoing meeting insights, and post-meeting insights by generating and analyzing knowledge graphs defining relationships between video calls. For instance, the meeting insight system can flexibly adapt coaching insights (e.g., suggested phrases, recommended content items, or communication effectivity scores) for past, ongoing, or upcoming video calls based on video call data specific to one or more past, ongoing, and/or upcoming video calls (and/or based on content item data or user account data). As a result, the meeting insight system introduces new functionality and flexibility not found in prior systems that focus solely on distributing current video streams across client devices without analyzing contextual data for the video streams.

Due at least in part to its improved flexibility, the meeting insight system can also improve efficiency over prior systems. For example, by incorporating functionality for processing contextual data for past, ongoing, and upcoming video calls, the meeting insight system natively includes the capability to generate intelligent coaching insights within the same computer application that captures and transmits video streams for a video call. Thus, rather than requiring a client device and/or servers to run multiple computer applications (e.g., one for a video call and another for searching and sharing content items), the meeting insight system preserves computational resources by running only a single computer application that includes functionality for facilitating video calls and generating coaching insights at various stages, as described herein. Additionally, by removing the need to run multiple computer applications, the meeting insight system further reduces the number of client device interactions compared to prior systems that require users to frequently navigate between different applications to access various data and/or functionality. The meeting insight system is thus more computationally efficient and navigationally efficient than many prior systems.

As illustrated by the foregoing discussion, the present disclosure utilizes a variety of terms to describe features and benefits of the meeting insight system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is siloed to a particular computer application but is not necessarily accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

Additionally, as used herein, the term "video call data" refers to computer data that is extracted from, and used to generate insights for, video calls for one or more user accounts. For example, video call data can include data extracted from a computer application that facilitates video calls, data extracted from a client device that runs one or more video calling applications, and/or data extracted from a user account (e.g., within a content management system) pertaining to video calls of the user account. In some cases, video call data includes data captured by a camera of a client device, such as pixel data defining features or characteristics of individuals within frame, including: i) "body language data" indicating head placement/movement, arm placement/movement and/or torso placement/movement, ii) "eye movement data" indicating movement or focus of an attendee's eyes, including focus locations and/or frequency and degree of movement, and iii) "facial expression data" indicating placement and/or movement of facial features, such as eyes, mouth, eyebrows, cheeks, and nose. In these or other cases, video call data includes data generated or extrapolated from raw camera data, such as: i) "reaction data" which indicates a type and/or degree (as represented by a "reaction score") of reaction by an attendee based on one or more of body language data, eye movement data, and/or facial expression data or ii) "attentiveness data" which indicates a measure of attentiveness (as indicated by an "attentiveness score") by an attendee as indicated by one or more of body language data, eye movement data, and/or facial expression data. Other camera-specific video call data includes "camera enablement data" which indicates (e.g., as a binary flag) whether a camera is enabled or disabled at a client device.

Other examples, of video call data include data captured by microphones at one or more client devices. For instance, video data can include "topic data" which indicates topics associated with a video call. In some cases, topic data refers to natural language data captured from one or more microphones and/or to topic discussion embeddings (or classifications) extracted from natural language data captured by microphones. Example types of topic data include a "discussion topic" identified as a commonly discussed topic among attendees for a time period within a video call (or other virtual meeting), a "drop-off topic" indicating a topic that was currently being discussed by attendees at a time of termination of a video call. Other microphone-based topic data includes: i) "tone data" which indicates a tone or an attitude of dialogue during a video call (e.g., about a particular topic, an average for the entire call, and/or for one or more attendees), ii) "speech speed data" which indicates a speed of speech for an attendee user account, iii) "vocabulary data" which indicates words used during a video call (e.g., indicating a variety and/or complexity of word choice), iv) "sentence structure data" which indicates a style, format, or phrasing for dialogue of an attendee user account during a video call, and v) "dissonance data" which indicates a degree or measure of dissonance (as represented by a "dissonance score") or lack of harmony or unity in conversation topics among user accounts attending a video call. In some cases, video call data also includes volume data which indicates a magnitude of sound volume captured by a microphone and which may inform other types of video call data, such as tone.

In some embodiments, video call data includes data associated with content items relating to a video call. For example, video call data can include a target topic extracted from an agenda for a video call. As used herein, the term "target topic" refers to a topic (represented by a natural language description or a target topic embedding) that is the aim or goal to discuss during all or part of a video call. For example, an agenda can have a single overarching target topic and/or multiple constituent target topics associated with individual agenda items. Additionally, video call data can include "calendar data" indicating scheduled dates and times for one or more video calls for a user account. In some cases, video call data (including any or all of its above types) is specific to and/or generated for a particular client device, a particular user account, a group of user accounts, a single video call, or multiple related video calls.

In some embodiments, the meeting insight system utilizes one or more connectors to extract data, such as video call data, for generating meeting insights. As used herein, the term "connector" refers to a computer code segment, application, or program that retrieves or extracts features that define information from user-account-facing applications, such as digital calendars, video call applications, email applications, text messaging applications, and other applications. In some cases, a connector is as described by Vasanth Krishna Namasivayam et al. in U.S. patent application Ser. Nos. 18/478,061 and 18/478,066, titled GENERATING AND MAINTAINING COMPOSITE ACTIONS UTILIZING LARGE LANGUAGE MODELS, filed Sep. 29, 2023, both of which is incorporated herein by reference in their entireties.

As mentioned above, the meeting insight system can utilize various heuristic models and/or machine learning models to generate scores, such as video call effectiveness scores, for video calls. As used herein, the term "video call effectiveness score" refers to a score that indicates a measure or a probability of accomplishing a target goal during a video call. For example, a video call effectiveness score indicates how likely it is that a video call will achieve a target goal indicated by an agenda based on one or more discussion topics during the video call. Along these lines, the term "communication effectivity score" refers to a score that indicates a measure of how effectively a user account communicates during a video call (or cumulatively across multiple video calls). For example, a communication effectivity score can be based on various video call data, including body language data, eye movement data, facial expression data, vocabulary data, sentence structure data, and/or speech speed data.

Additionally, as used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks.

Relatedly, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., communication effectivity scores and/or video call effectiveness scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network. Upon training as described below, such a neural network may become a large language model.

As an example machine learning model, the term "tone encoder model" refers to a model (e.g., a machine learning model, such as a neural network) that generates or extracts tone embeddings that encode tone data from a video call, either for a specific user account or for the video call in general. Along these lines, the term "communication effectivity model" refers to a model (e.g., a machine learning model, such as a neural network) that generates or predicts communication effectivity scores from video call data of a video call (e.g., for a specific user account). Additionally, the term "video call prediction model" refers to a model (e.g., a machine learning model, such as a neural network) that generates video call effectiveness scores for video calls. For example, a video call prediction model analyzes video call data to generate a prediction of a probability that a video call accomplishes a target meeting goal (e.g., by comparing topic discussion embeddings and one or more target goal embeddings).

Additional detail regarding the meeting insight system will now be provided with reference to the figures. For example, FIG. 1 illustrates a schematic diagram of an example system environment for implementing a meeting insight system 102 in accordance with one or more implementations. An overview of the meeting insight system 102 is described in relation to FIG. 1. Thereafter, a more detailed description of the components and processes of the meeting insight system 102 is provided in relation to the subsequent figures.

As shown, the environment includes server(s) 104, client device(s) **108*a*-108*n*, a database 114, and a network 112. Each of the components of the environment can communicate via the network 112, and the network 112 may be any suitable network over which computing devices can communicate. Example networks are discussed in more detail below in relation to FIGS. 28-29**.

As mentioned above, the example environment includes client device(s) **108*a*-108*n*. The client device(s) 108*a*-108*n* can be one of a variety of computing devices, including a smartphone, a tablet, a smart television, a desktop computer, a laptop computer, a virtual reality device, an augmented reality device, or another computing device as described in relation to FIGS. 28-29. The client device(s) 108*a*-108*n* can communicate with the server(s) 104 and/or the database 114 via the network 112. For example, the client device(s) 108*a*-108*n* can receive user input from a user interacting with the client device(s) 108*a*-108*n* (e.g., via the client application 110) to, for instance, access, generate, modify, or share a content item, to collaborate with a co-user of a different client device, or to select a user interface element. In addition, the meeting insight system 102 on the server(s) 104 can receive information relating to various interactions with content items and/or user interface elements based on the input received by the client device(s) 108a-108**n (e.g., to join a video call, to participate in a video call via camera and microphone data, and/or to share a content item during a video call).

As shown, the client device(s) 108a-108n can include a client application 110. In particular, the client application 110 may be a web application, a native application installed on the client device(s) 108a-108n (e.g., a mobile application, a desktop application, etc.), or a cloud-based application where all or part of the functionality is performed by the server(s) 104. Based on instructions from the client application 110, the client device(s) 108a-108n can present or display information, including a user interface for a video calling application integrated with the content management system 106 and/or user interface elements for depicting communication effectivity scores, suggested phrases, and/or content item sharing recommendations.

As illustrated in FIG. 1, the example environment also includes the server(s) 104. The server(s) 104 may generate, track, store, process, receive, and transmit electronic data, such as digital content items, topic data, video call data, interface elements, interactions with digital content items, interactions with interface elements, and/or interactions between user accounts or client devices. For example, the server(s) 104 may receive data from the client device(s) 108a-108n in the form of a selection of a particular content item relating to a certain topic. In addition, the server(s) 104 can transmit data to the client device(s) 108a-108n in the form of a content item, a suggested phrase, a communication effectivity score, or some other information. Indeed, the server(s) 104 can communicate with the client device(s) 108a-108n to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and/or other types of servers.

As shown in FIG. 1, the server(s) 104 can also include the meeting insight system 102 as part of a content management system 106. The content management system 106 can communicate with the client device(s) 108a-108n to perform various functions associated with the client application 110 such as managing user accounts, managing video calls (e.g., via an integrated video calling application within the content management system 106 or a separate video calling application), managing content items, and facilitating user interaction with the content collections and/or content items. Indeed, the content management system 106 can include a network-based smart cloud storage system to manage, store, and maintain content items and related data (including video call data) across numerous user accounts, including user accounts in collaboration with one another. In some embodiments, the meeting insight system 102 and/or the content management system 106 utilize the database 114 to store and access information such as digital content items, video call data, and/or the knowledge graph 116.

As also illustrated in FIG. 1, the meeting insight system 102 can include a knowledge graph 116. In particular, the knowledge graph 116 can store or encode relationship information to define relationships between user accounts, video calls, and content items within the content management system 106 (and/or housed at other server locations). From the knowledge graph 116, the meeting insight system 102 can generate or identify relatedness between video calls, between video calls and content items, and/or between content items. For instance, the meeting insight system 102 can utilize a model to process data encoded by the knowledge graph 116 to generate a suggested phrase for display on the client device(s) 108a-108n upon initiation of an upcoming video call with a certain relationship to one or more previous video calls (as represented by the knowledge graph 116).

Although FIG. 1 depicts the meeting insight system 102 located on the server(s) 104, in some implementations, the meeting insight system 102 may be implemented by (e.g., located entirely or in part) on one or more other components of the environment. For example, the meeting insight system 102 may be implemented by the client device(s) 108a-108n, and/or a third-party device. For example, the client device(s) 108a-108n can download all or part of the meeting insight system 102 for implementation independent of, or together with, the server(s) 104.

In some implementations, though not illustrated in FIG. 1, the environment may have a different arrangement of components and/or may have a different number or set of components altogether. For example, the client device(s) 108a-108n may communicate directly with the meeting insight system 102, bypassing the network 112. In addition, the environment can include the database 114 located external to the server(s) 104 (e.g., in communication via the network 112) or located on the server(s) 104 and/or on the client device(s) 108a-108n.

Figure 2:
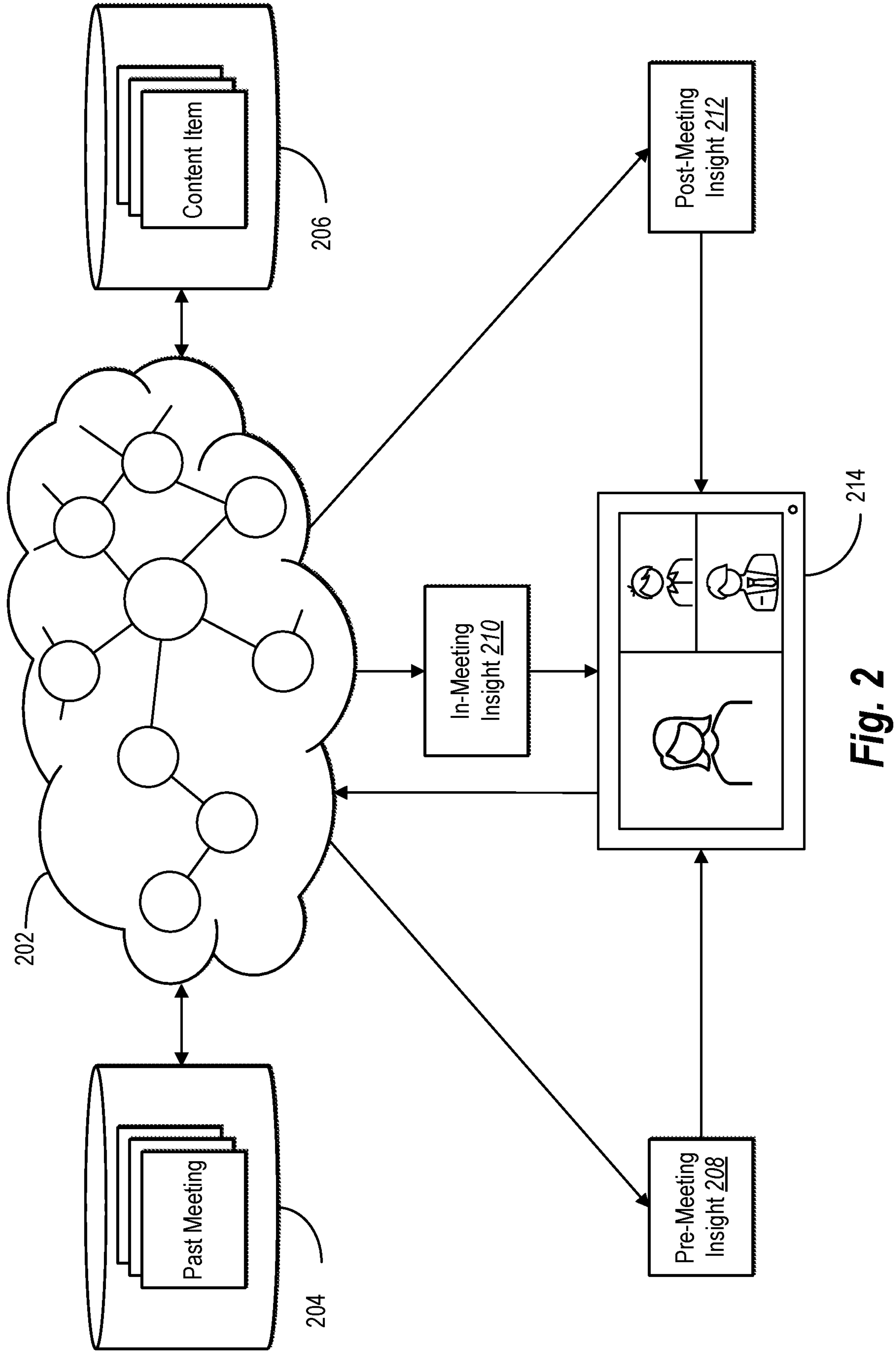
FIG. 2 illustrates an example overview of generating and providing coaching insights at various stages in accordance with one or more embodiments.

As mentioned above, the meeting insight system 102 can generate coaching insights for video calls (or other virtual meetings, such as audio calls). In particular, the meeting insight system 102 can generate pre-meeting insights, in-meeting insights (including predictions for accomplishing target goals), and post-meeting insights. FIG. 2 illustrates an example overview of generating meeting insights in accordance with one or more embodiments. Additional detail regarding the various acts and processes mentioned in the description of FIG. 2 is provided thereafter in relation to subsequent figures.

As illustrated in FIG. 2, the meeting insight system 102 generates and utilizes a knowledge graph 202. More specifically, the meeting insight system 102 generates the knowledge graph 202 to encode or define relationships between video calls, content items, and/or user accounts. Indeed, the meeting insight system 102 generates the knowledge graph 202 by analyzing data from a past meeting repository 204 (e.g., stored within the database 114) indicating previous discussion topics and other information about past video calls and other meetings. In addition, the meeting insight system 102 generates the knowledge graph 202 based on content item data from the content item repository 206 (e.g., stored within the database 114), such as creator user accounts, corresponding topics, and access permissions. The meeting insight system 102 generates the knowledge graph 202 still further on video call data from an ongoing or upcoming video call, as shown on the client device 214.

From the knowledge graph 202, the meeting insight system 102 generates a pre-meeting insight 208. In particular, the meeting insight system 102 generates the pre-meeting insight 208 as a notification, a suggested phrase, or a content item recommendation for display on the client device 214 upon initiation of an upcoming video call. Indeed, in response to detecting initiation of an upcoming (or a subsequent) video call, the meeting insight system 102 analyzes the knowledge graph 202 to identify previous video calls and/or stored content items (e.g., for the user account of the client device 214) within a threshold similarity of the upcoming video call. The meeting insight system 102 can thus generate the pre-meeting insight 208 based on the similar video calls and/or the similar content items to assist the user account in sharing relevant content items, stating relevant information, and/or greeting relevant user accounts for the upcoming video call.

In addition, the meeting insight system 102 generates an in-meeting insight 210 from the knowledge graph 202. More particularly, the meeting insight system 102 generates the in-meeting insight 210 as a notification, a suggested phase, a content item recommendation, a video call effectiveness score, and/or a communication effectivity score for display on the client device 214 during an ongoing video call. Indeed, in response to detecting an ongoing video call, the meeting insight system 102 analyzes the knowledge graph 202 to identify previous video calls and/or stored content items (e.g., for the user account of the client device 214) within a threshold similarity of the ongoing video call. Based on these data, the meeting insight system 102 can thus generate the in-meeting insight 210 for recommending a particular content item to share and/or for suggesting a particular phrase to refocus the ongoing video call if it has veered off topic. Indeed, the meeting insight system 102 can extract and analyze video call data from the ongoing video call to compare with video calls in the knowledge graph 202 and/or to generate a video call effectiveness score and/or to generate a communication effectivity score.

As further illustrated in FIG. 2, the meeting insight system 102 generates a post-meeting insight 212 from the knowledge graph 202. To elaborate, the meeting insight system 102 generates the post-meeting insight 212 as a notification, a suggested phase, a content item recommendation, a video call effectiveness score, and/or a communication effectivity score for display on the client device 214 after completion of one or more video calls. Indeed, in response to detecting an completion of a prior video call, the meeting insight system 102 analyzes the knowledge graph 202 to identify other previous video calls and/or stored content items (e.g., for the user account of the client device 214) within a threshold similarity of the prior video call. Based on these data, the meeting insight system 102 can thus generate the post-meeting insight 212 for indicating a communication effectivity score for the user account. Indeed, the meeting insight system 102 can extract and analyze video call data from the prior video call to generate a communication effectivity score indicating how well the user account communicated during the video call, along with suggestions for improving the communication effectivity score.

Figure 3:
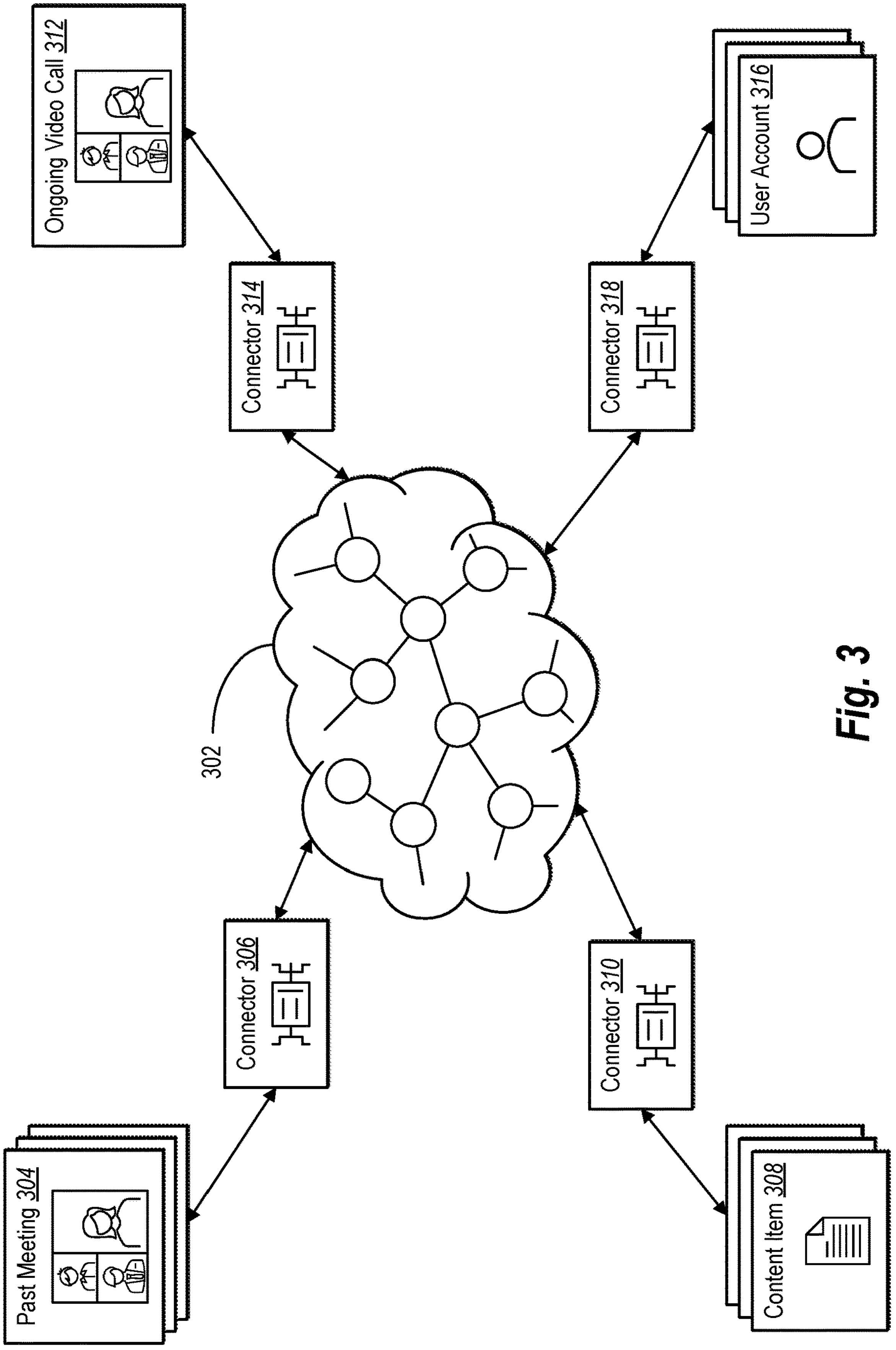
FIG. 3 illustrates an example diagram for generating and utilizing a knowledge graph in accordance with one or more embodiments.

As noted above, in certain embodiments, the meeting insight system 102 generates and utilizes a knowledge graph for generating coaching insights for video calls and other virtual meetings. In particular, the meeting insight system 102 generates a knowledge graph that encodes relationships between video calls, content items, and/or user accounts of the content management system 106. FIG. 3 illustrates an example diagram for generating a knowledge graph in accordance with one or more embodiments.

As illustrated in FIG. 3, the meeting insight system 102 generates a knowledge graph 302. More specifically, the meeting insight system 102 generates the knowledge graph 302 to encode or define relationships between video calls, content items, and/or user accounts. For example, the meeting insight system 102 analyzes meeting data for one or more past meetings (e.g., the past meeting 304, which may be a past video call) associated with a user account to determine relationships between the past meetings based on data, such as discussion topics, invitee user accounts, attendee user accounts, meeting agenda data, and meeting recurrence (e.g., indications of multiple instances of a meeting with a shared title occurring at regular intervals or a predicted periodicity). Indeed, the meeting insight system 102 utilizes a connector 306 to monitor and extract meeting data (e.g., video call data) from the past meeting 304 to use as a basis for constructing the knowledge graph 302. From the past meeting data, the meeting insight system 102 determines relationships between past meetings, including meetings with similar user accounts in attendance, similar invitee lists, similar agenda items, similar scheduling, and/or similar discussion topics during the meetings. The meeting insight system 102 thus generates nodes to represent the past meetings and edges to represent relationships therebetween within the knowledge graph 302.

In addition, the meeting insight system 102 analyzes content item data from a content item 308 to generate the knowledge graph 302. In particular, the meeting insight system 102 utilizes a connector 310 to monitor and extract data indicating topics within the content item 308 and/or interactions associated with the content item 308, such as accesses, shares, comments, edits, receipts, clips (e.g., generating content sub-items from data in the content item 308), and/or other user interactions over time to determine frequencies, recencies, and/or overall numbers of user interactions with the content item 308 (and/or which user accounts perform the interactions). The meeting insight system 102 thus utilizes the extracted content item data to construct the knowledge graph 302, where some nodes represent content items and edges represent relationship between different content items and/or between content items and past meetings (e.g., past video calls).

As further illustrated in FIG. 3, the meeting insight system 102 analyzes video call data from an ongoing video call 312 to generate the knowledge graph 302. To elaborate, the meeting insight system 102 utilizes a connector 314 to monitor and extract video call data from the ongoing video call 312, including discussion topics, camera-specific data, and microphone-specific data as indicated above. For example, the meeting insight system 102 extracts discussion topics as they change over time across various timestamps of the ongoing video call 312. In addition, the meeting insight system 102 extracts body language data, eye movement data, vocabulary data, and other camera data or microphone data across the various timestamps during the duration of the ongoing video call 312 (and does so by extracting data from each client device for each attendee user account). The meeting insight system 102 utilizes the video call data to construct the knowledge graph 302 by adding a node for the ongoing video call 312 and/or by modifying one or more edges to reflect relationships based on the extracted video call data.

As also illustrated in FIG. 3, the meeting insight system 102 analyzes user account data from a user account 316 to generate the knowledge graph 302 (in accordance with privacy settings and controlling regulations). More particularly, the meeting insight system 102 utilizes a connector 318 to monitor and extract user account data from the user account 316, including user interactions with various content items, contributions to past video calls (e.g., topics discussed, content items shared, body language expressed, speech speed, and vocabulary used), and other profile data associated with the user account 316, such as geographical data and a role within an organization. The meeting insight system 102 thus utilizes the user account data to add a node in the knowledge graph 302 for the user account 316 and/or to modify one or more edges to reflect relationships of content items, ongoing video calls, and/or past meetings (e.g., past video calls) with the user account 316.

In some embodiments, the meeting insight system 102 generates the knowledge graph 302 using nodes to represent meetings (e.g., video calls), user accounts, and content items and using edges to represent relationships between the nodes (e.g., where shorter distances represent stronger relationships than longer distances). In certain embodiments, the meeting insight system 102 generates a user-account-specific knowledge graph, where the knowledge graph defines relationships associated with the user account 316—including relationships with other user accounts, video calls, and content items. In certain embodiments, the meeting insight system 102 generates a system-wide knowledge graph that includes nodes for video calls, content items, and user accounts for an entirety of the content management system 106 and/or for a particular organizational ontology (e.g., a company or a team of collaborating user accounts). Indeed, the meeting insight system 102 can generate multiple knowledge graphs, including one that is specific to the user account 316 and one that is system-wide (or organization-wide).

As indicated and illustrated, the knowledge graph 302 includes nodes and edges. In some cases, the meeting insight system 102 generates and arranges nodes and edges to reflect frequencies and/or recencies of interaction and/or occurrence of video calls. In some embodiments, the meeting insight system generates edges to reflect the types of user interactions with the content items and user accounts (e.g., where edits indicate closer relationships than shares, which in turn indicate closer relationships than accesses) and/or to reflect types of video call data (e.g., where shared discussion topics indicate closer relationships than shared attendee user accounts). Indeed, the meeting insight system 102 can generate the knowledge graph 302 based on combinations of numbers, recencies, frequencies, and types of user interactions and/or types of video call data associated with video calls and/or content items. In some cases, the meeting insight system 102 generates or extracts topic-specific data for building the knowledge graph 302, such as smart topic data pertaining to various video calls and/or user accounts, as described by Joseph Grillo et al. in GENERATING SMART TOPICS FOR VIDEO CALLS USING A LARGE LANGUAGE MODEL AND A CONTEXT TRANSFORMER ENGINE, U.S. patent application Ser. Nos. 18/470,885 and 18/470,929, each filed Sep. 20, 2023, both of which are hereby incorporated by reference in their entireties. Indeed, the meeting insight system 102 can utilize one or more application programming interfaces (APIs) to integrate and incorporate functions or processes from systems designed to extract and generate smart topics or other types of video call data.

In some cases, the meeting insight system 102 utilizes the knowledge graph 302 to determine relationships with content items outside of the actual knowledge graph 302 itself. To elaborate, the meeting insight system 102 identifies websites or other network-based content that is relevant to a user account 316 but that is not actually stored with a content management system 106 (and is thus not included as a node within the knowledge graph 302). The meeting insight system 102 can analyze this type of external content item based on comparing semantic topics with content items stored for the user account 316, user account interaction (e.g., frequency and/or recency of access) with the external content item, and/or relatedness to user accounts associated with the user account 316 (as indicated by the knowledge graph 302). Thus meeting insight system 102 can thus use the information encoded by the knowledge graph 302 to extrapolate or determine relationships with content items outside of the knowledge graph 302 as well, and which can be used as the basis for extracting video call data for generating coaching insights.

As mentioned above, the meeting insight system 102 can perform methods or functions relating to: i) pre-meeting insights for upcoming video calls, ii) in-meeting coaching tools for ongoing video calls, iii) predicting accomplishment of target goals for ongoing video calls, and iv) post-meeting insights after video calls. The following description separates the discussion and the corresponding figures for each of these four concepts into individual sections, each with its own heading. Each of the following sections relates to, and relies on, all or some of the description provided above in relation to FIG. 2 and FIG. 3. Additionally, while the following sections are divided for clarity, the meeting insight system 102 is not limited in its functionality or performance according to such division or separation. Rather, the meeting insight system 102 can perform all or some of the acts or methods associated with one or more of the following sections separately or in combination together. Indeed, some sections below may borrow from or rely on the descriptions of other sections.

Generating and Providing Pre-Meeting Insights

Figure 4:
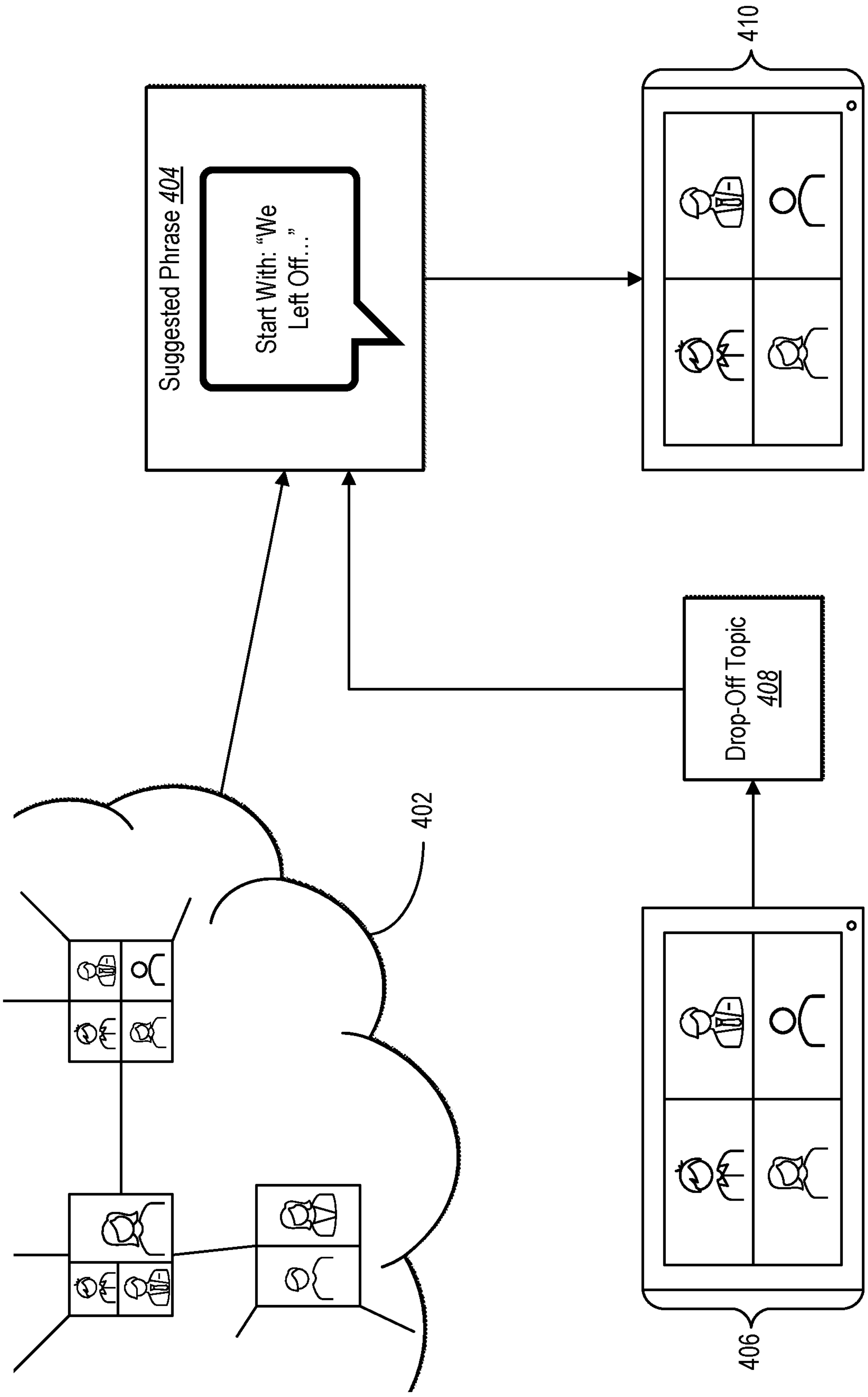
FIG. 4 illustrates an example overview of generating and providing pre-meeting coaching insights in accordance with one or more embodiments.

As mentioned above, in certain described embodiments, the meeting insight system 102 generates and provides pre-meeting insights. In particular, the meeting insight system 102 generates insights from previous meeting data (e.g., video call data) to provide for upcoming video calls. FIG. 4 illustrates an overview of generating pre-meeting insights in accordance with one or more embodiments. Additional detail regarding the various acts and processes introduced in FIG. 4 is provided thereafter in relation to subsequent figures.

As illustrated in FIG. 4, the meeting insight system 102 generates and analyzes a knowledge graph 402 to generate a pre-meeting insight. To elaborate, the meeting insight system 102 analyzes the knowledge graph 402 which encodes and reflects relationships between previous meetings (e.g., past video calls). Indeed, the knowledge graph 402 encodes relationships based on video call data, content item data, and/or user account data as described above.

In addition, the meeting insight system 102 detects or determines an upcoming video call 410. To elaborate, the meeting insight system 102 analyzes calendar data and/or other user account data associated with a user account (within the content management system 106) to determine or identify the upcoming video call 410. For example, the meeting insight system 102 determines that the upcoming video call 410 is scheduled to occur at a specific date and time and/or with specific user accounts.

As further illustrated in FIG. 4, the meeting insight system 102 determines or identifies a previous video call 406 associated with the upcoming video call 410. More specifically, the meeting insight system 102 analyzes the knowledge graph 402 to determine that the previous video call 406 is within a threshold similarity (e.g., a threshold edge length) of the upcoming video call 410. For instance, the meeting insight system 102 determines video call data for the upcoming video call 410, including a title of the upcoming video call 410, a scheduled recurrence of the upcoming video call 410, one or more target topics (e.g., from an agenda) for the upcoming video call 410, invited user accounts for the upcoming video call 410, and/or other features of the upcoming video call 410. In addition, the meeting insight system 102 determines video call data for the previous video call 406 (and other previous video calls within the knowledge graph 402) to compare with the video call data of the upcoming video call 410. Based on the comparison, the meeting insight system 102 determines that the previous video call 406 corresponds to (e.g., shares a recurring schedule, a title, and/or a topic with) the upcoming video call 410.

Based on determining that the previous video call 406 corresponds to the upcoming video call 410, the meeting insight system 102 further determines a drop-off topic 408 for the previous video call 406. To elaborate, the meeting insight system 102 monitors discussion topics for the previous video call 406 and catalogs the topics discussed at various timestamps throughout the duration of the call. Thus, the meeting insight system 102 determines the drop-off topic 408 as a discussion topic (e.g., in embedding form or natural language form) at a time of termination of the previous video call 406. Specifically, the meeting insight system 102 detects when the previous video call 406 terminates (or later determines when it previous terminated) and saves (or later determines) the discussion topic at the termination time.

As further illustrated in FIG. 4, the meeting insight system 102 generates a suggested phrase 404. In particular, the meeting insight system 102 generates the suggested phrase 404 based on the drop-off topic 408. Indeed, the meeting insight system 102 generates the suggested phrase 404 as a phrase or sentence to pick up from where the previous video call 406 left off—e.g., at the drop-off topic 408. In some cases, the meeting insight system 102 generates the suggested phrase 404 using a suggested phrase machine learning model (e.g., a neural network) trained to generate natural language sentences or phrases from sample topics. From the drop-off topic 408, the suggested phrase machine learning model thus generates the suggested phrase 404 upon initiation of the upcoming video call 410. The meeting insight system 102 further provides the suggested phrase 404 for display on a client device for the upcoming video call 410 to prompt an attending user to say the words as generated and presented.

The meeting insight system 102 can also generate additional or alternative pre-meeting coaching insights, beyond the suggested phrase 404. For instance, the meeting insight system 102 can generate suggested content items for sharing, different types of suggested phrases, and/or insights into information about attendee user accounts of the upcoming video call 410.

Figure 5:
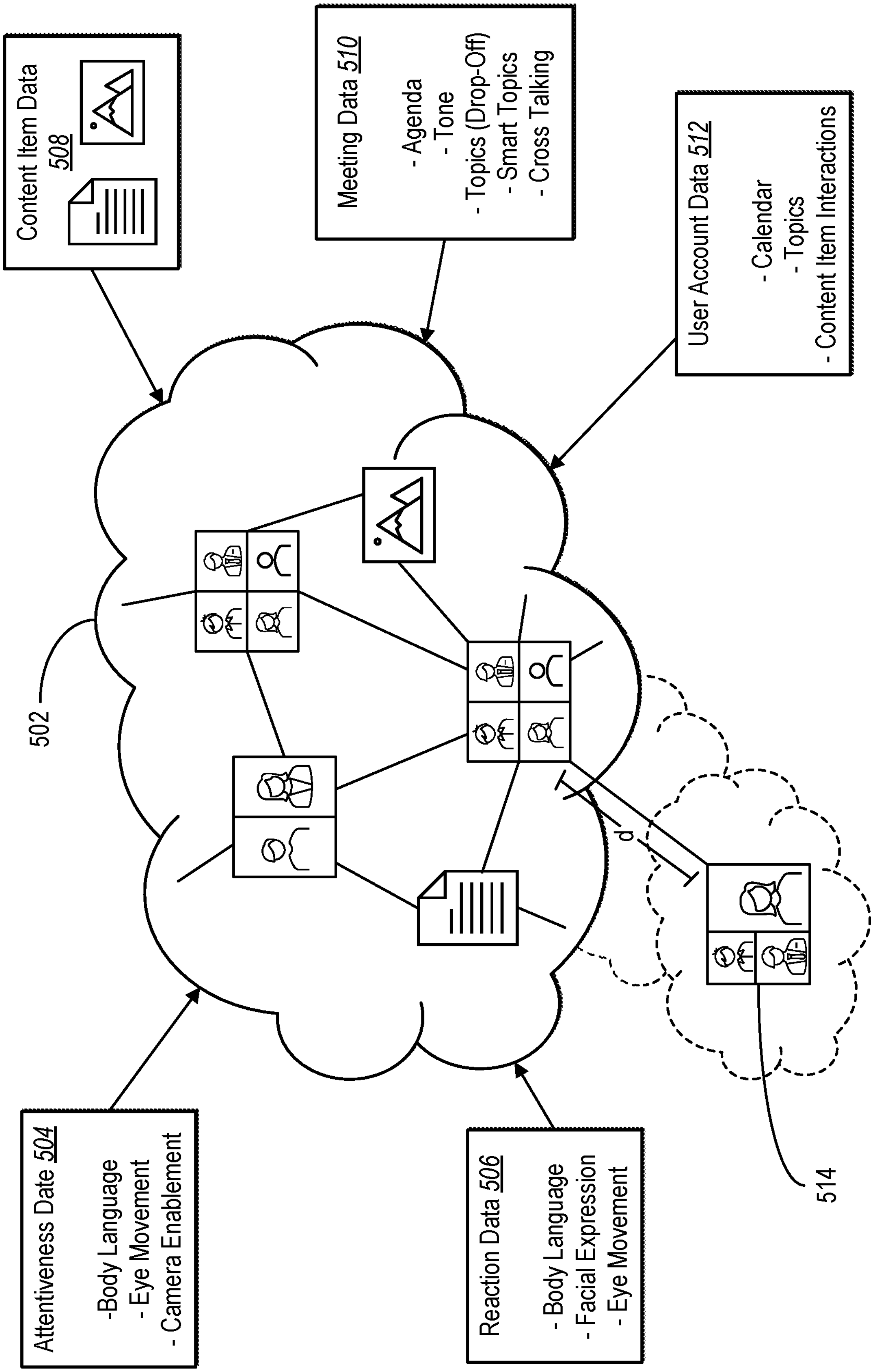
FIG. 5 illustrates an example diagram for utilizing a knowledge graph to determine relationships between video calls in accordance with one or more embodiments.

As mentioned, in certain described embodiments, the meeting insight system 102 generates a pre-meeting insight (e.g., a suggested phrase) based on video call data from an upcoming video call. In particular, the meeting insight system 102 compares video call data with data from past video calls and/or other virtual meetings to identify relevant data to use as a basis for generating a pre-meeting insight. FIG. 5 illustrates an example diagram for generating and using a knowledge graph based on video call data and other data to, for example, compare with video call data of an upcoming video call.

As illustrated in FIG. 5, the meeting insight system 102 generates and utilizes a knowledge graph 502. Indeed, the meeting insight system 102 generates the knowledge graph 502 as described in further detail above. For example, the meeting insight system 102 generates the knowledge graph 502 from various types of video call data, such as attentiveness data 504 of previous video calls, including body language data, eye movement data, and camera enablement data of past video calls and other virtual meetings. Indeed, the meeting insight system 102 can monitor and extract data from cameras of client devices participating in video calls and can utilize various machine learning models (e.g., neural networks) to generate the attentiveness data 504.

To elaborate, the meeting insight system 102 can utilize a body language attentiveness machine learning model to generate a predicted attentiveness score from pixel data indicating body positioning of an attendee captured by a camera of a client device. For instance, body language pixel data indicating a drooping head, crossed arms, and/or hunched shoulders can result in the body language attentiveness machine learning model generating one attentiveness score (e.g., a low score) while pixel data indicating an upright head and squared shoulders results in the body language attentiveness machine learning model generating a different attentiveness score (e.g., a high score).

Additionally, the meeting insight system 102 can utilize an eye movement attentiveness machine learning model to generate a predicted attentiveness score from pixel data indicating eye movement of an attendee as captured by a camera of a client device. For instance, eye movement pixel data indicating eyes focusing off-screen and/or darting in many directions can result in the eye movement attentiveness machine learning model generating one attentiveness score (e.g., a low score) while pixel data indicating fixed eye focus on or near a camera can result in the eye movement attentiveness machine learning model generating a different attentiveness score (e.g., a high score).

Further, the meeting insight system 102 can determine, as part of the attentiveness data 504, camera enablement data for client devices of a previous video call. In some cases, the meeting insight system 102 determines camera enablement data as a binary indicator of whether a camera at a client device participating in a video call is turned on. For example, the meeting insight system 102 receives data from a client device indicating enablement and/or disablement of a camera. As another example, the meeting insight system 102 analyzes pixel data from a video feed associated with a client device to determine that less than a threshold amount of change is occurring between frames (or between timestamps) to indicate that a camera is not capturing video data (or that a camera is obstructed or blacked out).

As further illustrated in FIG. 5, the meeting insight system 102 generates the knowledge graph 502 from other types of video call data, such as reaction data 506 of previous video calls, including body language data, facial expression data, and eye movement data. Indeed, the meeting insight system 102 can generate the reaction data 506 based on similar indicators to the attentiveness data 504 but using different models (e.g., neural networks) to generate predictions pertaining to reactions of attendees during a video call (e.g., reactions to particular statements, content items, and/or topics). In some cases, the meeting insight system 102 constantly generates and updates the attentiveness data 504 for attentiveness scores of attendees while generating the reaction data 506 for reaction scores at certain points during a video call, such as after a statement, upon detecting sharing of a content item, or when a particular topic is discussed.

To elaborate, the meeting insight system 102 can utilize a body language reaction machine learning model to generate a predicted reaction score from pixel data indicating body positioning of an attendee captured by a camera of a client device. For instance, body language pixel data indicating a sudden jerk of the head and/or a crossing of the arms can result in the body language reaction machine learning model generating a low reaction score. Conversely, pixel data indicating a nodding of the head and a relaxed demeanor results in the body language reaction machine learning model generating a high reaction score.

Additionally, the meeting insight system 102 can utilize an eye movement reaction machine learning model to generate a predicted reaction score from pixel data indicating eye movement of an attendee as captured by a camera of a client device. For instance, eye movement pixel data indicating eye rolls or exasperated eye bulges can result in the eye movement reaction machine learning model generating a low reaction score. On the other hand, pixel data indicating fixed eye focus on or near a camera can result in the eye movement reaction machine learning model generating a high reaction score.

As also shown in FIG. 5, the meeting insight system 102 generates the knowledge graph 502 from other types of video call data, such as meeting data 510. For example, the meeting insight system 102 determines the meeting data 510 specific to a particular previous meeting, including information about an agenda indicating agenda items, target topics, and/or target timestamps for accomplishing the various items or topics. In some cases, the meeting insight system 102 analyzes an agenda associated with a video call to generate individual item goals and/or a target goal to use as video call data for generating the knowledge graph 502.

In addition, the meeting insight system 102 determines tone data as part of the meeting data 510 for a previous meeting (e.g., a previous video call). In particular, the meeting insight system 102 determines or extracts audio data from one or more client devices and utilizes a tone encoder model to encode or generate a tone prediction (e.g., in embedding form). For example, the tone encoder model analyzes audio data, including fluctuations in frequency, cadence, and/or vocabulary to determine a tone for the video call. In some cases, the tone encoder model generates, from the audio data, a tone classification from among potential classification, including frustrated, angry, happy, agreeable, cheery, confused, or questioning.

As further shown, the meeting insight system 102 determines topic data associated with a video call (or another virtual meeting). For example, the meeting insight system 102 determines topic data from audio data captured from microphones of participating client devices. In some cases, the meeting insight system 102 generates topic data indicating discussion topics at various timestamps of a previous video call. The meeting insight system 102 can also generate predicted topics for upcoming video calls based on commonalities with previous video calls, such as shared invitees, similar agendas, and/or similar titles. In certain embodiments, the meeting insight system 102 generates topic data in the form of smart topic data as described in U.S. patent application Ser. Nos. 18/470,885 and 18/470,929.

In one or more embodiments, the meeting insight system 102 generates meeting data 510 in the form of cross talking data. For instance, the meeting insight system 102 generates or determines cross talking data from audio data captured by microphones of participating client devices. Based on the audio data, the meeting insight system 102 determines whether two or more attendees are cross talking (e.g., simultaneously talking for at least a threshold time period). The meeting insight system 102 can generate cross talking data by designating portions of a video call where cross talking occurs. In some cases, the meeting insight system 102 further utilizes the cross talking data to inform the generate of tone data and/or the reaction data 506 (e.g., in the case where attendees are arguing).

As further illustrated in FIG. 5, the meeting insight system 102 generates the knowledge graph 502 based on user account data 512. In particular, the meeting insight system 102 determines the user account data 512, including calendar data indicating scheduling of video calls and other meetings, as well as titles and invitees for the calls and meetings. In addition, the meeting insight system 102 determines topic data for a user account by determining topics of interest indicated by user account activity (e.g., interactions with various content items having particular topics and/or web browser activity regarding certain topics). Along these lines, the meeting insight system 102 can also determine content item interactions for a user account, such as selections, shares, edits, receipts, comments, and clips taken in relation to particular content items.

As also illustrated in FIG. 5, the meeting insight system 102 generates the knowledge graph based on content item data 508. In particular, the meeting insight system 102 determines the content item data 508 to include information, such as content type, creation date and time, creating user account, storage location, accessibility permissions (e.g., which user accounts have permission to access, share, and/or edit), and/or relevant topics associated with a content item. In some cases, the meeting insight system 102 extracts topic data and/or other content item data to determine relationships between content items and/or video calls (e.g., based on shared topics and other shared data).

As shown, the knowledge graph 502 depicts and defines relationships between virtual meetings (e.g., video calls) and content items based on the attentiveness data 504, the reaction data 506, the content item data 508, the meeting data 510, and/or the user account data 512. Indeed, in some cases, the meeting insight system 102 determines each of the above data for an upcoming video call 514. Based on determining these data for the upcoming video call 514 (at least for the data that are available and/or predictable for a video call that has not yet occurred), the meeting insight system 102 further adds the upcoming video call 514 to the knowledge graph 502. In particular, the meeting insight system 102 adds a node for the upcoming video call 514 in a position within the knowledge graph 502 designated by the data of the existing nodes and the new node. The meeting insight system 102 further determines a distance (represented as d in FIG. 5) from the new node of the upcoming video call 514 to a nearest previous video call node to identify or determine a closest corresponding previous video call (e.g., from which to determine a drop-off topic).

In some embodiments, the meeting insight system 102 utilizes the attentiveness data 504, the reaction data 506, the content item data 508, the meeting data 510, and/or the user account data 512 to generate pre-meeting, in-meeting, and/or post-meeting coaching insights. In some cases, the meeting insight system 102 generates and provides interface elements to obtain express permission from user accounts before utilizing smart topic data for generating pre-meeting, in-meeting, and/or post-meeting coaching insights. In addition, the meeting insight system 102 utilizes a clear data storage policy to indicate to user accounts which stored content items are used as sources to generate coaching insights and/or to know what video call data is extracted and used for such purposes. The meeting insight system 102 further provides interface elements and corresponding tooling for up leveling and/or down leveling content items for different privacy levels (e.g., editable by all, editable by specified accounts, accessible by all, and/or accessible by specified accounts). For instance, the meeting insight system 102 can train and utilize a privacy adjustment machine learning model to up level and down level content items to appropriate privacy levels based on levels of similar content items. Thus, if a first content item within a threshold similarity of a second content item has a certain privacy level, the model can predict the same privacy level for the second content item as well.

Figure 6:
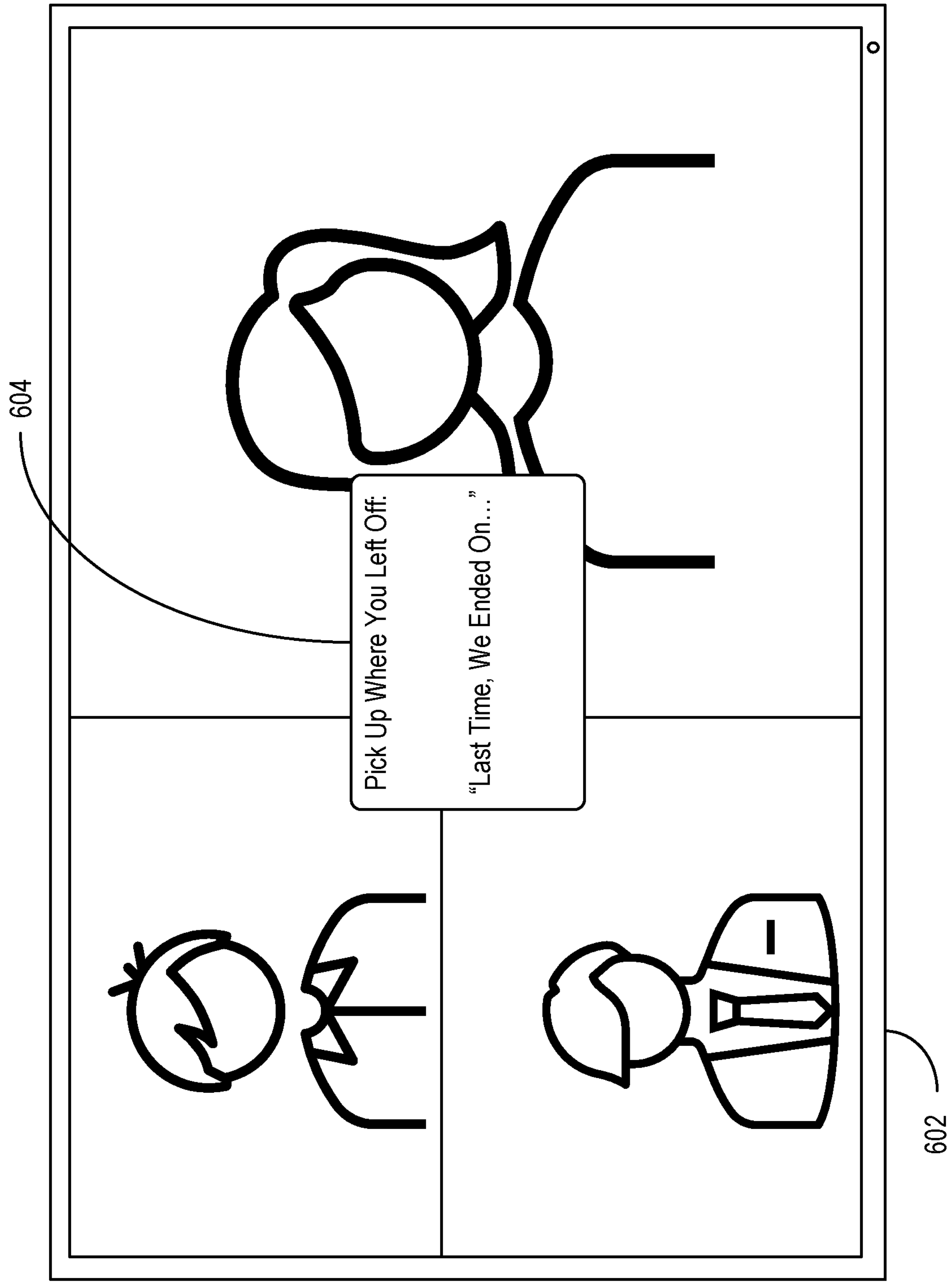
FIG. 6 illustrates an example interface for providing a suggested phrase upon initiation of an upcoming video call in accordance with one or more embodiments.

As mentioned above, in certain described embodiments, the meeting insight system 102 generates coaching insights for an upcoming video call. In particular, the meeting insight system 102 generate a suggested phrase to provide for display on a client device in response to detecting initiation of an upcoming video call. FIG. 6 illustrates an example suggested phrase for an upcoming video call in accordance with one or more embodiments.

As illustrated in FIG. 6, the meeting insight system 102 generates and provides a video call interface for display on a client device 602. Within the video call interface, the meeting insight system 102 further generates and provides a suggested phrase 604 in response to detecting initiation of the upcoming video call corresponding to the depicted video call interface. For example, the meeting insight system 102 generates the suggested phrase 604 as a notification (or some other interface element) overlaying or otherwise accompanying the video streams of the video call interface. As shown, the meeting insight system 102 generates the suggested phrase 604 based on a drop-off topic of a previous (and related) video call. The suggested phrase 604 thus depicts or portrays suggested language for a user to say—"Pick up where you left off: 'Last time, we ended on . . . .'"

Figure 7:
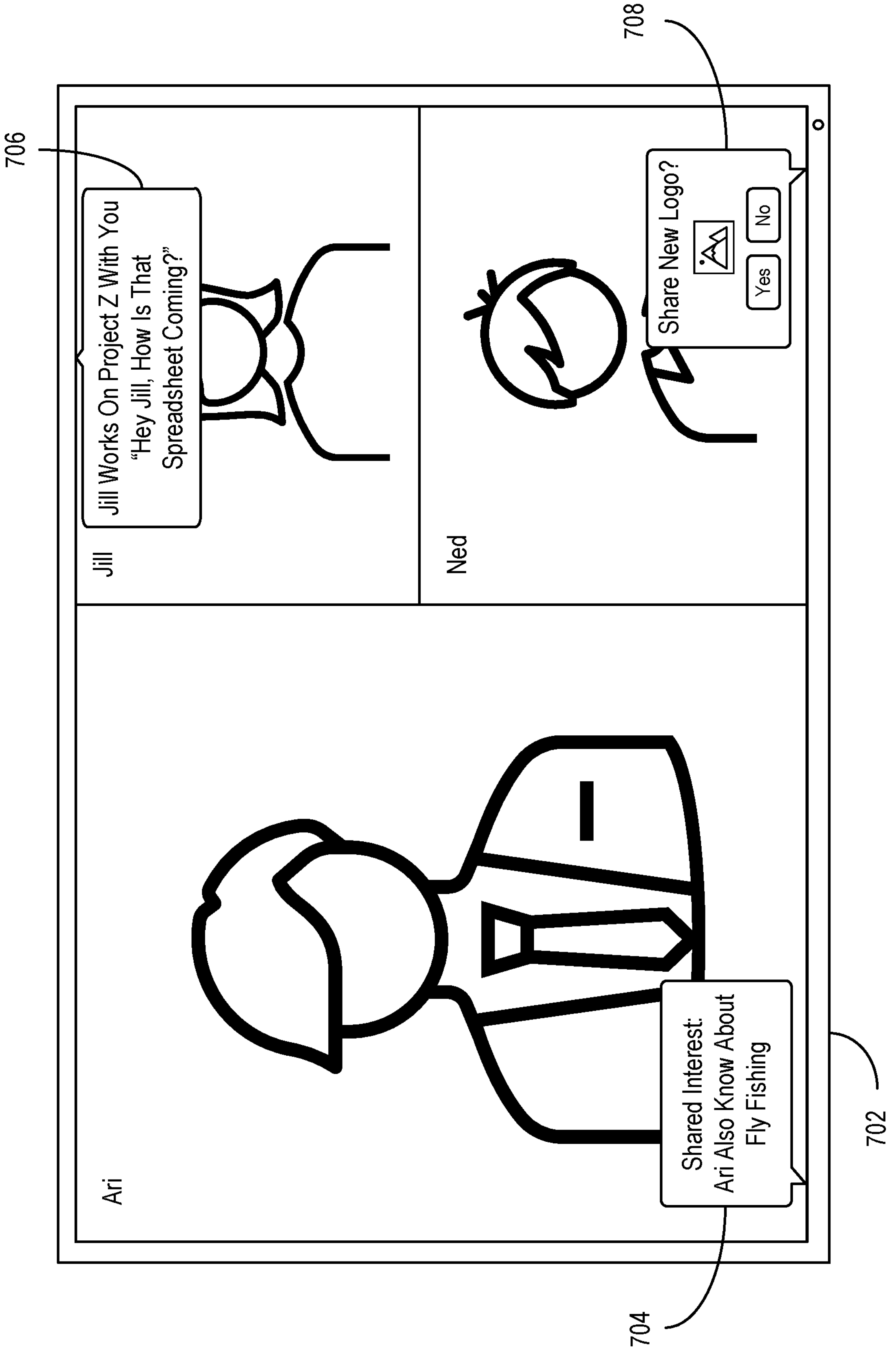
FIG. 7 illustrates an example interface for providing various pre-meeting coaching insights in accordance with one or more embodiments.

As noted, in some embodiments, the meeting insight system 102 generates pre-meeting coaching insights other than (or in addition to) suggested phrases. In particular, the meeting insight system 102 can generate insights based on shared topics of interest, shared content items, and/or other data. FIG. 7 illustrates example pre-meeting coaching insights in accordance with one or more embodiments.

As illustrated in FIG. 7, the meeting insight system 102 generates and provides a video call interface for display on a client device 702. Upon detecting initiation of the upcoming video call for the video call interface, the meeting insight system 102 generates and provides a shared interest insight 704. Particularly, the meeting insight system 102 generates the shared interest insight 704 as a notification indicating a shared interest between an attendee of the upcoming video call and the user account associated with the client device 702. Indeed, the meeting insight system 102 determines the shared interest based on user account data (e.g., indicating interactions with content items on a common topic) as encoded in a knowledge graph, as described above. As shown, the meeting insight system 102 can provide the shared interest insight 704 for display in a portion of the video call interface corresponding to (e.g., presenting or displaying) a video stream for the attendee who shares the common interest with the user account of the client device 702. Indeed, the meeting insight system 102 generates the shared interest insight 704 for display within a portion of the interface where Ari's video stream is displayed because the insight indicates that "Ari also knows about fly fishing."

As also illustrated in FIG. 7, the meeting insight system 102 generates a shared content item notification 706 for display within the video call interface in response to detecting initiation of the upcoming video call. To elaborate, the meeting insight system 102 determines a content item (or a collection of content items corresponding to a particular project or topic) that both the user account (of the client device 702) and an attendee of the upcoming video call access, edit, or otherwise interact with (or have permissions to access, edit, or interact). In some cases, the meeting insight system 102 analyzes a knowledge graph to identify a node for the content item (or the collection) within a threshold distance of nodes for the attendee and the user account (e.g., based on recency, frequency, and number of interactions). The meeting insight system 102 thus generates the shared content item notification 706 to present suggested language relating to the shared content item, Project Z—"Hey Jill, how is that spreadsheet coming?" As shown, the meeting insight system 102 generates the shared content item notification 706 in a portion of the interface corresponding to the video stream of attendee associated with the shared content item.

As further illustrated in FIG. 7, the meeting insight system 102 generates a content sharing recommendation 708 upon detecting initiation of the upcoming video call. More particularly, the meeting insight system 102 generates the content sharing recommendation 708 based on determining or detecting that a drop-off topic of a previous video call related to a particular content item. Indeed, the meeting insight system 102 determines that a previous video call corresponding to the upcoming video call (e.g., closely related within the knowledge graph) left off discussing creation or editing of a particular content item. The meeting insight system 102 thus generates and provides the content sharing recommendation 708 to suggest sharing the relevant content item ("Share new logo?"). As shown, the content sharing recommendation 708 is selectable to share or distribute the content item to client devices of the attendees and/or to present the content item within the video call.

Figure 8:
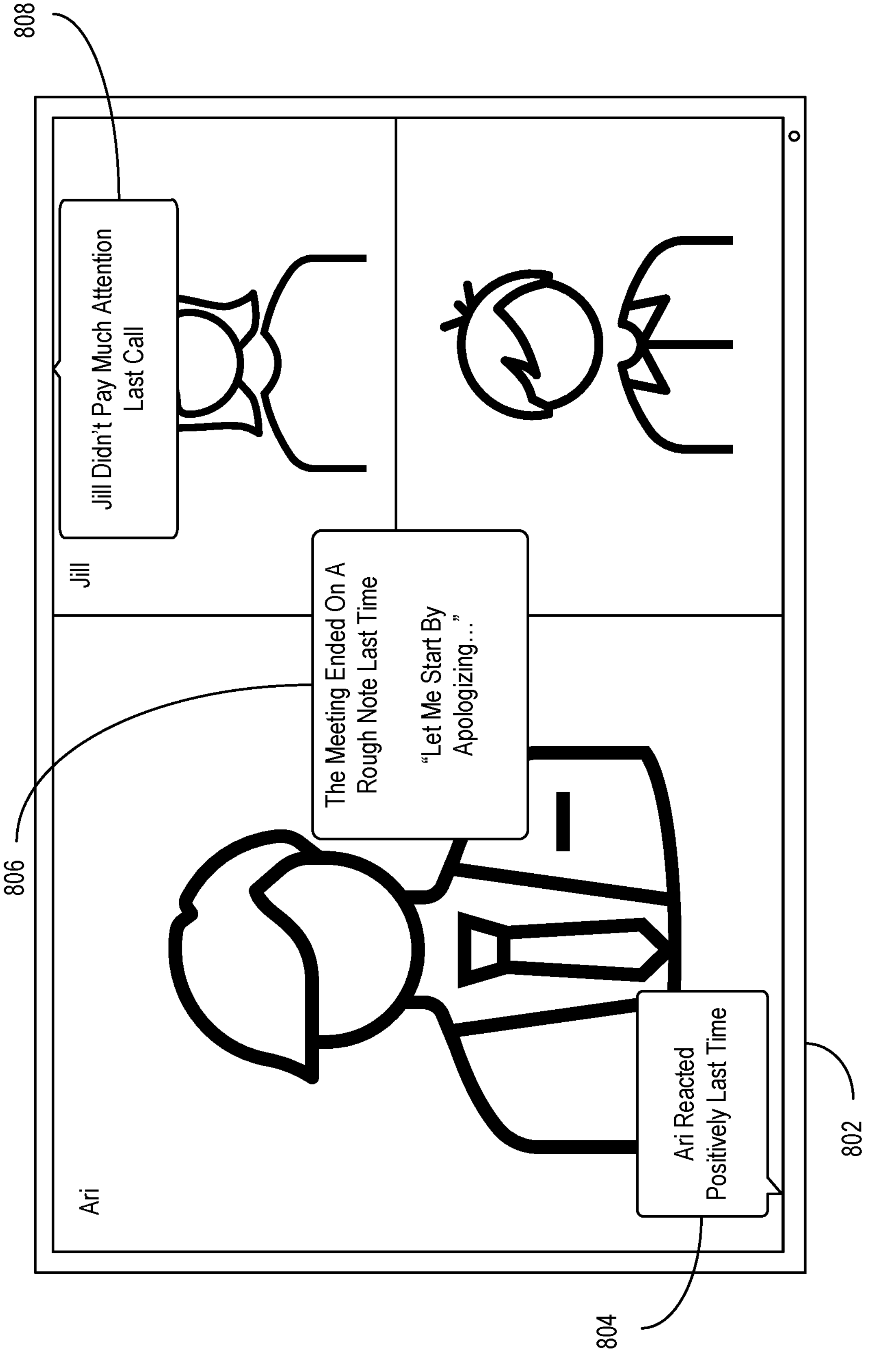
FIG. 8 illustrates an example interface for providing various pre-meeting coaching insights in accordance with one or more embodiments.

As mentioned, in certain embodiments, the meeting insight system 102 generates pre-meeting insights based on tone data. For example, the meeting insight system 102 generates a suggested phrase for an upcoming video call based on tone data from a similar previous video call. FIG. 8 illustrates an example suggested phrase based on tone data in accordance with one or more embodiments.

As illustrated in FIG. 8, the meeting insight system 102 generates and provides a suggested phrase 806 in response to detecting initiation of the upcoming video call. More specifically, the meeting insight system 102 determines a tone for a previous video call within a threshold similarity of the upcoming video call (e.g., whose nodes are a threshold distance of one another in a knowledge graph). For example, the meeting insight system 102 determines a tone of the previous video call at a time of termination. In some cases, the meeting insight system 102 utilizes a tone encoder model to generate or encode a tone embedding for the previous video call at the time of termination. The meeting insight system 102 can further utilize the tone embedding to generate the suggested phrase 806.

To elaborate, the meeting insight system 102 generates the suggested phrase 806 based on the tone of where the previous video call left off. For instance, the meeting insight system 102 utilizes a suggested phrase model to process the tone embedding extracted at termination of the previous meeting. The suggested phrase model thus generates a natural language phrase from the tone embedding ("Let me start by apologizing . . . "). Indeed, the meeting insight system 102 can train the suggested phrase model to generate natural language phrases from various tone embeddings, where the phrases use language addressing or corresponding the extracted tone. The meeting insight system 102 thus generates and provides the suggested phrase 806 for display on the client device 802. In some cases, the meeting insight system 102 generates the suggested phrase 806 based on additional or alterative data as well, such as attentiveness data for various attendees and/or reaction data for various attendees.

As further illustrated in FIG. 8, the meeting insight system 102 generates and provides a reaction notification 804 for display on the client device 802. In particular, the meeting insight system 102 generates the reaction notification 804 based on determining reaction data for a previous video call corresponding to the upcoming video call. In some cases, the meeting insight system 102 analyzes reaction data for a user account that attended the previous video call (and that is also attending the upcoming video call) and generates the reaction notification 804 to reflect the reaction data ("Ari reacted positively last time"). As shown, the meeting insight system 102 provides the reaction notification 804 for display in a portion of the video call interface overlapping or otherwise corresponding to the video stream of the attendee associated with the reaction notification 804.

Additionally, the meeting insight system 102 generates and provides an attentiveness notification 808 for display on the client device 802. More particularly, the meeting insight system 102 generates the attentiveness notification 808 in response to detecting initiation of the upcoming video call and based on attentiveness data from a previous video call corresponding to the upcoming video call. Specifically, the meeting insight system 102 determines a previous video call within a threshold distance of the upcoming video call within a knowledge graph. The meeting insight system 102 further determines attentiveness data for the previous video call and generates the attentiveness notification 808 to reflect the attentiveness data associated with an attendee of the previous video call (who also attends the upcoming video call). As shown, the meeting insight system 102 provides attentiveness notification 808 for display in a portion of the interface corresponding to the attendee associated with the attentiveness data ("Jill didn't pay much attention last call").

In some cases, the meeting insight system 102 can generates additional or alternative pre-meeting insights. For example, the meeting insight system 102 can determine digital communications between user accounts who are attending the upcoming video call, where the digital communications include mentions of a particular topic or a particular content item. The meeting insight system 102 can thus generate a suggested phrase from the digital communication data. Additionally, the meeting insight system 102 can generate a notification to invite a user account to attend the upcoming video call. Indeed, the meeting insight system 102 can determine, from a knowledge graph, that an additional user account is closely related to (e.g., works on content items pertaining to) a drop-off topic of a previous video call where the upcoming video call will pick up. Based on such a determination, the meeting insight system 102 can generate a notification selectable to invite the additional user account to the upcoming video call (and can provide the notification for display upon initiation of the upcoming video call).

FIGS. 1-8, the corresponding text, and the examples provide a number of different systems and methods for generating and providing pre-meeting coaching insights. In addition to the foregoing, implementations can also be described in terms of flowcharts comprising acts steps in a method for accomplishing a particular result. For example, FIG. 9 illustrates an example series of acts for generating and providing pre-meeting coaching insights in accordance with one or more embodiments.

Figure 9:
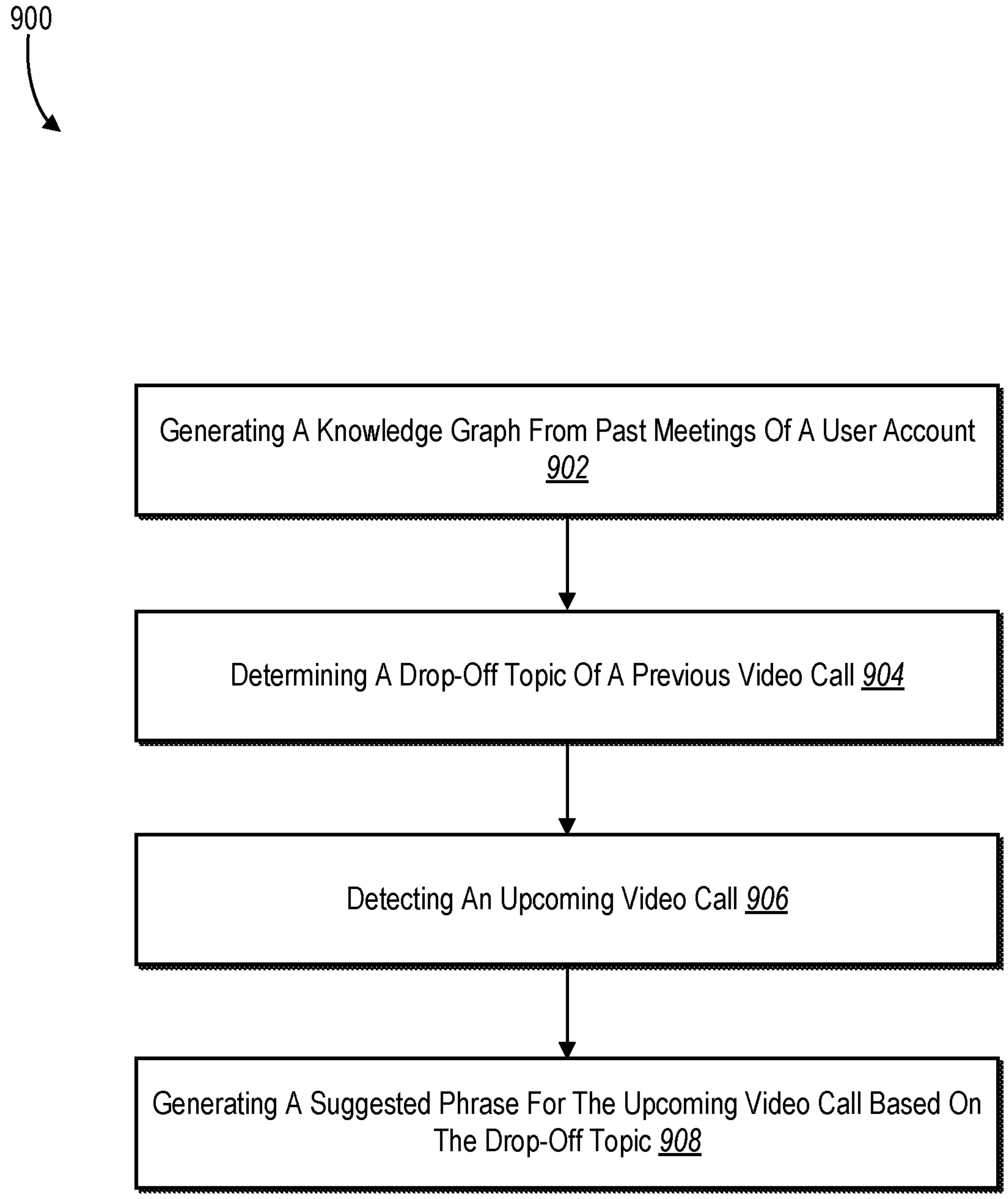
FIG. 9 illustrates an example series of acts for generating and providing pre-meeting coaching insights in accordance with one or more embodiments.

While FIG. 9 illustrates acts according to certain implementations, alternative implementations may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further implementations, a system can perform the acts of FIG. 9.

As illustrated in FIG. 9, the series of acts 900 may include an act 902 of generating a knowledge graph from past meetings of a user account. In particular, the act 902 can involve generating, from meeting data extracted from past meetings associated with a user account of a content management system, a knowledge graph defining relationships between the past meetings for the user account. In addition, the series of acts 900 can include an act 904 of determining a drop-off topic of a previous video call. Particularly, the act 904 can involve determining, from video call data of a previous video call associated with the user account, a drop-off topic comprising a topic discussed by attendees at termination of the previous video call. As shown, the series of acts 900 can include an act 906 of detecting an upcoming video call. In particular, the act 906 can involve detecting, for the user account of the content management system, an upcoming video call corresponding to the previous video call based on the knowledge graph defining the relationships between the past meetings. As further shown, the series of acts 900 can include an act 908 of generating a suggested phrase for the upcoming video call based on the drop-off topic. Particularly, the act 908 can involve generating, for display on a client device of the user account in response to initiating the upcoming video call, a suggested phrase corresponding to the drop-off topic.

In some embodiments, the series of acts 900 includes an act of generating the knowledge graph by: extracting, from past video calls, video call data comprising one or more of attentiveness data, reaction data, or cross talking data, and generating, from the video call data, nodes representing the past video calls and edges connected the nodes to represent relationships between the past video calls. The series of acts 900 can also include an act of determining that the upcoming video call corresponds to the previous video call by determining a distance from a first node representing the previous video call within the knowledge graph to a second node representing the upcoming video call within the knowledge graph.

In one or more embodiments, the series of acts 900 includes an act of generating the suggested phrase by: determining a tone of conversation at termination of the previous video call and generating the suggested phrase for the upcoming video call based on the tone of the conversation at termination of the previous video call. In some cases, the series of acts 900 includes an act of generating the suggested phrase by: determining a content item modified by an additional user account attending the upcoming video call, wherein the content item is also accessible by the user account and generating the suggested phrase to mention the content item modified by the additional user account.

The series of acts 900 can include an act of determining a topic of interest associated with an additional user account attending the upcoming video call. The series of acts 900 can also include an act of generating, for display on the client device during the upcoming video call, an insight notification indicating the topic of interest for the additional user account. The series of acts 900 can further include an act of determining a content item to share within the upcoming video call based on the video call data of the previous video call.

In some embodiments, the series of acts 900 includes an act of determining the drop-off topic by utilizing a topic encoding model to generate a topic embedding from the video call data at the termination of the previous video call. The series of acts 900 can also include an act of determining, from the knowledge graph, a topic of a previous video call between the user account and an additional user account attending the upcoming video call and an act of generating, for display on the client device during the upcoming video call, an insight notification indicating the topic of the previous video call.

In addition, the series of acts 900 can include an act of extracting, from the video call data of the previous video call, a first set of body language data for a first attendee and a second set of body language data for a second attendee. The series of acts 900 can also include an act of determining a first attentiveness score for the first attendee from the first set of body language data and a second attentiveness score for the second attendee from the second set of body language data. Further, the series of acts 900 can include an act of generating a notification for display on the client device based on the first attentiveness score and the second attentiveness score.

In some embodiments, the series of acts 900 includes an act of extracting, from the video call data of the previous video call, a first set of eye movement data for a first attendee and a second set of eye movement data for a second attendee. The series of acts 900 can also include an act of determining a first attentiveness score for the first attendee from the first set of eye movement data and a second attentiveness score for the second attendee from the second set of eye movement data. The series of acts 900 can further include an act of generating the suggested phrase based on the first attentiveness score and the second attentiveness score.

The series of acts 900 can include an act of determining, from the video call data of the previous video call, a first attentiveness score for a first attendee whose camera is enabled and a second attentiveness score for a second attendee whose camera is disabled. The series of acts 900 can also include an act of generating the suggested phrase based on the first attentiveness score and the second attentiveness score. The series of acts 900 can further include an act of generating the knowledge graph by: identifying one or more previous video calls comprising shared attendees and determining, from video call data of the one or more previous video calls, a frequency of a topic mentioned by the shared attendees.

In certain cases, the series of acts 900 includes an act of generating the knowledge graph by: extracting, from the past meetings of the user account, meeting data comprising one or more of attendees of the past meetings, invitees of the past meetings, and calendar data indicating scheduling and location of the past meetings, and generating, from the meeting data, nodes representing the past meetings and edges connected the nodes to represent relationships between the past meetings. The series of acts 900 can also include an act of generating the knowledge graph by: determining digital communications between user accounts comprising mentions of the past meetings, determining content items stored for user accounts comprising data associated with the past meetings, and generating, based on the digital communications and the content items, nodes representing the past meetings, the digital communications, and the content items and edges connected the nodes to represent relationships between the past meetings, the digital communications, and the content items.

The series of acts 900 can also include an act of generating the suggested phrase by: generating a tone embedding by utilizing a tone encoder model to process the video call data from the previous video call, wherein the video call data includes audio information, facial expression information, and body language information, and generating the suggested phrase based on the tone embedding. In some embodiments, the series of acts 900 includes an act of generating, from the video call data of the previous video call, a reaction score for an attendee of the previous video call based on one or more of body language data or facial expression data. In these or other embodiments, the series of acts 900 includes an act of generating the suggested phrase based on the reaction score. The series of acts 900 can also include acts of determining, from the knowledge graph, an additional user account associated with the drop-off topic and generating, for display on the client device, a notification for inviting the additional user account to attend the upcoming video call.

Generating and Providing In-Meeting Coaching Insights

Figure 10:
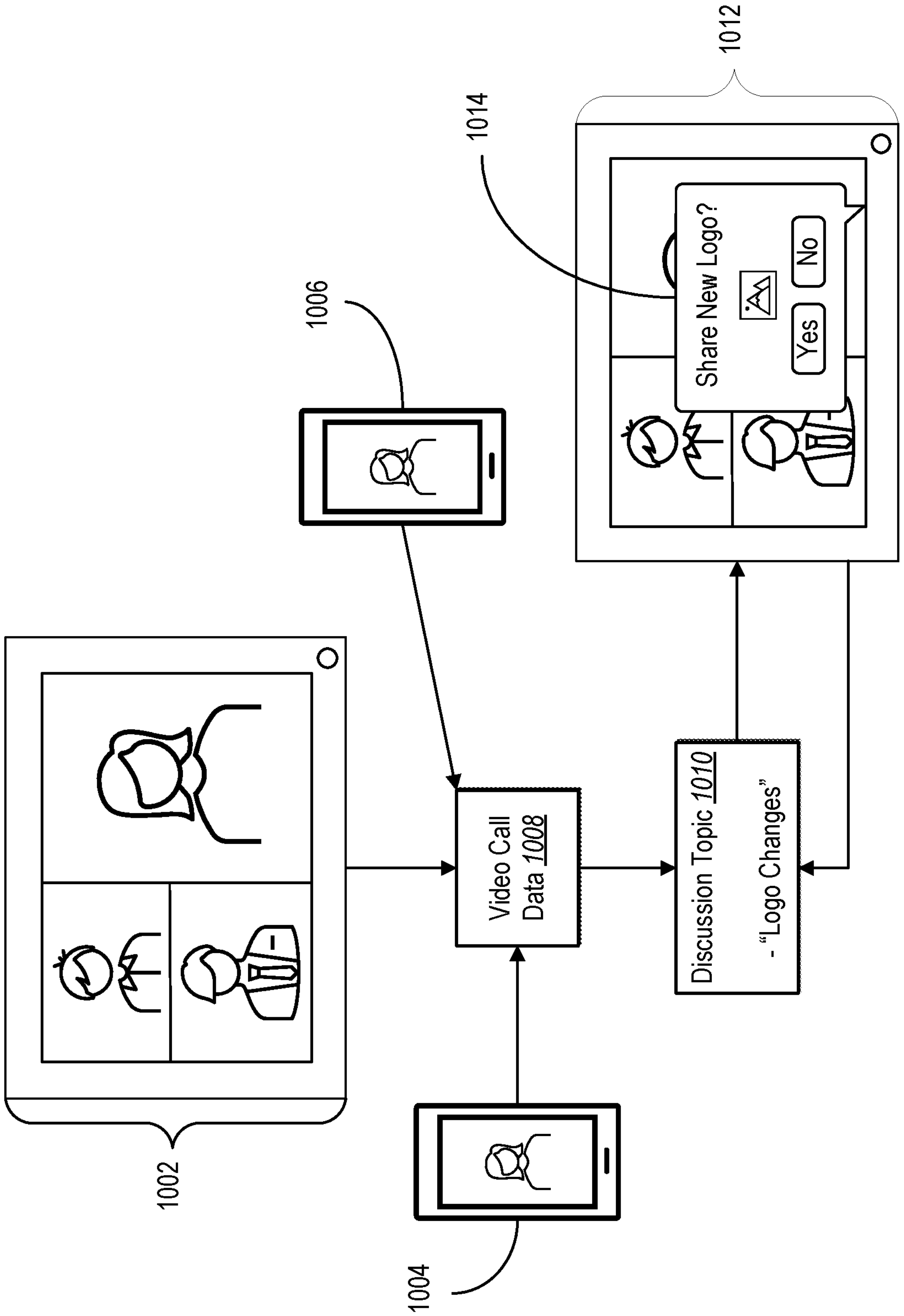
FIG. 10 illustrates an example overview of generating and providing in-meeting coaching insights for an ongoing video call in accordance with one or more embodiments.

As mentioned above, in certain embodiments, the meeting insight system 102 generates and provides in-meeting coaching insights. In particular, the meeting insight system 102 generates in-meeting coaching insights, such as suggested phrases and content item recommendations, based on video call data for an ongoing video call and/or video call data from previous video calls. FIG. 10 illustrates an overview of generating and providing in-meeting insights in accordance with one or more embodiments. Additional detail regarding the various acts and processes introduced in FIG. 10 is provided thereafter in relation to subsequent figures.

As illustrated in FIG. 10, the meeting insight system 102 generates or extracts video call data 1008 from one or more past video calls, such as the previous video call 1002, the previous video call 1004, and the previous video call 1006. Indeed, the meeting insight system 102 identifies past video calls associated with a user account and further determines the video call data 1008 for the past video calls.

In addition, the meeting insight system 102 monitors and extracts video call data from an ongoing video call 1012. Specifically, the meeting insight system 102 extracts video call data indicating a discussion topic 1010 that is currently being discussed during the ongoing video call 1012. The meeting insight system 102 further processes the video call data 1008 to identify content items, user accounts, and/or previous video calls corresponding to the discussion topic 1010. For instance, the meeting insight system 102 determines, from the video call data 1008, a content item relevant to the discussion topic 1010. The meeting insight system 102 thus generates a content item recommendation 1014 for display during the ongoing video call 1012 to suggest sharing the relevant content item ("Share new logo?"). The meeting insight system 102 can also generate and provide other types of in-meeting coaching insights as well.

Figure 11:
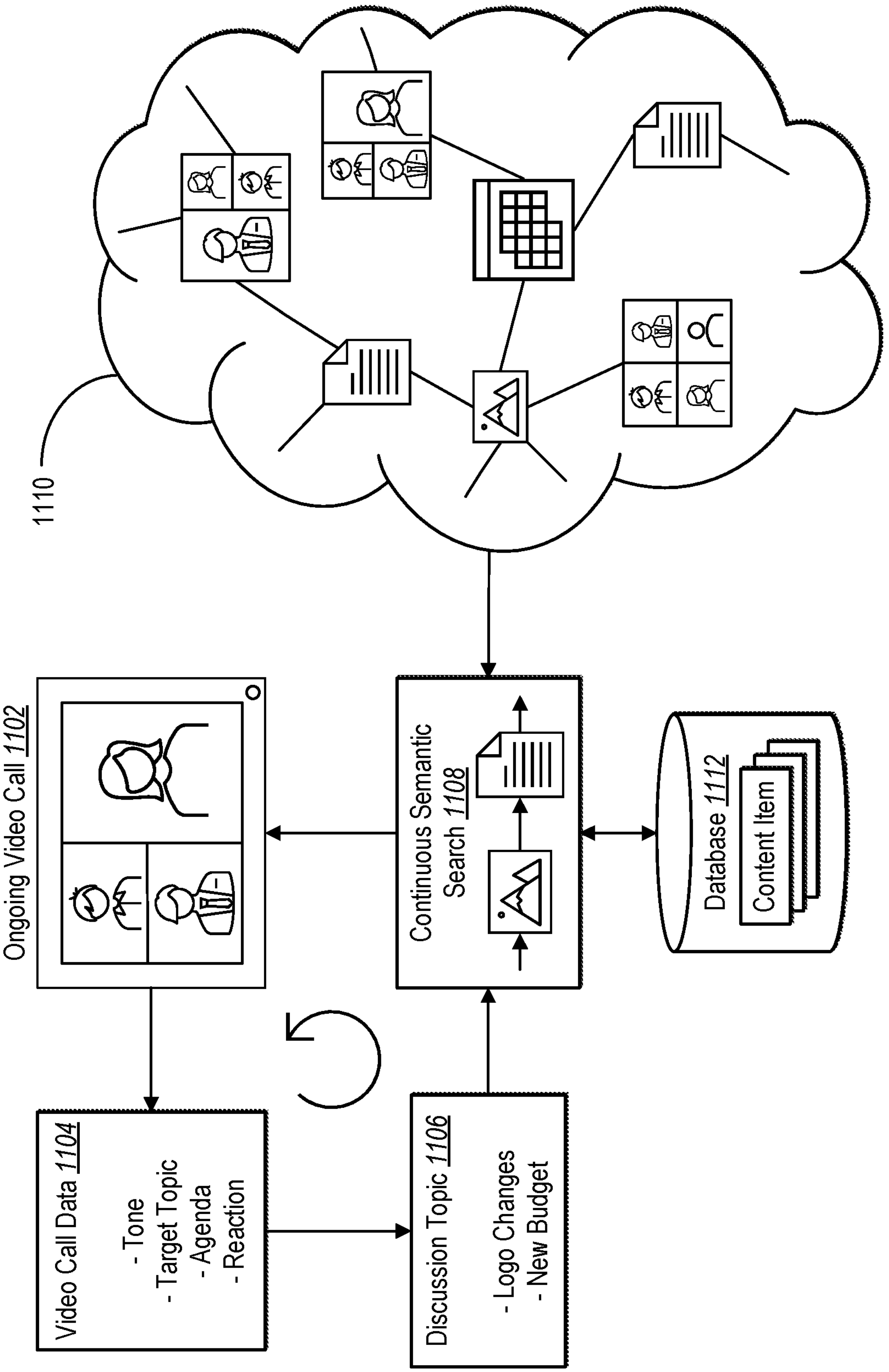
FIG. 11 illustrates an example diagram for performing a continuous semantic search to identify content items relevant to an ongoing video call in accordance with one or more embodiments.

As just mentioned, in certain described embodiments, the meeting insight system 102 can identify content items corresponding to discussion topics of an ongoing video call. In particular, the meeting insight system 102 can perform a continuous semantic search throughout the duration of an ongoing video call to identify stored content items that correspond to various discussion topics over time. FIG. 11 illustrates an example diagram for performing a continuous semantic search to identify content items corresponding to discussion topics of an ongoing video call in accordance with one or more embodiments.

As illustrated in FIG. 11, the meeting insight system 102 detects or identifies an ongoing video call 1102. More specifically, the meeting insight system 102 detects that one or more client devices are currently capturing and streaming audio and/or video data for a video call. In addition, the meeting insight system 102 determines, generates, or extracts video call data 1104 from the ongoing video call 1102. Particularly, the meeting insight system 102 extracts video call data, such as tone data, a target topic, other agenda data, reaction data, attentiveness data, and/or other video call data described above. As further shown, the meeting insight system 102 analyzes the video call data to determine a discussion topic 1106. In particular, the meeting insight system 102 utilizes a topic prediction model to generate a predicted discussion topic for the ongoing video call 1102 based on current (e.g., contemporaneous or real-time) audio data captured by client devices. As shown, example discussion topics include logo changes, new budget, or other topics.

As further illustrated in FIG. 11, the meeting insight system 102 performs a continuous semantic search 1108. To elaborate, the meeting insight system 102 continually performs a search of a database 1112 (e.g., the database 114) storing content items associated with a user account of the content management system 106. More specifically, the meeting insight system 102 searches the database 1112 to identify content items relating to the discussion topic 1106, as indicated by the knowledge graph 1110. Indeed, as part of the continuous semantic search 1108, the meeting insight system 102 analyzes the knowledge graph 1110 to identify nodes representing content items corresponding to (e.g., within a threshold distance of a node representing) the discussion topic 1106. The meeting insight system 102 thus accesses the identified content item(s) from the database 1112 to recommend sharing within the ongoing video call 1102.

As shown, the meeting insight system 102 continually updates the continuous semantic search 1108 over time. For example, as the ongoing video call 1102 progresses, the meeting insight system 102 extracts new video call data associated with different timestamps of the ongoing video call 1102. From the updated video call data, the meeting insight system 102 generates an updated discussion topic. The meeting insight system 102 can thus update the continuous semantic search 1108 to analyze the knowledge graph 1110 to identify nodes within a threshold similarity of the updated discussion topic. Additionally, the meeting insight system 102 can access content items corresponding to the nodes from the database 1112. In some cases, if the meeting insight system 102 identifies multiple nodes within a threshold similarity/distance, the meeting insight system 102 selects a closest node and generates a corresponding recommendation for sharing the associated content item.

Figure 12:
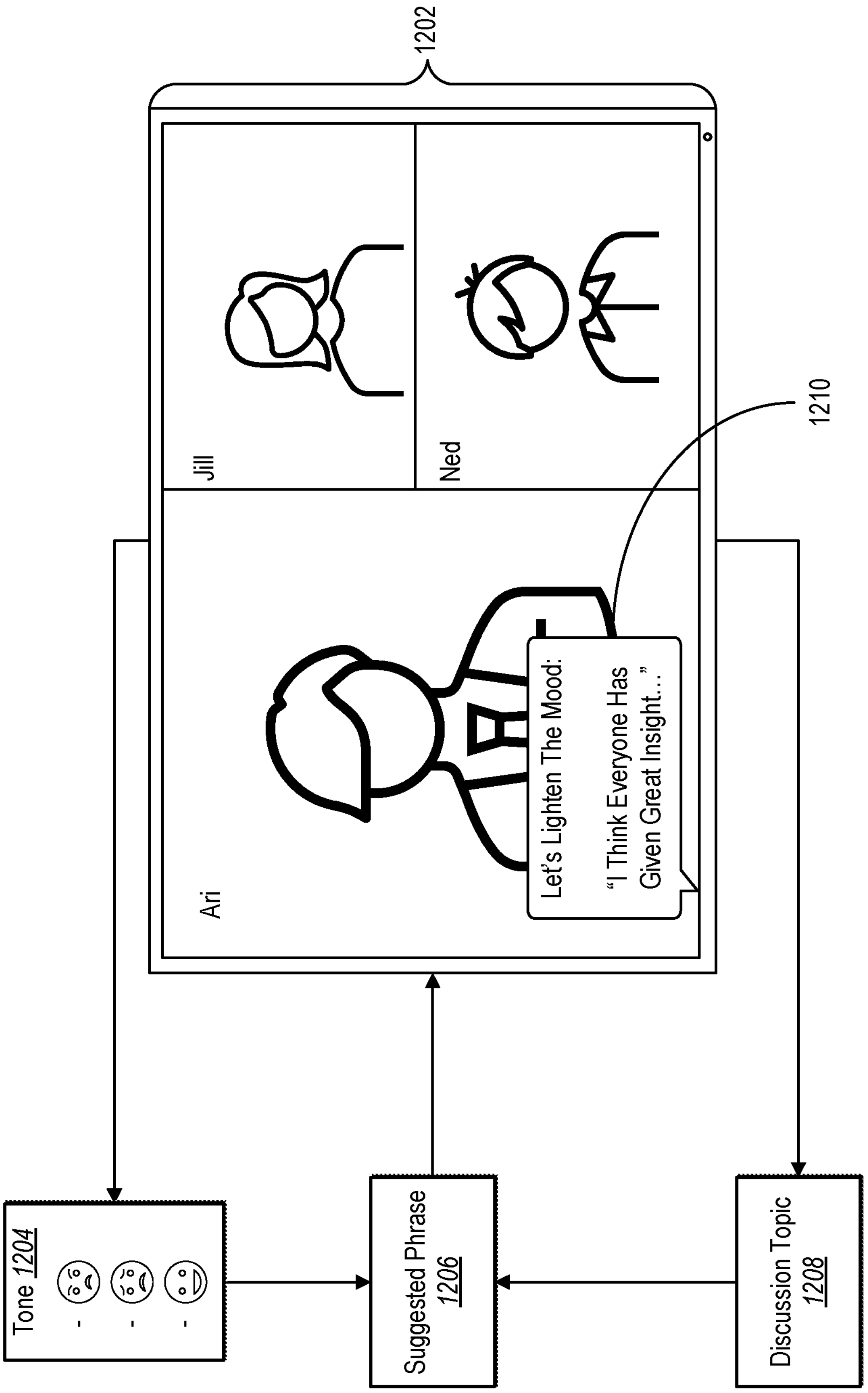
FIG. 12 illustrates an example diagram for generating and providing a suggested phrase for an ongoing video call in accordance with one or more embodiments.

As mentioned, in certain embodiments, the meeting insight system 102 generates in-meeting insights for display during an ongoing video call. In particular, the meeting insight system 102 generates in-meeting insights, such as suggested phrases, based on various video call data. FIG. 12 illustrates an example diagram for generating an example suggested phrase based on tone data in accordance with one or more embodiments.

As illustrated in FIG. 12, the meeting insight system 102 analyzes video call data for an ongoing video call 1202. For example, the meeting insight system 102 analyzes video call data, such as camera data, microphone data, user account data, and/or types of video call data described above. From the video call data, the meeting insight system 102 determine or extracts a tone 1204. For instance, the meeting insight system 102 analyzes body language data, eye movement data, facial expression data, sentence structure data, volume data, and/or vocabulary data. As an example, the meeting insight system 102 analyzes the video call data to determine a positive tone for some vocabulary accompanied by certain facial expressions and/or to determine a negative tone for other vocabulary accompanied by other facial expressions. Indeed, the meeting insight system 102 can analyze any combination of video call data to determine the tone 1204.

In some cases, the meeting insight system 102 extracts or encodes the tone 1204 in the form of a tone embedding using a tone encoder model. Specifically, the tone encoder model can process video call data to generate a tone embedding and/or to generate a tone classification. Indeed, the tone encoder model can determine a tone classification from among potential classification, including frustrated, angry, happy, agreeable, cheery, confused, or questioning (or others).

As further illustrated in FIG. 12, the meeting insight system 102 analyzes video call data of the ongoing video call 1202 to determine a discussion topic 1208. More particularly, the meeting insight system 102 determines a discussion topic 1208 discussed by attendees of the ongoing video call 1202 at a particular (e.g., current) timestamp. For instance, the meeting insight system 102 utilizes a topic prediction model to generate or predict the discussion topic 1208 from extracted video call data. In some cases, the topic prediction model processes video call data, including audio data captured by microphones of participating client devices and/or natural language data extracted from the captured audio data.

Additionally, the meeting insight system 102 utilizes the discussion topic 1208 and the tone 1204 to generate a suggested phrase 1206. For instance, the meeting insight system 102 generates the suggested phrase 1206 to correspond to (e.g., include a mention of) the discussion topic 1208 and to include language associated with (e.g., maintaining or changing) the tone 1204. In some cases, the meeting insight system 102 utilizes a suggested phrase model to generate the suggested phrase 1206 by processing the discussion topic 1208 (e.g., in embedding form or natural language form) and/or the tone 1204 (e.g., in embedding form or natural language form).

As shown, the meeting insight system 102 generates a notification 1210 for display on a client device during the ongoing video call 1202. Specifically, the meeting insight system 102 generates the notification 1210 to depict or portray the suggested phrase 1206 during the ongoing video call 1202. Thus, the meeting insight system 102 provides a recommendation for correcting or changing (or maintaining) the tone 1204 as it relates to the discussion topic 1208. As shown, the meeting insight system 102 generates the notification 1210 to include the suggested phrase "I think everyone has given great insight . . . ." As indicated the unshown portion of the phrase may help lighten the mood of the ongoing video call 1202.

Figure 13:
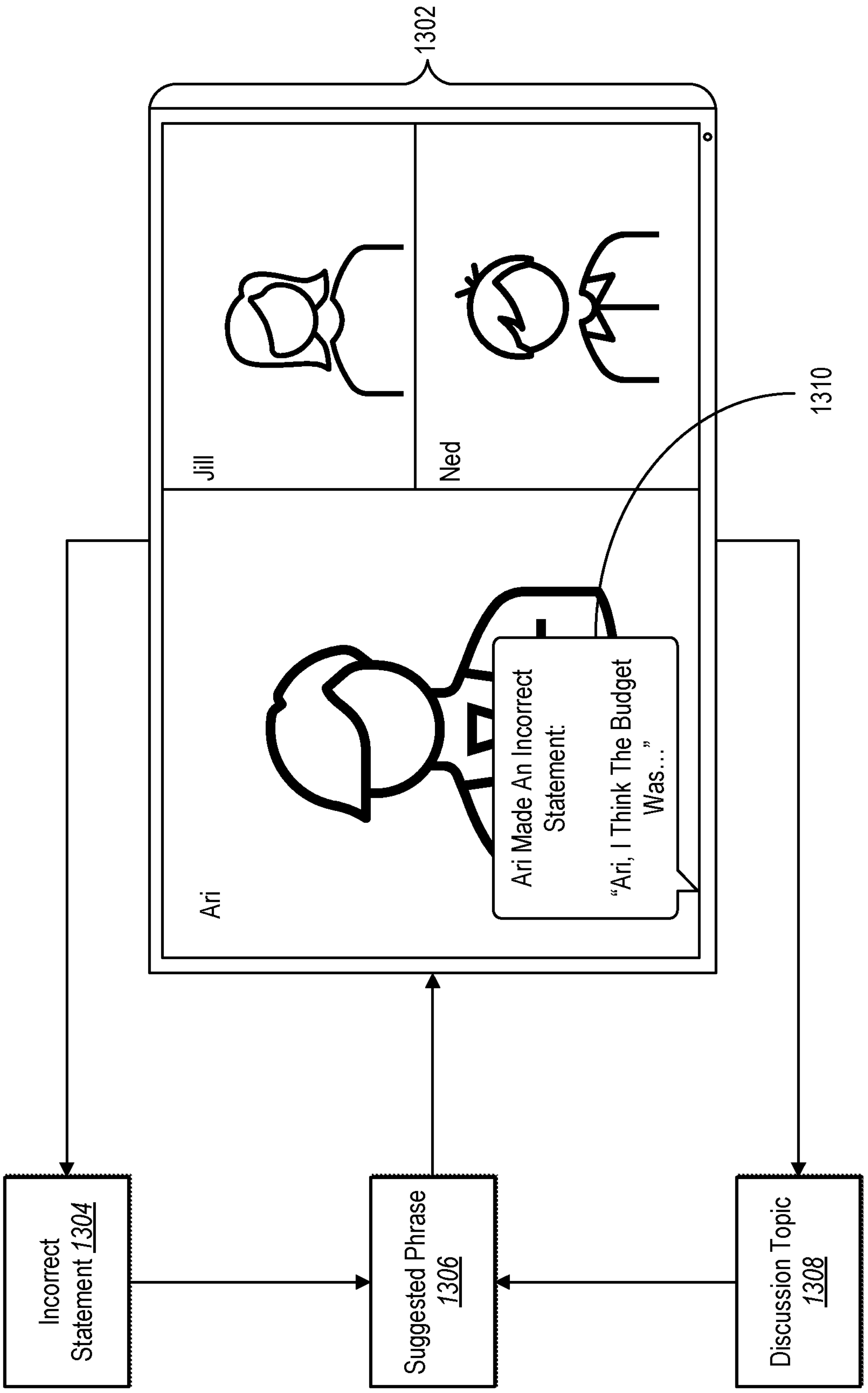
FIG. 13 illustrates an example diagram for generating and providing a suggested phrase for an ongoing video call in accordance with one or more embodiments.

As mentioned above, in certain embodiments, the meeting insight system 102 generates other in-meeting insights as well. For example, the meeting insight system 102 generates an in-meeting insight to correct an incorrect statement made during an ongoing video call. FIG. 13 illustrates an example diagram for generating and providing a suggested phrase for correcting an incorrect statement in accordance with one or more embodiments.

As illustrated in FIG. 13, the meeting insight system 102 analyzes video call data for an ongoing video call 1302. In particular, the meeting insight system 102 analyzes video call data to determine a discussion topic 1308. As described above, the meeting insight system 102 determines the discussion topic from audio data captured from client devices participating in the ongoing video call 1302 (e.g., using a topic prediction model).

In addition, the meeting insight system 102 analyzes video data to determine an incorrect statement 1304. More specifically, the meeting insight system 102 determines or detects the incorrect statement 1304 by analyzing audio data and/or natural language data captured by client devices participating in the ongoing video call 1302. Indeed, the meeting insight system 102 can compare the natural language data of video call discussions with known data pertaining to the discussion topic 1308. For instance, the meeting insight system 102 compares data within one or more content items (used as truth sources) to with statements made during the ongoing video call 1302. In some embodiments, the meeting insight system 102 provides statements made during the ongoing video call 1302 to a large language model (e.g., as natural language prompts), whereupon the large language model can indicate veracity of the statement. In some cases, the meeting insight system 102 determines the incorrect statement 1304 relating to the discussion topic 1308.

Based on determining the incorrect statement 1304 and the discussion topic 1308, the meeting insight system 102 further generates a suggested phrase 1306. In particular, the meeting insight system 102 generates the suggested phrase 1306 to include language corresponding to the discussion topic 1308 and correcting the incorrect statement 1304. For instance, the meeting insight system 102 generates the suggested phrase 1306 shown in the notification 1310. Indeed, as shown, the meeting insight system 102 generates the notification 1310 to depict or portray the suggested phrase 1306 ("Ari, I think the budget was . . . "). In some cases, the meeting insight system 102 provides the notification for display in a portion of the video call interface corresponding to the user account that made the incorrect statement (e.g., overlapping Ari's video stream).

Figure 14:
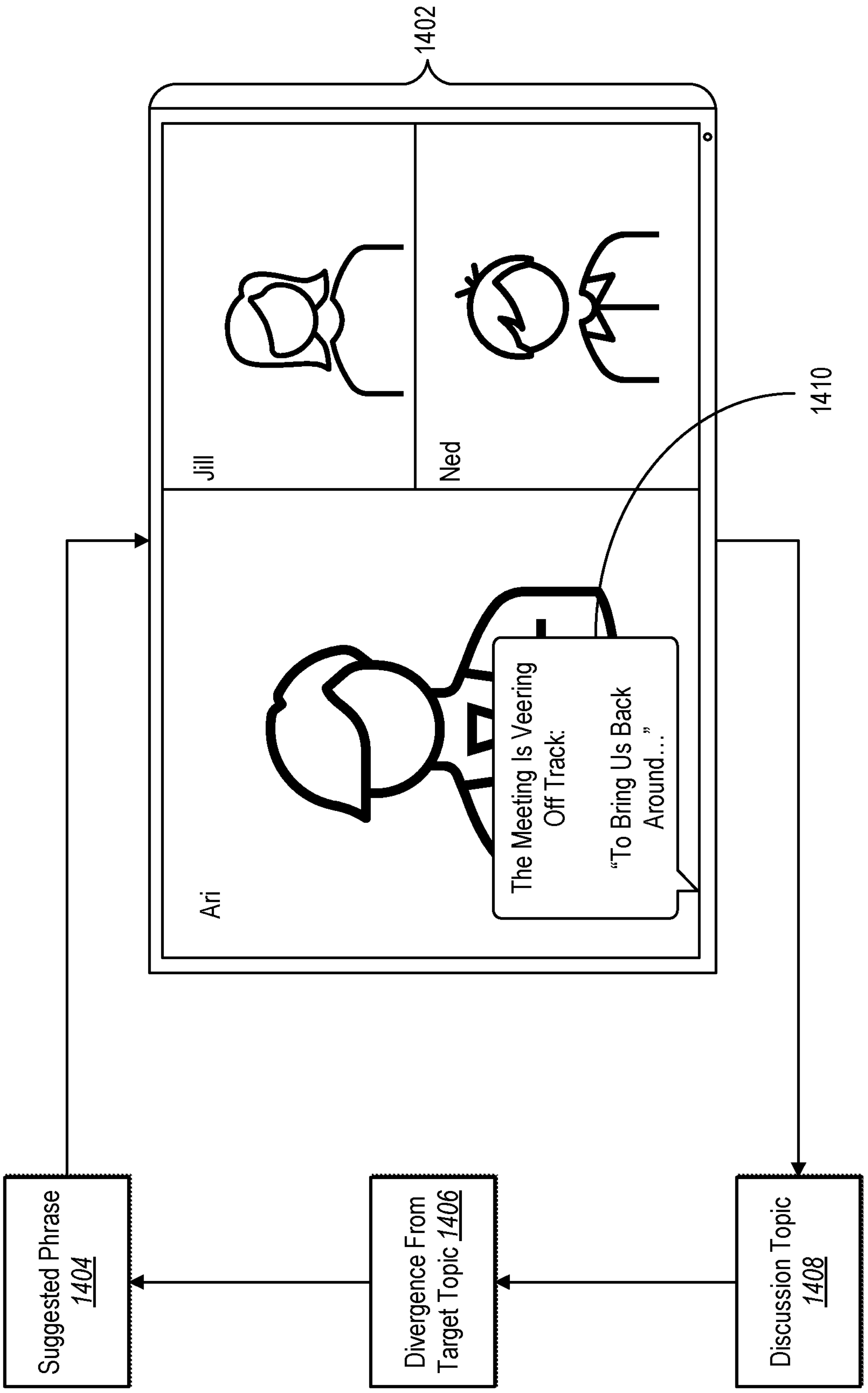
FIG. 14 illustrates an example diagram for generating and providing a suggested phrase for an ongoing video call in accordance with one or more embodiments.

As noted above, in certain embodiments, the meeting insight system 102 generates and provides a suggested phrase to bring a video call back on track. For example, the meeting insight system 102 can detect divergence from a target topic and can provide a suggested phrase to return the conversation to the target topic. FIG. 14 illustrates an example diagram for generating and providing a suggested phrase for remedying divergence from a target topic in accordance with one or more embodiments.

As illustrated in FIG. 14, the meeting insight system 102 analyzes video call data for an ongoing video call 1402. For example, the meeting insight system 102 determines a discussion topic 1408 from the ongoing video call 1402, as described above. In addition, the meeting insight system 102 determines a divergence 1406 from a target topic. To elaborate, the meeting insight system 102 determines a target topic from video call data of the ongoing video call 1402. For instance, the meeting insight system 102 analyzes an agenda associated with the ongoing video call 1402 to determine one or more agenda items and utilizes a target topic model to generate topic embeddings for the agenda items and/or an average topic embedding from the item embeddings to represent an overall target topic.

The meeting insight system 102 further utilizes the target topic model to encode the discussion topic 1408 (and other discussion topics as they chance over time) for comparing with the target topic embedding. The meeting insight system 102 thus determines a distance of the discussion topic embedding from the target topic embedding. Upon determining that the distance in embedding space exceeds a threshold distance, the meeting insight system 102 determines or detects the divergence 1406 from the target topic.

In response to detecting the divergence 1406 from the target topic, the meeting insight system 102 generates the suggested phrase 1404. In particular, the meeting insight system 102 generates the suggested phrase 1404 to include language for prompting attendees to return the conversation to the target topic. As shown, the meeting insight system 102 generates a notification 1410 for display within a video call interface of the ongoing video call 1402. The notification 1410 depicts language of the suggested phrase 1404 ("To bring us back around . . . ") along with an indication that the ongoing video call 1402 has veered off track of the target topic.

Figure 15:
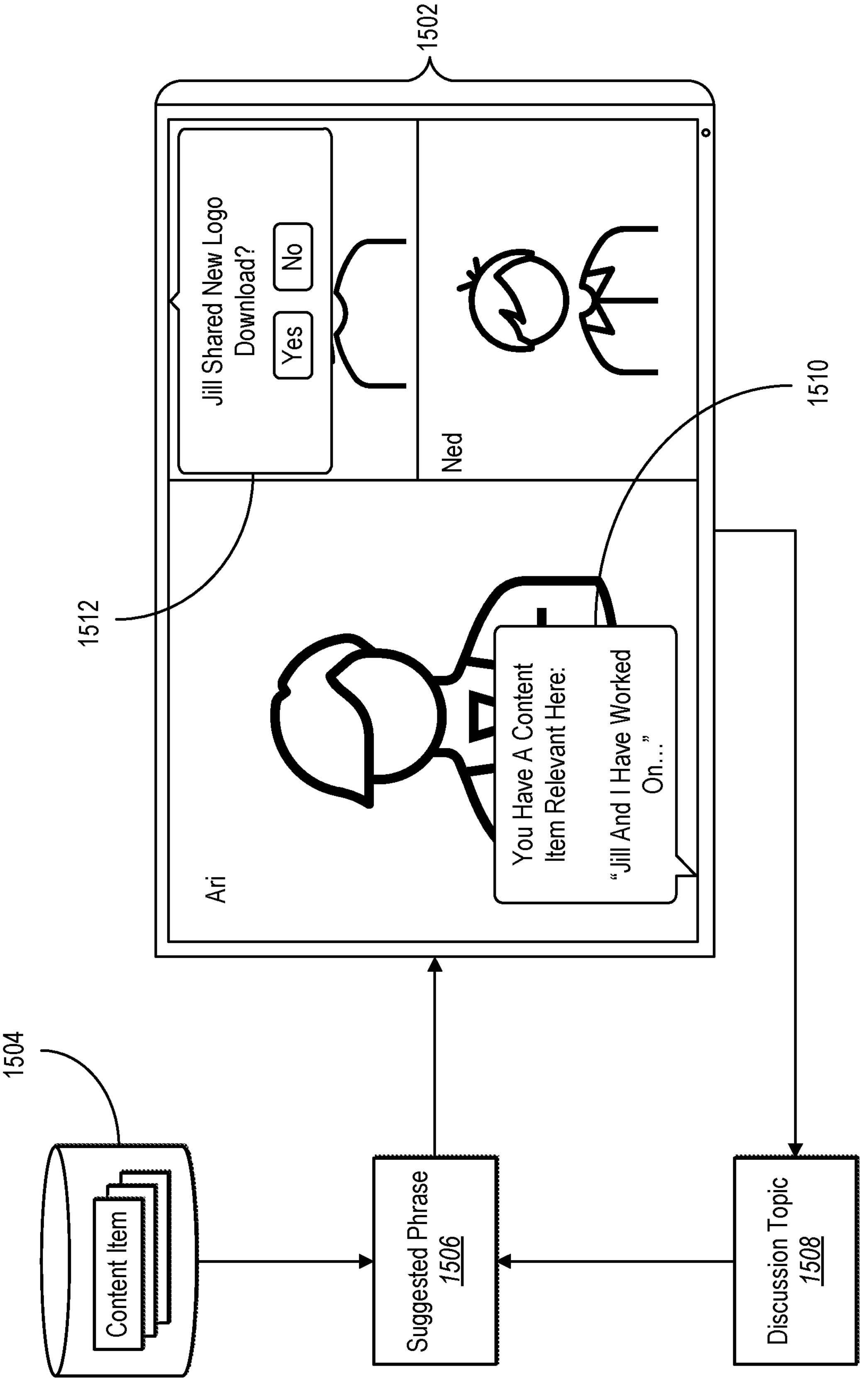
FIG. 15 illustrates an example diagram for generating and providing various in-meeting coaching insights for an ongoing video call in accordance with one or more embodiments.

As mentioned above, in certain described embodiments, the meeting insight system 102 generates in-meeting coaching insights for sharing relevant content items and/or receiving content items shared by other devices. In particular, the meeting insight system 102 can determine a content item that corresponds to a discussion topic and can generate a notification selectable to share the content item to devices of other attendees. FIG. 15 illustrates an example diagram for generating and providing content item sharing notifications for an ongoing video call in accordance with one or more embodiments.

As illustrated in FIG. 15, the meeting insight system 102 analyzes video call data for an ongoing video call 1502. From the video call data, the meeting insight system 102 generates or determines a discussion topic 1508 that indicates a topic currently discussed by attendees. In some cases, as described above, the meeting insight system 102 extracts or encodes a discussion topic embedding from the discussion topic 1508 to represent the discussion topic 1508 in embedding space.

As further illustrated in FIG. 15, the meeting insight system 102 analyzes content items stored in a repository 1504 (e.g., the database 114). Specifically, the meeting insight system 102 analyzes content items to determine or identify content items corresponding to the discussion topic 1508 (e.g., relating to a common or similar topic). In some embodiments, the meeting insight system 102 analyzes the content items in the repository 1504 by extracting or encoding content item embeddings within the same embedding space as the topic embedding of the discussion topic 1508. The meeting insight system 102 can thus determine distances from the content item embeddings to the topic embedding for comparison. In some embodiments, the meeting insight system 102 identifies one or more content items within a threshold similarity (e.g., a threshold distance) of the discussion topic 1508 (based on the distance determination) and selects at least one content item to recommend for sharing (e.g., a content item with a shortest distance from among those within the threshold similarity). In these or other embodiments, the repository 1504 stores content items (within the content management system 106) for a particular user account and/or that are collectively accessible by multiple user accounts participating the ongoing video call 1502.

As shown, the meeting insight system 102 can further generate a suggested phrase 1506 corresponding to an identified content item. To elaborate, the meeting insight system 102 can identify a content item similar to the discussion topic 1508 and can generate the suggested phrase 1506 to include language mentioning the similar content item. For example, the meeting insight system 102 generates a notification 1510 for display within a video call interface of the ongoing video call 1502. The notification 1510 includes language from the suggested phrase 1506 indicating or mentioning a content item identified as relevant to the discussion topic 1508 ("Jill and I have worked on . . . ").

Additionally, in one or more embodiments, the meeting insight system 102 can generate and provide a shared item notification 1512. More particularly, the meeting insight system 102 can detect that a user account attending the ongoing video call 1502 has requested to share a content item. In response, the meeting insight system 102 generates the shared item notification 1512 along with selectable options for accepting (downloading) the content item or not. As shown, the meeting insight system 102 can provide or present the shared item notification 1512 in a portion of the video call interface pertaining to the user account (or device) initiating the sharing of the content item (e.g., overlapping or adjacent to the portion of the interface where Jill's video stream is located).

Figure 16:
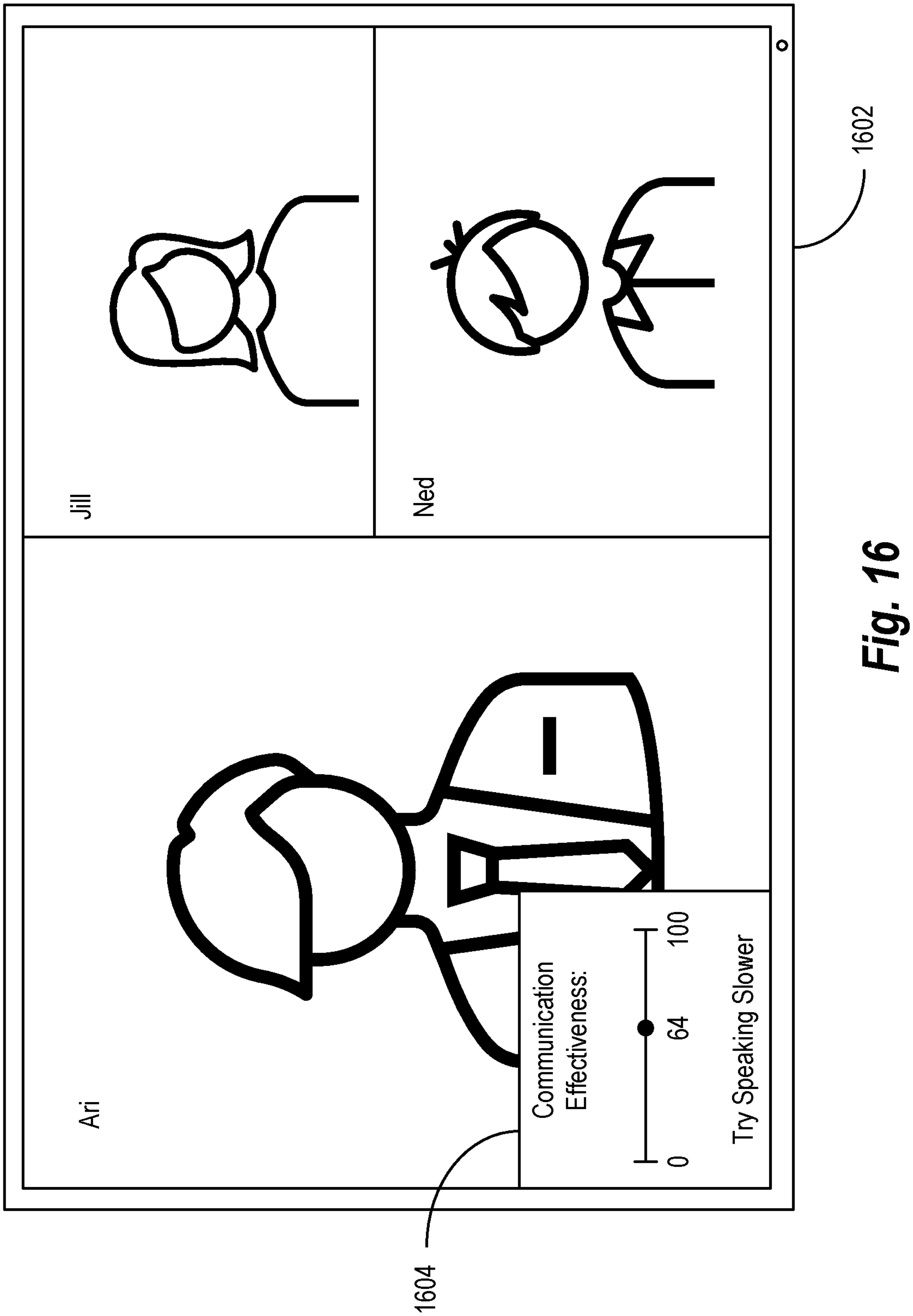
FIG. 16 illustrates an example interface for providing a communication effectivity score for an ongoing video call in accordance with one or more embodiments.

As noted above, in certain embodiments, the meeting insight system 102 provides in-meeting coaching insights for improving communication effectivity. In particular, the meeting insight system 102 determines a communication effectivity score for a user account and provides suggestions for improving the score. FIG. 16 illustrates an example diagram for generating and providing communication effectivity scores for an ongoing video call in accordance with one or more embodiments.

As illustrated in FIG. 16, the meeting insight system 102 generates and provides a communication effectivity notification 1604 for display on a client device 1602. Indeed, the meeting insight system 102 generates the communication effectivity notification 1604 for a user account participating in an ongoing video call. For example, the meeting insight system 102 determines a communication effectivity score by analyzing video call data of the ongoing video call. In some cases, the meeting insight system 102 analyzes video call data including camera data (e.g., body language data, facial expression data, and/or eye movement data) and audio data (e.g., vocabulary data, sentence structure data, and speech speed data).

In some embodiments, the meeting insight system 102 determines a communication effectivity score based on a combination of different data, including camera data and audio data. For example, the meeting insight system 102 utilizes a communication effectivity model to process video call data and generate a communication effectivity score. In some cases, the communication effectivity model process body language data and/or sentence structure data to generate a communication effectivity score. For instance, the communication effectivity model can generate a low communication effectivity score for a user that gesticulates a lot, speaks too quickly, uses lots of filler words (e.g., "um," "uh," or "like"), looks upset, and/or makes poor eye contact. Conversely, the communication effectivity model can generate a high communication effectivity score for a user with steady speech, clear articulation, few filler words, limited body movement, and/or good eye contact.

In certain cases, the meeting insight system 102 utilizes different communication effectivity models—one for processing video-based data and another for processing audio-based data. For instance, a first communication effectivity model processes body language data, eye movement data, and/or facial expression data to determine a video-based communication effectivity score. In addition, a second communication effectivity model processes vocabulary data, speech speed data, and sentence structure data to determine an audio-based communication effectivity score. In certain cases, the meeting insight system 102 trains the audio-based model on audio data (e.g., sentence structure, vocabulary, and speech speed) of known effective communicators (e.g., Steve Jobs or Oprah Winfrey) to tune parameters of the model to generate higher scores from audio data more similar to that of the known effective communicators. The meeting insight system 102 can further generate an overall communication effectivity score as a composite score by combining (e.g., averaging, where audio-based scores may be weighted more heavily in a weighted average) the video-based score and the audio-based score from the different models.

As shown in FIG. 16, the meeting insight system 102 generates and provides the communication effectivity notification 1604 for display within the video call interface of the client device 1602. In particular, the meeting insight system 102 generates the communication effectivity notification 1604 to depict a communication effectivity score (64), along with a graphical visualization of the communication effectivity score (e.g., the line chart with the dot representing the score of 64 placed between the ends at 0 and 100). Additionally, the meeting insight system 102 can generate and provide an effectiveness prompt for display within the video call interface (e.g., as part of the communication effectivity notification 1604). As shown, the meeting insight system 102 generates the effectiveness prompt ("Try speaking slower") to provide a suggestion for improving a communication effectivity score. Indeed, the meeting insight system 102 can detect portions of video call data that are heavily impacting a communication effectivity score and can generate the effectiveness prompt to improve poor results in those data portions.

In some embodiments, the meeting insight system 102 can generate and provide other notifications as well. For example, the meeting insight system 102 can provide notifications indicating attentiveness scores and/or reaction scores for attendees of an ongoing video call. In some cases, the meeting insight system 102 analyzes attentiveness data, such as eye movement data, to generate a notification for display indicating an attentiveness score for an attendee (e.g., where the notification is provided only to an administrator device or to the call organizer device or to the device of the user who is currently speaking). In these or other cases, the meeting insight system 102 analyzes reaction data, such as eye movement data, body language data, and/or facial expression data, to generate a notification for display indication a reaction score for an attendee (e.g., where the notification is provided only to an administrator device or to the call organizer device or to the device of the user who is currently speaking).

FIGS. 10-16, the corresponding text, and the examples provide a number of different systems and methods for generating and providing in-meeting coaching insights. In addition to the foregoing, implementations can also be described in terms of flowcharts comprising acts steps in a method for accomplishing a particular result. For example, FIG. 17 illustrates an example series of acts for generating and providing in-meeting coaching insights.

Figure 17:
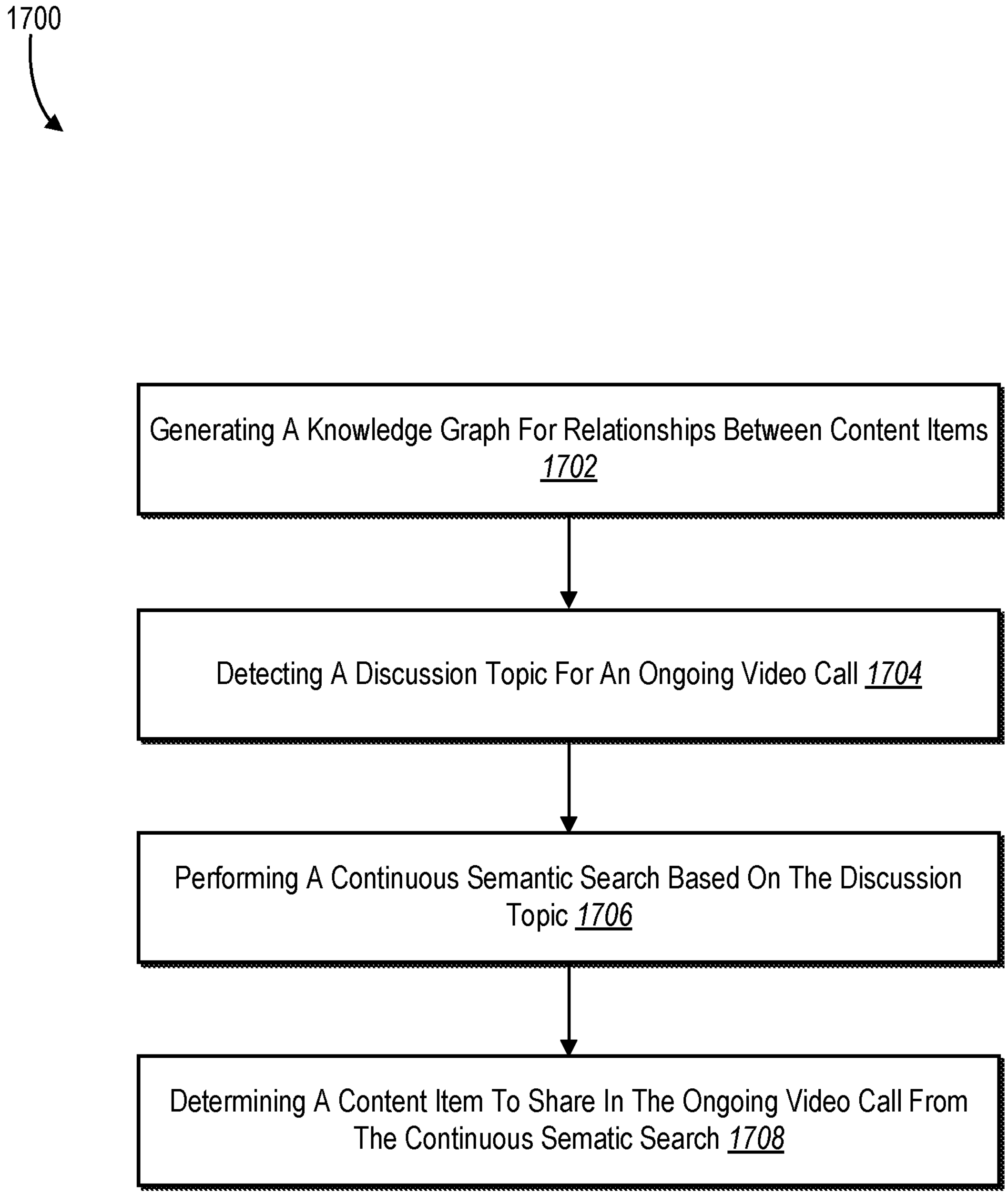
FIG. 17 illustrates an example series of acts for generating and providing in-meeting coaching insights in accordance with one or more embodiments.

While FIG. 17 illustrates acts according to certain implementations, alternative implementations may omit, add to, reorder, and/or modify any of the acts shown in FIG. 17. The acts of FIG. 17 can be performed as part of a method. Alternatively, a non-transitory computer readable medium can comprise instructions, that when executed by one or more processors, cause a computing device to perform the acts of FIG. 17. In still further implementations, a system can perform the acts of FIG. 17.

As illustrated in FIG. 17, the series of acts 1700 may include an act 1702 of generating a knowledge graph for relationships between content items. In particular, the act 1702 can involve generating, from video call data extracted from past video calls associated with a user account of a content management system, a knowledge graph defining relationships between content items stored for the user account. The series of acts 1700 may also include an act 1704 of detecting a discussion topic for an ongoing video call. In particular, the act 1704 can involve detecting, from video call data of an ongoing video call, a discussion topic comprising subject matter discussed between participants of the ongoing video call. Additionally, the series of acts 1700 can include an act 1706 of performing a continuous semantic search based on the discussion topic. In particular, the act 1706 can involve performing, during the ongoing video call, a continuous semantic search of the knowledge graph to identify content items corresponding to the discussion topic (by continually searching content items stored for the user account during the ongoing video call to identify content items corresponding to the discussion topic). Further, the series of acts 1700 can include an act 1708 of determining a content item (stored for the user account) to share in the ongoing video call from the continuous semantic search. In particular, the act 1708 can involve determining, from the continuous semantic search, a content item stored for the user account to recommend for sharing within the ongoing video call. The series of acts 1700 can also include an act of generating, for display on a client device associated with the user account during the ongoing video call, a recommendation for sharing the content item within the ongoing video call.

In some embodiments, the series of acts 1700 can include an act of performing the continuous semantic search by analyzing the knowledge graph during the ongoing video call by: identifying, within the knowledge graph, a first node representing the ongoing video call corresponding to the discussion topic, and determining, from the first node, distances of additional nodes representing content items stored for the user account based on topics associated with the content items. The series of acts 1700 can also include an act of determining the content item to recommend by determining, from among a plurality of content items stored for the user account within the content management system, a content item whose node within the knowledge graph has a shortest distance to a node representing the discussion topic.

In addition, the series of acts 1700 can include an act of determining a tone associated with the ongoing video call and an act of generating, for display on a client device of the user account during the ongoing video call, a suggested phrase for the discussion topic according to the tone. Further, the series of acts 1700 can include an act of detecting an incorrect statement made during the ongoing video call and an act of generating, for display on a client device of the user account during the ongoing video call, a suggested phrase for correcting the incorrect statement.

In some embodiments, the series of acts 1700 includes an act of determining a target topic from analysis of an agenda associated with the ongoing video call, an act of detecting divergence from the target topic based on the video call data of the ongoing video call, and an act of generating, for display on a client device of the user account during the ongoing video call, a suggested phrase for returning to the target topic. In certain embodiments, the series of acts 1700 includes acts of analyzing a plurality of content items stored for the user account within the content management system, generating, from the plurality of content items stored for the user account, a suggested phrase corresponding to the discussion topic of the ongoing video call, and providing the suggested phrase for display on a client device associated with the user account during the ongoing video call.

In certain cases, the series of acts 1700 includes an act of generating the knowledge graph by: determining topics for a plurality of content items stored for the user account within the content management system, determining topics from the video call data extracted from the past video calls, and generating, from the topics of the video call data and the topics of the plurality of content items, edges representing relationships between nodes corresponding to the past video calls and the plurality of content items. In these or other cases, the series of acts 1700 includes an act of determining the content item to recommend by: determining, from the knowledge graph, a plurality of content items stored for the user account corresponding to the discussion topic, ranking the plurality of content items according to confidence values for corresponding to the discussion topic, and selecting the content item based on ranking the plurality of content items according to the confidence values.

In some embodiments, the series of acts 1700 includes an act of detecting, based on changes in the video call data of the ongoing video call, a new discussion topic discussed between participants of the ongoing video call. In addition, the series of acts 1700 can include acts of updating the continuous semantic search to analyze the knowledge graph based on the new discussion topic and determining, for display on the client device based on updating the continuous semantic search, a new content item stored for the user account and corresponding to the new discussion topic.

In some cases, the series of acts 1700 includes an act of receiving, from the client device during the ongoing video call, an indication of selecting the recommendation to share the content item. Additionally, the series of acts 1700 can include an act of, in response to the indication, generating a sharing notification for display on client devices associated with other participants, wherein the sharing notification is selectable to provide the content item to a corresponding user account within the content management system.

In one or more embodiments, the series of acts 1700 includes acts of analyzing a plurality of content items within the content management system and accessible by each user account participating in the ongoing video call, generating, from the plurality of content items accessible by each user account, a suggested phrase corresponding to the discussion topic of the ongoing video call, and providing the suggested phrase for display on a client device associated with the user account during the ongoing video call. The series of acts 1700 can also include acts of determining, from the video call data of the ongoing video call, an effectiveness score indicating a measure of communication effectiveness for the user account and generating, for display on the client device of the user account during the ongoing video call, a notification comprising a suggestion for improving the effectiveness score.

The series of acts 1700 can further include an act of generating the knowledge graph by: determining user account interactions for a plurality of content items accessed during the past video calls and stored for the user account within the content management system and generating, from the user account interactions, nodes representing the plurality of content items and edges representing relationships between the plurality of content items. Additionally, the series of acts 1700 can include an act of analyzing the knowledge graph during the ongoing video call by: identifying, within the knowledge graph, a first node representing the discussion topic and determining, from the first node, distances of additional nodes representing content items stored for the user account.

In some embodiments, the series of acts 1700 includes acts of determining a target topic using natural language processing for an agenda associated with the ongoing video call, detecting divergence from the target topic based on the video call data of the ongoing video call, and generating, for display on a client device of the user account during the ongoing video call, a suggested phrase prompting a return to the target topic. In these or other embodiments, the series of acts 1700 includes acts of generating, from the content item determined from the continuous semantic search, a suggested phrase corresponding to the discussion topic of the ongoing video call and providing the suggested phrase for display on a client device associated with the user account during the ongoing video call. In some cases, the series of acts 1700 includes acts of determining, from the video call data indicating vocabulary used by the user account during the ongoing video call, an effectiveness score indicating a measure of communication effectiveness for the user account, and generating, for display on a client device of the user account during the ongoing video call, a notification comprising a suggestion for changing the vocabulary to improve the effectiveness score.

Figure 18:
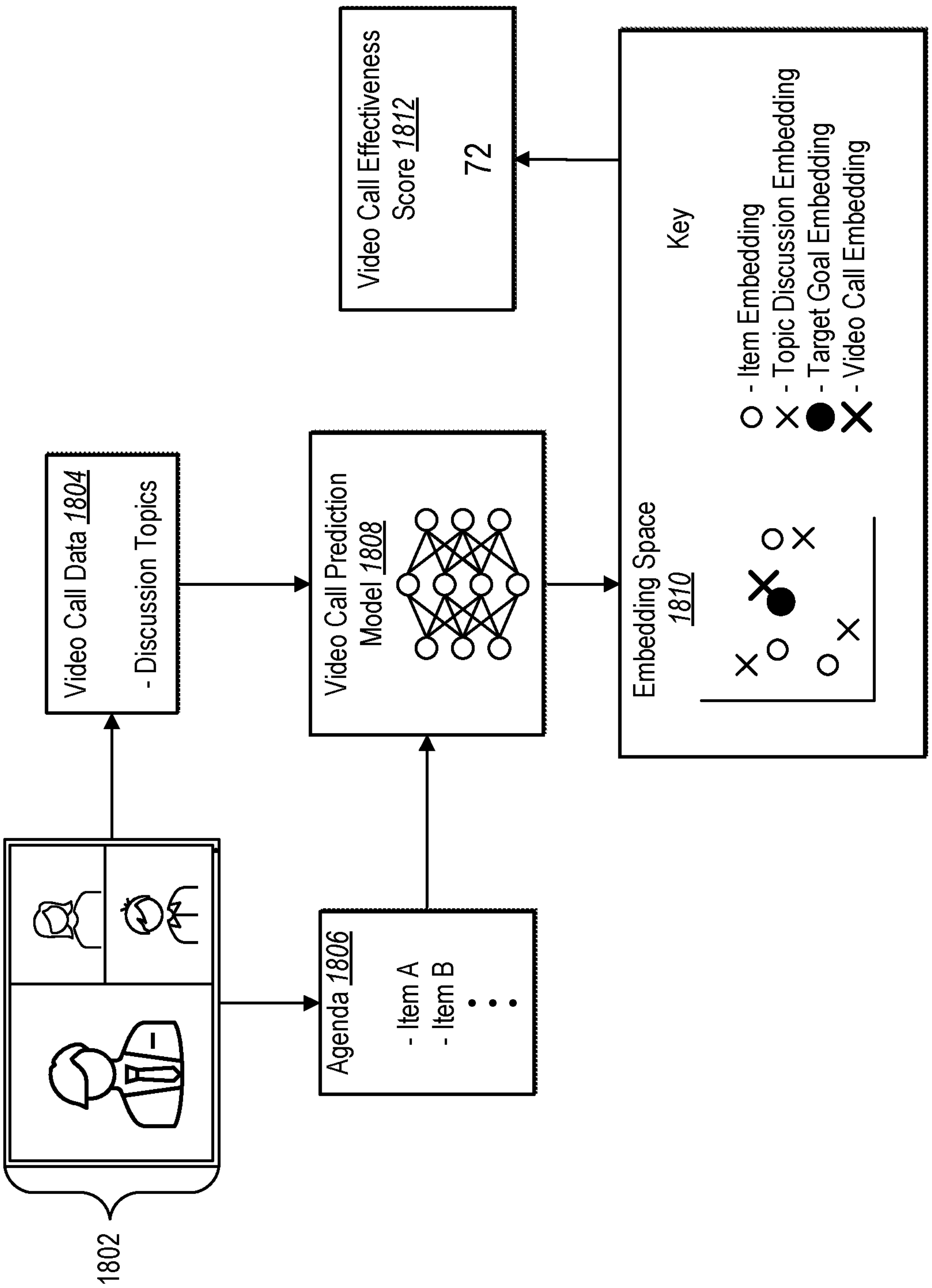
FIG. 18 illustrates an overview of generating and providing predictions for video call effectivity scores for ongoing video calls in accordance with one or more embodiments.

Generating and Providing Predictions for Accomplishing Target Goals for Video Calls As mentioned above, in certain described embodiments, the meeting insight system 102 can generate predictions for accomplishing target goals during ongoing video calls. In particular, as part of generating in-meeting coaching insights, the meeting insight system 102 can determine whether (or a probability that) an ongoing video call will accomplish a target goal. FIG. 18 illustrates an example overview of generating predictions for accomplishing a target goal in accordance with one or more embodiments. Additional detail regarding the various acts and processes introduced in FIG. 18 is provided thereafter with reference to subsequent figures.

As illustrated in FIG. 18, the meeting insight system 102 identifies or detects an ongoing video call 1802. In particular, the meeting insight system 102 detects that a client device is streaming video data and/or audio data from one or more participating client devices engaged in the ongoing video call 1802. Based on detecting the ongoing video call 1802, the meeting insight system 102 further determines video call data 1804. More specifically, the meeting insight system 102 determines discussion topics. In some cases, the meeting insight system 102 determines discussion topics by using a topic prediction model to process audio data and/or natural language data captured from client devices participating in the ongoing video call 1802 to predict a discussion topic (and to update discussion topics over time), as described above.

As further illustrated in FIG. 18, the meeting insight system 102 determines or identifies an agenda 1806. More particularly, the meeting insight system 102 identifies the agenda 1806 attached to the ongoing video call 1802 as designated in the metadata of the agenda 1806 and/or the ongoing video call 1802. In some cases (such as where to specific content item is labeled or designated as an agenda), the meeting insight system 102 identifies the agenda 1806 by processing or analyzing content items stored for one or more user accounts participating in the ongoing video call 1802. Indeed, the meeting insight system 102 can analyze stored content items to determine a content item that includes agenda items and/or topics relating to the ongoing video call 1802. As shown, the meeting insight system 102 identifies Item A and Item B (and others) within the agenda 1806.

As also illustrated in FIG. 18, the meeting insight system 102 utilizes a video call prediction model 1808 (e.g., a neural network) to generate or determine a video call effectiveness score 1812 for the ongoing video call 1802. More specifically, the video call prediction model 1808 processes the agenda 1806 and the video call data 1804 to generate the video call effectiveness score 1812 as a representation of a probability that the ongoing video call 1802 will accomplish one or more target goals.

As shown, the video call prediction model 1808 extracts embeddings from the agenda 1806 and video call data 1804. Indeed, within the embedding space 1810, the video call prediction model 1808 generates item embeddings for Item A, Item B, and other items identified within the agenda 1806. In addition, the video call prediction model 1808 extracts topic discussion embeddings from the discussion topics of the video call data 1804. Indeed, in some cases the video call prediction model 1808 processes natural language of the agenda 1806 and the video call data 1804 (e.g., in a transcript generated from audio of the ongoing video call 1802) to generate the embeddings in the embedding space 1810.

As further shown, the meeting insight system 102 compares the agenda items with the topic discussions. For example, the meeting insight system 102 (via the video call prediction model 1808) determines distances between item embeddings extracted from the agenda 1806 and topic discussion embeddings extracted from the video call data 1804. In certain embodiments, the distances between item embeddings and topic discussion embeddings indicate or correspond to probabilities that the ongoing video call 1802 will accomplish the corresponding agenda items. As discussion topics change throughout the ongoing video call 1802, the meeting insight system 102 can utilize the video call prediction model 1808 to update topic discussion embeddings and can determine probabilities of accomplishing the agenda items based on numbers (and distances from item embeddings) of topic discussion embeddings (e.g., where a threshold number of embeddings generated at respective timestamps and within a threshold distance increases the probability).

In some cases, the meeting insight system 102 combines (e.g., averages) item embeddings in the embedding space 1810 to generate a target goal embedding for the ongoing video call 1802 as a whole. For example, the meeting insight system 102 determines a weighted average location in the embedding space 1810 where embeddings corresponding to more important agenda items (e.g., agenda items listed higher in the agenda and/or bolded or underlined agenda items) are weighted more heavily. In a similar fashion, the meeting insight system 102 can combine (e.g., average) topic discussion embeddings in the embedding space 1810 to generate a video call embedding representing the topic discussions of the entire ongoing video call 1802 (e.g., as a trajectory up to a most recent timestamp). Specifically, the meeting insight system 102 can determine a weighted average location in the embedding space 1810 where discussion topics corresponding to more timestamps (e.g., discussed longer) are weighted more heavily.

As further illustrated in FIG. 18, the meeting insight system 102 can generate a video call effectiveness score 1812. Indeed, the meeting insight system 102 utilizes the video call prediction model 1808 to determine a probability (or a binary indication) of whether the ongoing video call 1802 will achieve a target goal. In some cases, the meeting insight system 102 determines the score based on a distance in the embedding space 1810 between a target goal embedding (generated from item embeddings) and a video call embedding (generated from topic discussion embeddings). In these or other cases, the meeting insight system 102 generates scores for each of the item embeddings and their distances to individual topic discussion embeddings. The meeting insight system 102 can further update the video call effectiveness score 1812 over time by determining distances between embedding extracted at different timestamps.

In some cases, the meeting insight system 102 generates the video call effectiveness score 1812 based further on an intent associated with the ongoing video call 1802. To elaborate, the meeting insight system 102 determines an intent (of a user account or a set of attendee user accounts) for the ongoing video call 1802. The meeting insight system 102 can determine a video call intent based on one or more past video calls with similar titles (e.g., within a threshold similarity), included as part of a set or series of related video calls, and/or involving the same set of invitee user accounts. In some cases, the meeting insight system 102 can determine a video call intent by analyzing the video call data 1804 to extract intent data, such as verbalized indications of intent and/or stored content items associated with the ongoing video call 1802 that indicate intent. A video call intent can include an intent to obtain a conversion, an intent to convey a particular message, or an intent to obtain a particular set of information. The meeting insight system 102 can also extract an intent embedding to further compare within the embedding space 1810 to generate the video call effectiveness score 1812. In certain embodiments, the meeting insight system 102 weights the distance between an intent embedding and the video call embedding with one weight and weights the distance between the target goal embedding and the video call embedding with another weight to generate the video call effectiveness score 1812 based on a weighted combination.

In some embodiments, the meeting insight system 102 trains the video call prediction model 1808 based on a specific body of knowledge. More particularly, the meeting insight system 102 generates and/or utilizes a particular set of training data for training the video call prediction model 1808. For example, the meeting insight system 102 generates or identifies video call data to use as training data from a set of past video calls that satisfy a threshold effectiveness score. In some cases, the meeting insight system 102 receives or determines effectiveness scores for a set of past video calls and utilizes those video calls which satisfy the threshold effectiveness as training data for the video call prediction model 1808 to learn (e.g., to adjust its weights and biases) for predicting accurate video call effectiveness scores.

Additionally, in some embodiment, the meeting insight system 102 generates a video call effectiveness score 1812 over multiple video calls. For instance, the meeting insight system 102 generates the video call effectiveness score 1812 as an aggregate score across a set of video calls within a particular series (e.g., associated with a common topic, including a shared set of invitees, and/or organized by the same user account). In some cases, the meeting insight system 102 generates the video call effectiveness score 1812 to represent an aggregate trend to date of the series of related video calls accomplishing an overarching target goal (e.g., a call series goal) for the series of video calls.

Figure 19:
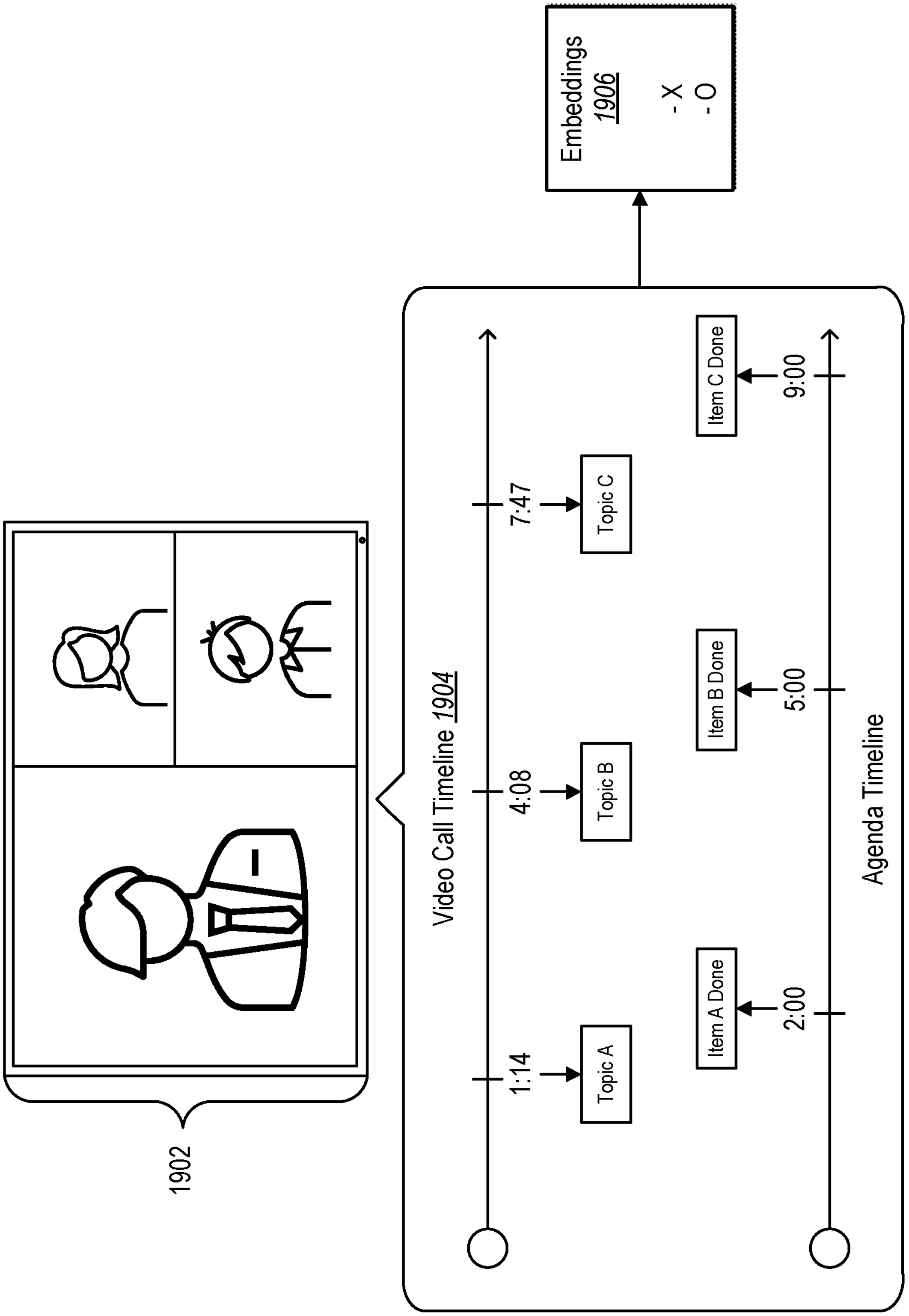
FIG. 19 illustrates an example diagram for extracting video call topics and agenda topics for an ongoing video call in accordance with one or more embodiments.

As indicated, in certain embodiments, the meeting insight system 102 extracts topic discussion embeddings from an ongoing video call. In addition, the meeting insight system 102 extracts item embeddings from an agenda corresponding to the ongoing video call for comparison with the topic discussion embeddings (e.g., to determine a video call effectiveness score). FIG. 19 illustrates an example diagram for extracting topic discussion embeddings and agenda item embeddings in accordance with one or more embodiments.

As illustrated in FIG. 19, the meeting insight system 102 determines discussion topics for an ongoing video call 1902. Indeed, the meeting insight system 102 analyzes the ongoing video call 1902 to detect discussion topics and changes in discussion topics over time. As shown, the meeting insight system generates and/or analyzes a video call timeline 1904 to determine discussion topics for the ongoing video call 1902. Specifically, the meeting insight system 102 detects Topic A as a discussion topic that begins at timestamp 1:14, Topic B that begins at timestamp 4:08, and Topic C that begins at timestamp 7:47.

As also illustrated in FIG. 19, the meeting insight system 102 analyzes an agenda associated with the ongoing video call 1902 to determine agenda item topics and their corresponding timestamps. Indeed, the meeting insight system 102 can compare the topics of each agenda item (as individual target goals or subgoals) with the discussion topics as they change over time to determine how likely it is that the ongoing video call 1902 will accomplish each of the agenda items (and thus an overall target goal). For example, the meeting insight system 102 determines agenda item topics and their corresponding time allotments (as indicated by the agenda or by dividing total agenda time across the number of agenda items) to determine when each of the agenda items should be completed or accomplished during the ongoing video call 1902. As shown, the meeting insight system 102 determines that Item A should be completed by timestamp 2:00, Item B should be completed by timestamp 5:00 and Item C should be completed by timestamp 9:00.

Based on determining the timeframes for accomplishing the agenda items, the meeting insight system 102 can compare such timeframes with the timing of the discussion topics. The meeting insight system 102 can thus determine or generate a trajectory for the ongoing video call 1902 to determine a probability (or a binary indication) of accomplishing each of the agenda items by their indicated times (and/or by the end of the ongoing video call 1902). In some cases, as mentioned above, the meeting insight system 102 compares the discussion topics of the ongoing video call 1902 with the agenda items by extracting or encoding embeddings 1906 from the discussion topics and the agenda items. Accordingly, the meeting insight system 102 can determine distances between the embeddings 1906 to determine whether the discussion topics align with or match the agenda items (e.g., if the distances between the embeddings are within a threshold).

The meeting insight system 102 can further determine or detect accomplishment of an agenda item based on a duration of time (e.g., a threshold time) spent on a discussion topic whose embedding is within a threshold distance of an agenda item embedding. In certain embodiments, the meeting insight system 102 can determine accomplishment of an agenda item based on detecting an accomplishment phrase that indicates such accomplishment (e.g., "sounds like we covered that," "moving on," or "the next item is"). In some cases, the meeting insight system 102 determines or detects accomplishment of an overall target goal based on a threshold number or a threshold percentage of the individual agenda items being accomplished. In certain embodiments, the meeting insight system 102 determines accomplishment of an overall target goal based on determining that an overall video call embedding (e.g., a weighted average of individual topic discussion embeddings) is within a threshold distance of a target goal embedding (e.g., a weighted average of individual agenda item embeddings) for at least a threshold duration of time.

Figure 20:
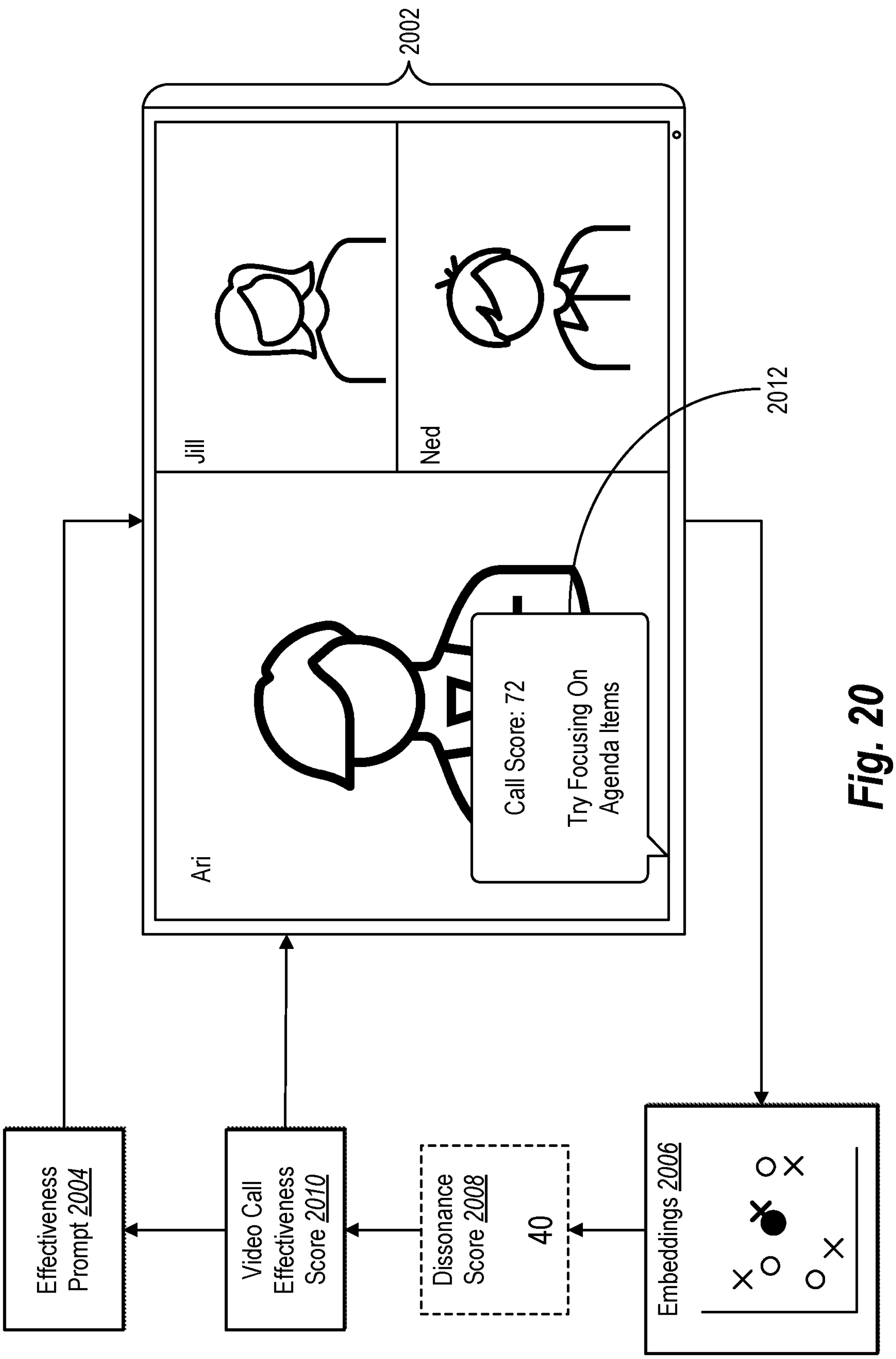
FIG. 20 illustrates an example diagram for generating and providing a video call effectiveness score in accordance with one or more embodiments.

As mentioned above, in certain described embodiments, the meeting insight system 102 can generate in-meeting coaching insights for indicating a probability of accomplishing a target goal. In particular, the meeting insight system 102 can generate and provide notifications for display during an ongoing video call to indicate how likely it is that the ongoing video call will accomplish a target goal (or one or more individual agenda item goals). FIG. 20 illustrates an example diagram for generating and providing notifications for a video call effectiveness score in accordance with one or more embodiments.

As illustrated in FIG. 20, the meeting insight system 102 extracts or generates embeddings 2006 from an ongoing video call 2002. As described above, the meeting insight system 102 generates the embeddings 2006 from agenda items and from discussion topics taking place during the ongoing video call 2002. In some cases, the meeting insight system 102 further determines a dissonance score 2008 from the embeddings 2006. To elaborate, the meeting insight system 102 determines the dissonance score 2008 as a measure of dissonance (or lack of harmony or consistency) between topics captured from client devices participating in the ongoing video call 2002.

For instance, the meeting insight system 102 determines a dissonance score by comparing distances between a topic discussion embedding extracted from audio data of a first client device and a topic discussion embedding extracted from audio data of a second client device (e.g., where a farther distance indicates a higher dissonance score). Indeed, in some cases, the meeting insight system 102 detects cross talking (e.g., audio data simultaneously captured from multiple client device indicating overlapping conversation), specific phrases (e.g., "we're not talking about the same thing"), or other audio data that indicates that attendees are not discussing the same topics as one another. In certain embodiments, the meeting insight system 102 determines a binary dissonance indicator (e.g., a discussion dissonance) based on determining that fewer than a threshold number of topic discussion embeddings are within a threshold distance of each other at a given timestamp (or for a threshold duration). As shown, the meeting insight system 102 generates a dissonance score 2008 of 40 (on a scale of 0 to 100) for the ongoing video call 2002.

As further illustrated in FIG. 20, the meeting insight system 102 generates a video call effectiveness score 2010. In some cases, the meeting insight system 102 generates the video call effectiveness score 2010 based on the embeddings 2006 and without considering the dissonance score 2008. For example, as described above, the meeting insight system 102 determines distances between topic discussion embeddings and agenda item embeddings (or between a video call embedding and a target goal embedding) to generate the video call effectiveness score 2010. In some embodiments, the meeting insight system 102 generates the video call effectiveness score 2010 based on the embeddings 2006 and the dissonance score 2008. For example, the meeting insight system 102 generates a first portion of the video call effectiveness score 2010 based on distances between topic discussion embeddings and agenda item embeddings (or between a video call embedding and a target goal embedding) and generates a second portion of the video call effectiveness score 2010 based on the dissonance score 2008. The meeting insight system 102 can further generate a weighted combination of the first portion and the second portion to determine the video call effectiveness score 2010.

As also shown, the meeting insight system 102 can generate an effectiveness prompt 2004. In particular, the meeting insight system 102 can generate an effectiveness prompt that includes language for improving the video call effectiveness score 2010. Indeed, the meeting insight system 102 can generate a notification 2012 for display on a client device participating in the ongoing video call 2002 (e.g., within a video call interface), where the notification 2012 includes a visual indication of the video call effectiveness score 2010 along with the effectiveness prompt 2004 ("Try focusing on agenda items").

Figure 21:
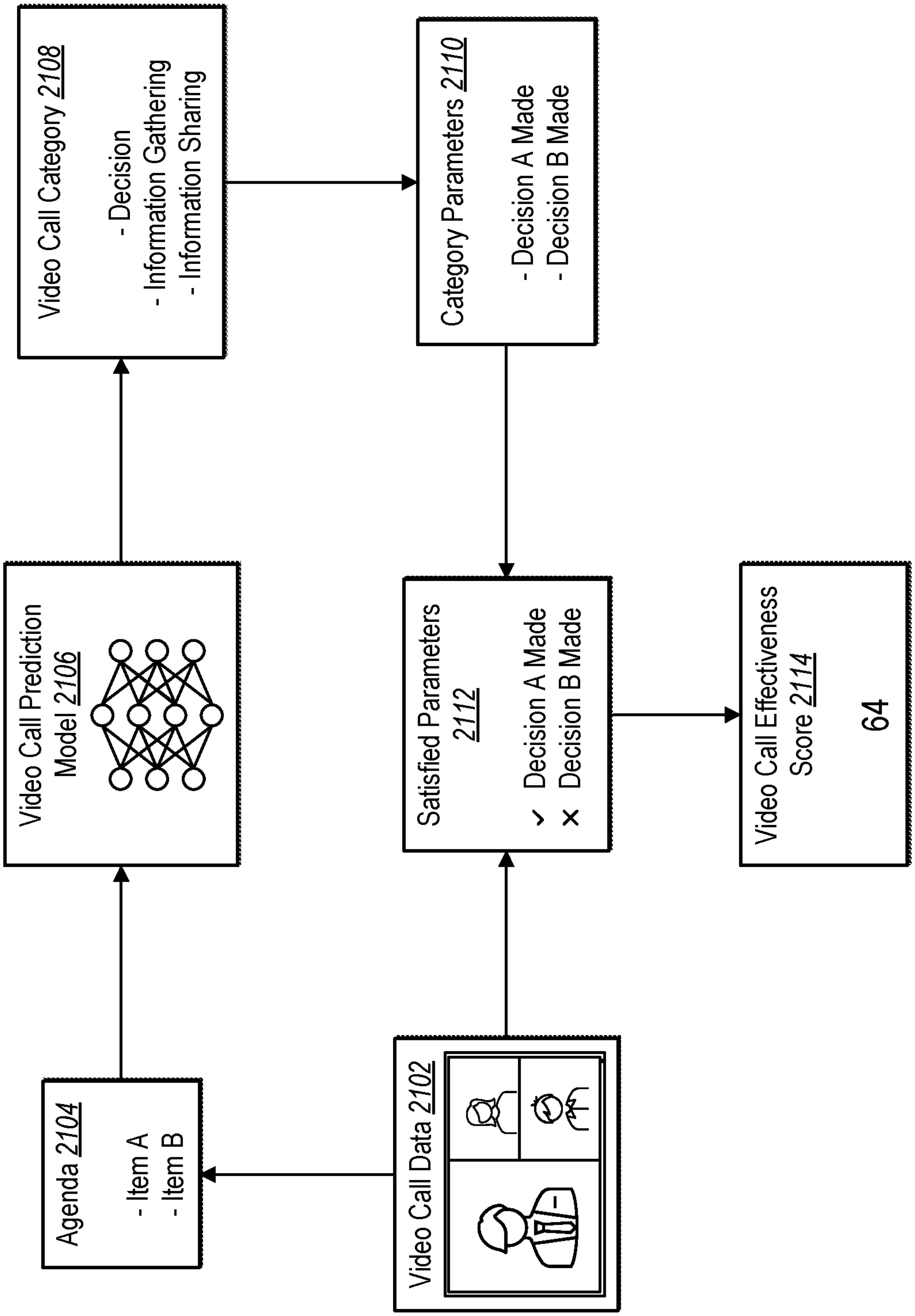
FIG. 21 illustrates an example diagram for generating and providing a video call effectiveness score in accordance with one or more embodiments.

As mentioned above, in one or more embodiments, the meeting insight system 102 generates a video call effectiveness score using a video call prediction model. In particular, the meeting insight system 102 can generate a video call effectiveness score based on categorizing or classifying an ongoing video call. FIG. 21 illustrates an example diagram for generating a video call effectiveness score based on classifying an ongoing video call in accordance with one or more embodiments.

As illustrated in FIG. 21, the meeting insight system 102 extracts or generates video call data 2102 for an ongoing video call, where the video call data includes discussion topics, attendee user accounts, invitee user accounts, and other information described above. In addition, the meeting insight system 102 determines or identifies an agenda 2104 for the ongoing video call, where the agenda 2104 includes agenda items such as Item A and Item B. The meeting insight system 102 further utilizes a video call prediction model 2106 to process the agenda 2104 and/or the video call data 2102 to determine a video call category 2108. Specifically, the video call prediction model 2106 is a classification neural network that classifies the ongoing video call into a video call category 2108 based on its discussion topics and/or agenda items. In some cases, the video call category 2108 includes one of a decision category, an information gathering category, or an information sharing category.

As further illustrated in FIG. 21, the meeting insight system 102 determines category parameters 2110 for the video call category 2108. To elaborate, each category can have its own set of category parameters, where a decision meeting can have parameters requiring decisions to be made for agenda items, an information gathering meeting can have parameters requiring information to be requested during a call (as indicated by one or more agenda items), and an information sharing meeting can have parameters requiring information to be shared during a call (as indicated by one or more agenda items). As shown, the meeting insight system 102 determines the category parameters 2110 corresponding to the video call category 2108 of the ongoing video call (e.g., a decision call).

In addition, the meeting insight system 102 determines or detects satisfied parameters 2112. More specifically, the meeting insight system 102 determines which of the category parameters 2110 are satisfied according to the video call data 2102 of the ongoing video call. For example, the meeting insight system 102 analyzes the video call data 2102 to determine whether the decisions indicated by the category parameters 2110 have been made. As shown, the video call data 2102 indicates that Decision A was made but that Decision B was not (yet) made during the ongoing video call. The meeting insight system 102 thus generates the video call effectiveness score 2114 based on the satisfied parameters 2112. For instance, the meeting insight system 102 generates the video call effectiveness score 2114 to reflect a ratio or a percentage of the category parameters 2110 that are satisfied for the video call category 2108 of the ongoing video call.

Figure 22:
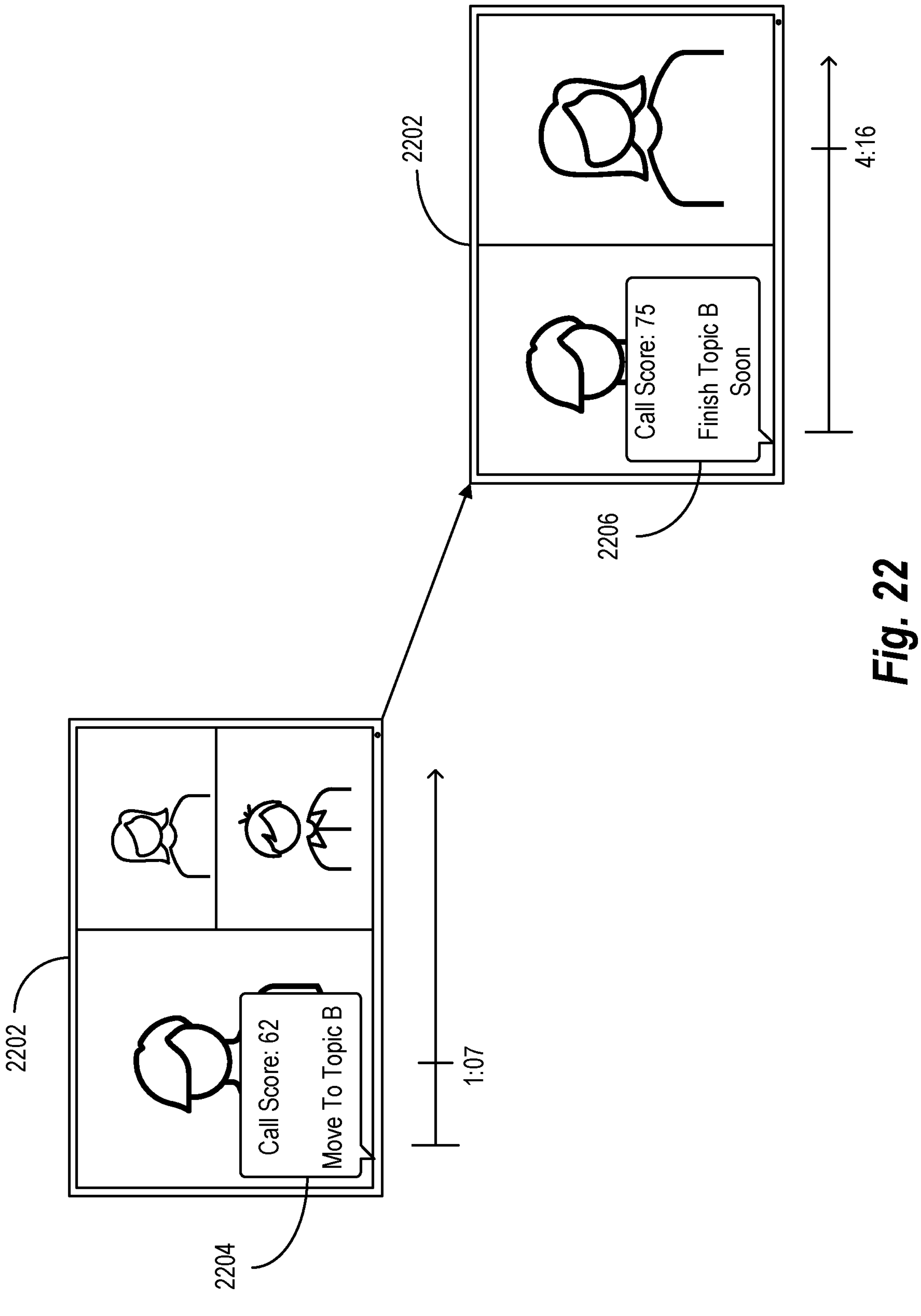
FIG. 22 illustrates example interfaces for providing and updating video call effectiveness scores in accordance with one or more embodiments.

As mentioned, in certain embodiments, the meeting insight system 102 updates a video call effectiveness score as an ongoing video call progresses over time. In particular, the meeting insight system 102 generates an initial video call effectiveness score based on video call data at one timestamp and generates a subsequent video call effectiveness score based on updated video call data at another timestamp. FIG. 22 illustrates an example diagram for updating a video call effectiveness score and a corresponding notification in accordance with one or more embodiments.

As illustrated in FIG. 22, the meeting insight system 102 generates and provides a notification 2204 for display on a client device 2202 during an ongoing video call. More specifically, the meeting insight system 102 generates the notification 2204 to depict or portray a video call effectiveness score and/or a prompt for improving the video call effectiveness score. As shown, the notification 2204 indicates a video call effectiveness score of 62 and includes a prompt of "Move to Topic B" for improving the video call effectiveness score. As also shown, the meeting insight system 102 generates the video call effectiveness score and/or the notification 2204 from video call data extracted at timestamp 1:07 of the ongoing video call.

As further illustrated in FIG. 22, the meeting insight system 102 generates and provides a notification 2206 (e.g., an updated version of the notification 2204) for display on the client device 2202 later during the ongoing video call. Indeed, the meeting insight system 102 extracts new video call data (or updates the video call data) for a timestamp 4:16 of the ongoing video call. From the new video call data, the meeting insight system 102 generates a new video call effectiveness score (or an updated video call effectiveness score) of 75 and also generates a new (or updated) prompt for improving the video call effectiveness score. As shown, the notification 2206 includes a video call effectiveness score of 75 along with a prompt of "Finish Topic B soon" to improve the video call effectiveness score.

FIGS. 18-22, the corresponding text, and the examples provide a number of different systems and methods for generating and providing video call effectiveness scores and prompts for improving video call effectiveness scores for an ongoing video call. In addition to the foregoing, implementations can also be described in terms of flowcharts comprising acts steps in a method for accomplishing a particular result. For example, FIG. 23 illustrates an example series of acts for generating and providing video call effectiveness scores and prompts for improving video call effectiveness scores for an ongoing video call.

Figure 23:
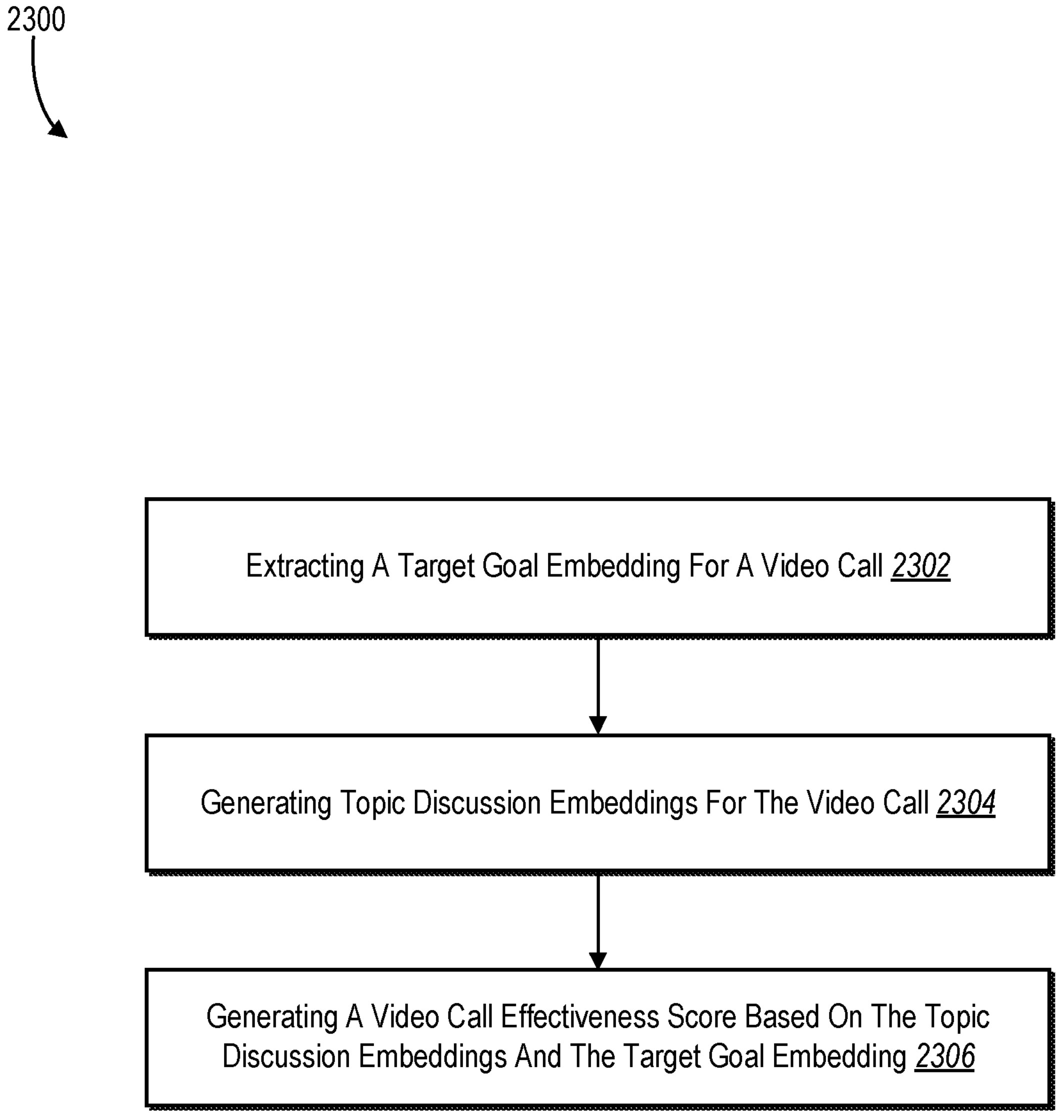
FIG. 23 illustrates an example series of acts for generating and providing video call effectiveness scores for an ongoing video call in accordance with one or more embodiments.

While FIG. 23 illustrates acts according to certain implementations, alternative implementations may omit, add to, reorder, and/or modify any of the acts shown in FIG. 23. The acts of FIG. 23 can be performed as part of a method. Alternatively, a non-transitory computer readable medium can comprise instructions, that when executed by one or more processors, cause a computing device to perform the acts of FIG. 23. In still further implementations, a system can perform the acts of FIG. 23.

As illustrated in FIG. 23, the series of acts 2300 may include an act 2302 of extracting a target goal embedding for a video call. In particular, the act 2302 can involve extracting, from an agenda for a video call of a user account within a content management system, a target goal embedding that encodes a target goal for the video call. In addition, the series of acts 2300 can include an act 2304 of generating topic discussion embeddings for the video call. In particular, the act 2304 can involve generating, from video call data captured from multiple video streams of participating client devices during the video call, a plurality of topic discussion embeddings that encode topics discussed during the video call. As shown, the series of acts 2300 can include an act 2306 of generating a video call effectiveness score based on the topic discussion embeddings and the target goal embedding. In particular, the act 2306 can involve generating, utilizing a video call prediction model to process (e.g., compare) the plurality of topic discussion embeddings and the target goal embedding, a video call effectiveness score indicating a probability of accomplishing the target goal during the video call.

In some embodiments, the series of acts 2300 can include an act of extracting the target goal embedding by utilizing the video call prediction model to generate a vector representation of the agenda from a plurality of meeting items included in the agenda. In these or other embodiments, the series of acts 2300 includes an act of generating the plurality of topic discussion embeddings by: utilizing the video call prediction model to extract a first vector representation of a first topic discussed at a first timestamp during the video call and utilizing the video call prediction model to extract a second vector representation of a second topic discussed at a second timestamp during the video call.

The series of acts 2300 can also include an act of generating the video call effectiveness score by comparing the target goal embedding with the plurality of topic discussion embeddings to determine a probability of accomplishing the target goal during the video call. In some embodiments, the series of acts 2300 includes an act of determining, from the video call data captured from the multiple video streams, a plurality of user accounts attending the video call and an act of generating the video call effectiveness score based on the plurality of user accounts attending the video call. In certain cases, the series of acts 2300 includes acts of detecting a discussion dissonance by determining that fewer than a threshold number of topic discussion embeddings are within a threshold distance of each other within embedding space and generating the video call effectiveness score based on the discussion dissonance. The series of acts 2300 can also include an act of generating, for display during the video call on a client device associated with the user account, a notification comprising a prompt for improving the video call effectiveness score.

In some embodiments, the series of acts 2300 includes an act of generating agenda item embeddings from items in the agenda utilizing the video call prediction model. In addition, the series of acts 2300 can include an act of generating the plurality of topic discussion embeddings from the video call data in real time as topics are discussed during the video call. Further, the series of acts 2300 can include an act of comparing the plurality of topic discussion embeddings with the agenda item embeddings to predict accomplishment of the items in the agenda.

In one or more embodiments, the series of acts 2300 includes an act of to utilizing the video call prediction model to: classify, based on the agenda, the video call into a video call category from among a set of video call categories comprising a decision category, an information gathering category, and an information sharing category and generate the video call effectiveness score based on determining, from the video call data captured from the multiple video streams of the video call, one or more category parameters met for the video call category. In addition, the series of acts 2300 can include acts of generating the video call effectiveness score at a first timestamp of the video call by comparing the target goal embedding with the plurality of topic discussion embeddings to determine a probability of accomplishing the target goal during the video call, and updating the video call effectiveness score at a second timestamp of the video call based on comparing the target goal embedding with new topic discussion embeddings for new topic discussions after the first timestamp of the video call.

In certain embodiments, the series of acts 2300 includes an act of determine a dissonance score by determining distances between the plurality of topic discussion embeddings within an embedding space and an act of generating the video call effectiveness score based on the dissonance score. In some cases, the series of acts 2300 includes an act of generating the video call effectiveness score by: determining a trajectory for the video call based on a number of agenda items accomplished over an elapsed time within the video call, and determining a predicted percentage of the target goal that will be accomplished by termination of the video call based on the trajectory. Additionally, the series of acts 2300 can include an act of generating, for display during the video call on a client device associated with the user account, a notification comprising instructions for improving the video call effectiveness score.

In one or more embodiments, the series of acts 2300 includes an act of generating the video call effectiveness score by: determining a trajectory for the video call based on a number of agenda items accomplished up to a timestamp within the video call and determining a predicted percentage of agenda items that will be accomplished by a scheduled end of the video call based on the trajectory. The series of acts 2300 can also include an act of generating, for display during the video call on a client device associated with the user account, a notification comprising instructions for improving the video call effectiveness score.

In some cases, the series of acts 2300 can include an act of generating the video call effectiveness score at a first timestamp of the video call by comparing the target goal embedding with the plurality of topic discussion embeddings to determine a probability of accomplishing the target goal during the video call. In addition, the series of acts 2300 can include an act of updating the video call effectiveness score at a second timestamp of the video call based on comparing the target goal embedding with new topic discussion embeddings for new topic discussions after the first timestamp of the video call.

The series of acts 2300 can also include an act of determining, from the video call data captured from the multiple video streams, a plurality of user accounts attending the video call and an act of generating the video call effectiveness score based on the plurality of user accounts attending the video call. Further, the series of acts 2300 can include an act of determining a dissonance score by determining distances between the plurality of topic discussion embeddings within an embedding space and an act of generating the video call effectiveness score based on the dissonance score.

Generating and Visualizing Post-Meeting Coaching Insights

Figure 24:
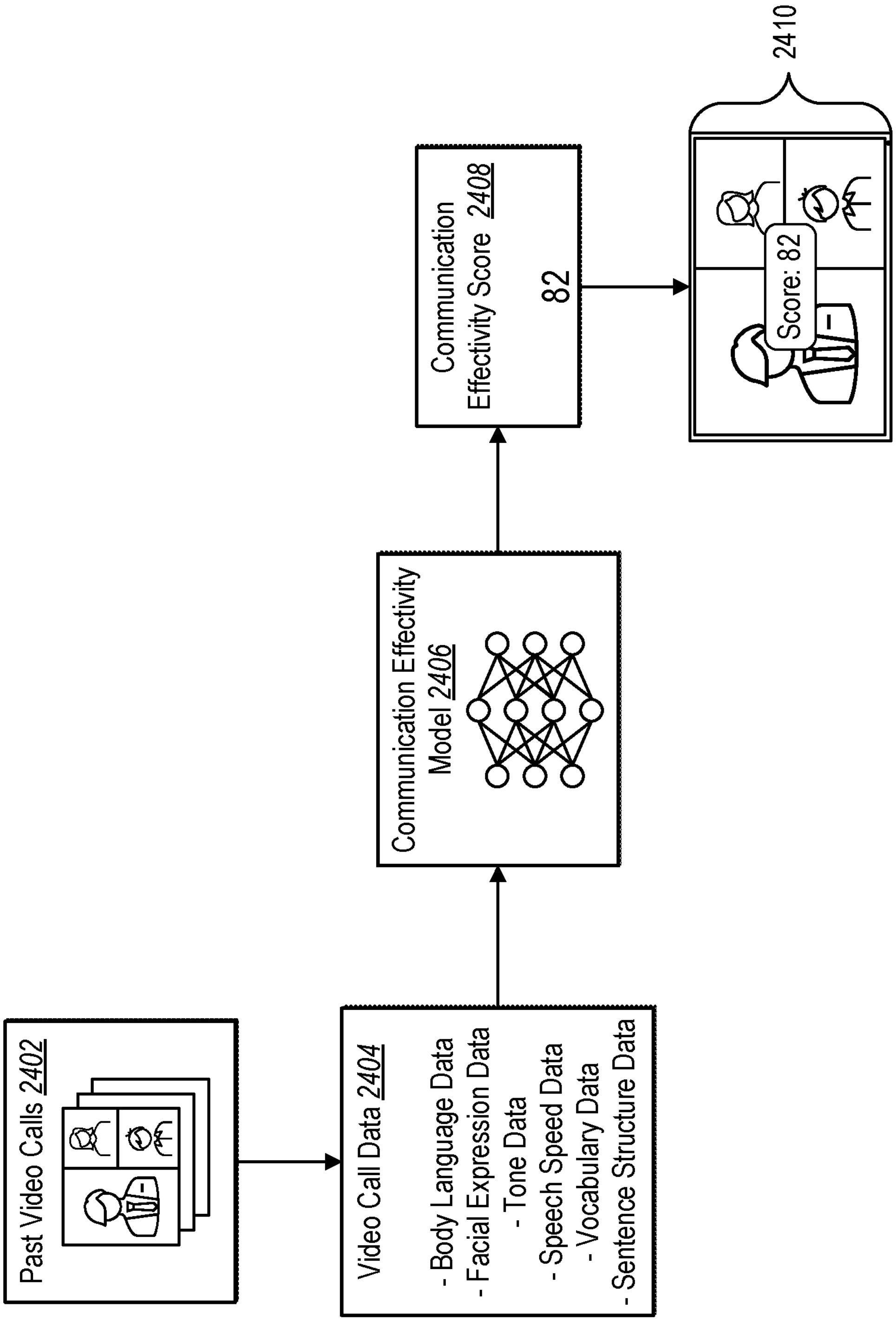
FIG. 24 illustrates an overview of generating and providing post-meeting insights in accordance with one or more embodiments.

As mentioned above, in certain described embodiments, the meeting insight system 102 generates and provides post-meeting coaching insights after video calls or other virtual meetings. For example, the meeting insight system 102 generates a communication effectivity score based on video call data from one or more past video calls and provides a notification of the score for display on a client device. FIG. 24 illustrates an example overview of generating and providing communication effectivity scores as a post-meeting insight in accordance with one or more embodiments. Additional detail regarding the various acts and process introduced in relation to FIG. 24 is provided thereafter with reference to subsequent figures.

As illustrated in FIG. 24, the meeting insight system 102 determines or identifies past video calls 2402 for a user account (within the content management system 106). Indeed, the meeting insight system 102 determines video calls that a user account previously participated in using one or more client devices. In addition, the meeting insight system 102 determines or accesses video call data 2404 stored for the past video calls 2402. For example, the meeting insight system 102 accesses the video call data 2404 that includes body language date, facial expression data, tone data, speech speed data, vocabulary data, sentence structure data, and/or other camera-based or microphone-based data captured during the past video calls 2402. In some cases, the meeting insight system 102 analyzes the video call data 2404 using only data captured by client devices used by the user account, while in other embodiments the meeting insight system 102 utilizes data captured by other client devices as well (e.g., to determine communication effectivity based on reactions of other attendees).

In certain embodiments, the video call data 2404 from the past video calls 2402 changes over time. For example, some of the video call data 2404 have a temporal component that impacts relevance over time, where some of the past video calls 2402 are less relevant the older they get while others of the past video calls 2402 increase in relevance. In some cases, the meeting insight system 102 re-extracts portions of the video call data 2404 at different points in time based on detecting that temporal changes have impacted the relevance of a past video call. For instance, the meeting insight system 102 detects that topic extraction models have changed or improved and/or that other types of video call data are extractable from a past video call, and the meeting insight system 102 re-extracts video call data using the new model (s) and/or to generate the new data.

As further shown in FIG. 24, the meeting insight system 102 utilizes a communication effectivity model 2406 to process the video call data 2404 and generate a communication effectivity score 2408. For instance, the communication effectivity model 2406 can be a neural network with parameters trained or tuned to generates communication effectivity scores based on input data, including one or types of video call data described above. Thus, the communication effectivity model 2406 generates the communication effectivity score 2408 to indicate how effectively the user account communicated during the past video calls 2402.

For instance, the communication effectivity model 2406 generates a higher score for using the right amount of gesticulation, clear sentence structure, and the appropriate vocabulary for the topic or target goal of the video call. Conversely, the communication effectivity model 2406 generates a lower score for using too much hand movement, confusing sentence structure, and/or a vocabulary that includes too much slang or filler words for the topic or target goal of the video call (where some topics/goals may actually require more slang for higher scores). In some cases, the communication effectivity model 2406 is trained based on phrases for known effective communicators, as described above.

As further illustrated in FIG. 24, the meeting insight system 102 generates and provides a notification of the communication effectivity score 2408 for display on a client device. In some cases, the meeting insight system 102 provides the notification for display at the conclusion of a video call 2410. Specifically, the meeting insight system 102 can generate the communication effectivity score 2408 from video call data extracted for a single video call and can provide the notification once the video call ends to indicate how effectively the user communicated. In other cases, the meeting insight system 102 provides the notification for display upon initiation of a subsequent video call. For instance, the meeting insight system 102 generates the communication effectivity score 2408 as a score for a previous video call (and/or a cumulative score across multiple previous video calls) and provides the notification upon initiation of the next video call.

Figure 25:
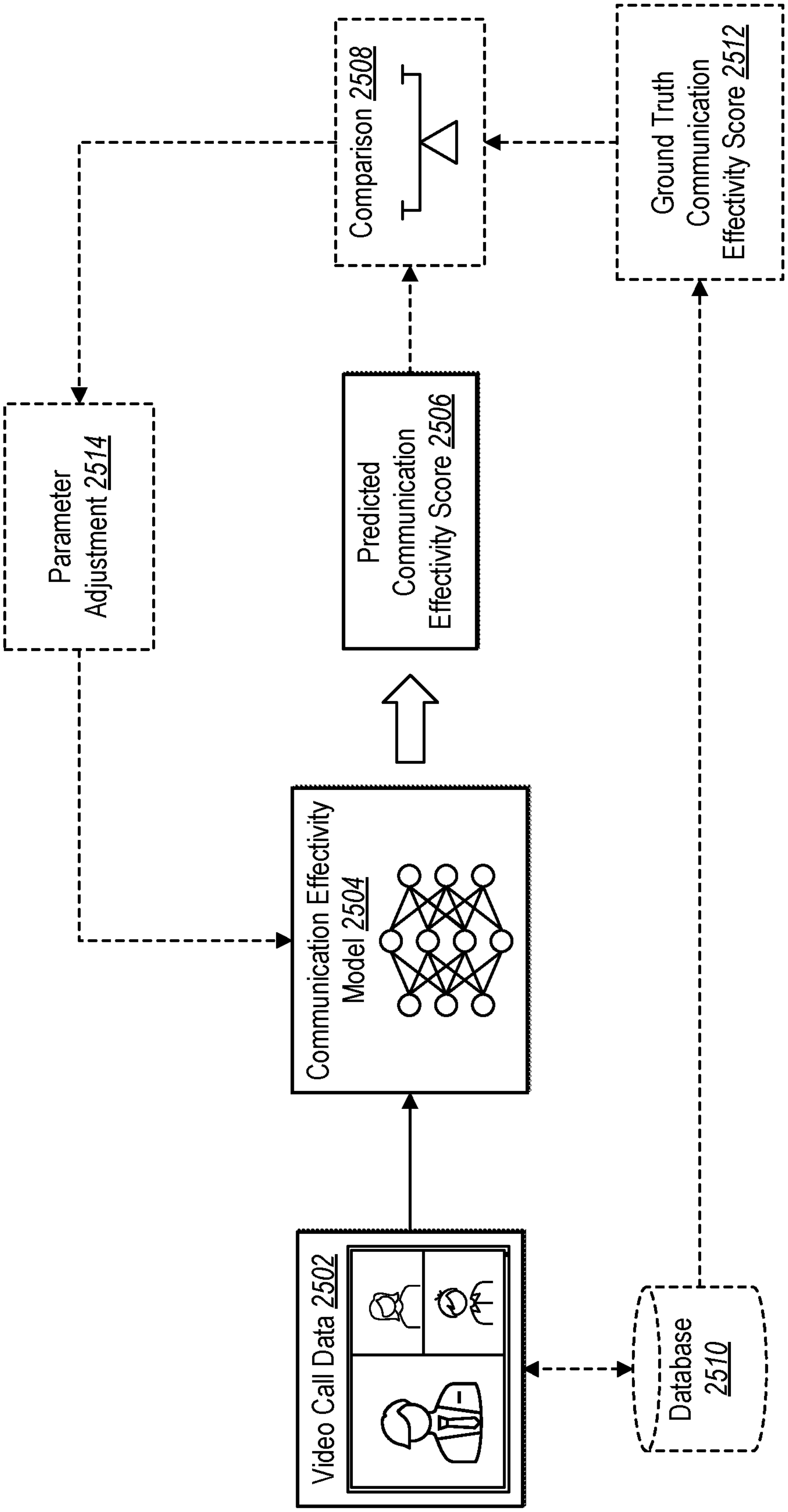
FIG. 25 illustrates an example diagram for training and utilizing a communication effectivity model in accordance with one or more embodiments.

As mentioned above, in certain described embodiments, the meeting insight system 102 utilizes a communication effectivity model to generate a communication effectivity score. In particular, the meeting insight system 102 can train and implement a communication effectivity model, such as a neural network, to generate such scores. FIG. 25 illustrates an example diagram for training and utilizing a communication effectivity model in accordance with one or more embodiments.

As illustrated in FIG. 25, the meeting insight system 102 accesses, extracts, or generates video call data 2502. For example, the meeting insight system 102 extracts video call data from one or more past video calls. In some cases, the video call data 2502 includes camera-based data, such as body language data, eye movement data, and/or facial expression data. In the same or other cases, the video call data 2502 includes audio-based data, such as vocabulary data, speech speed data, volume data, and/or sentence structure data.

As shown, the meeting insight system 102 further inputs the video call data 2502 into the communication effectivity model 2504. In turn, the communication effectivity model 2504 processes the video call data 2502 according to its internal parameters (e.g., weights and biases) to generate a predicted communication effectivity score 2506. Indeed, the communication effectivity model 2504 generates the predicted communication effectivity score 2506 which represents or defines a measure of effectiveness for a user account when communicating on one or more past video calls (from which the video call data 2502 is extracted).

As indicated by the dashed lines in FIG. 25, in some embodiments, the meeting insight system 102 trains the communication effectivity model 2504. To elaborate, the meeting insight system 102 accesses the video call data 2502 from a database 2510 that stores training data including sample video call data and corresponding ground truth communication effectivity scores (e.g., where one set of video call data corresponds to a ground truth effectivity score known for that set of data). In some cases, the database 2510 stores training data taken from known effective communicators, where sample video call data includes camera data and audio data captured from devices of the known effective communicators, and where the corresponding ground truth communication effectivity scores are scores curated for the data of the known effective communicators.

Upon utilizing the communication effectivity model 2504 to generate a predicted communication effectivity score 2506, the meeting insight system 102 further performs a comparison 2508. More specifically, the meeting insight system 102 compares the predicted communication effectivity score 2506 with a ground truth communication effectivity score 2512. Indeed, the meeting insight system 102 compares the predicted communication effectivity score 2506 with the ground truth communication effectivity score 2512 which is stored in the database 2510 and designated as corresponding to the video call data 2502 used as sample training data. In certain embodiments, the meeting insight system 102 performs the comparison 2508 by using a loss function, such as a cross entropy loss function or a mean squared error loss function, to determine an error or a measure of loss associated with the communication effectivity model 2504 (e.g., between the predicted communication effectivity score 2506 and the ground truth communication effectivity score 2512).

As further illustrated in FIG. 25, the meeting insight system 102 continues the training process by performing a parameter adjustment 2514. For example, in cases where the communication effectivity model 2504 is a neural network, the meeting insight system 102 modifies internal weights and biases of the network which impact how the layers and neurons of the communication effectivity model 2504 process data to generate predictions. In some cases, the meeting insight system 102 performs the parameter adjustment 2514 to reduce (e.g., minimize) a measure of loss determined via a loss function of the comparison 2508.

The meeting insight system 102 thus improves the accuracy of the communication effectivity model 2504 in generating predictions from input data. Over multiple iterations or epochs of repeating this training process (e.g., by inputting sample video call data, generating predictions, comparing the predictions with ground truth data, and adjusting model parameters in each round or iteration), the meeting insight system 102 can achieve a threshold accuracy for the communication effectivity model 2504, where the comparison 2508 yields a loss that satisfies a threshold measure of loss to indicate completion of the training process (or where a threshold number of training iterations is satisfied).

Figure 26:
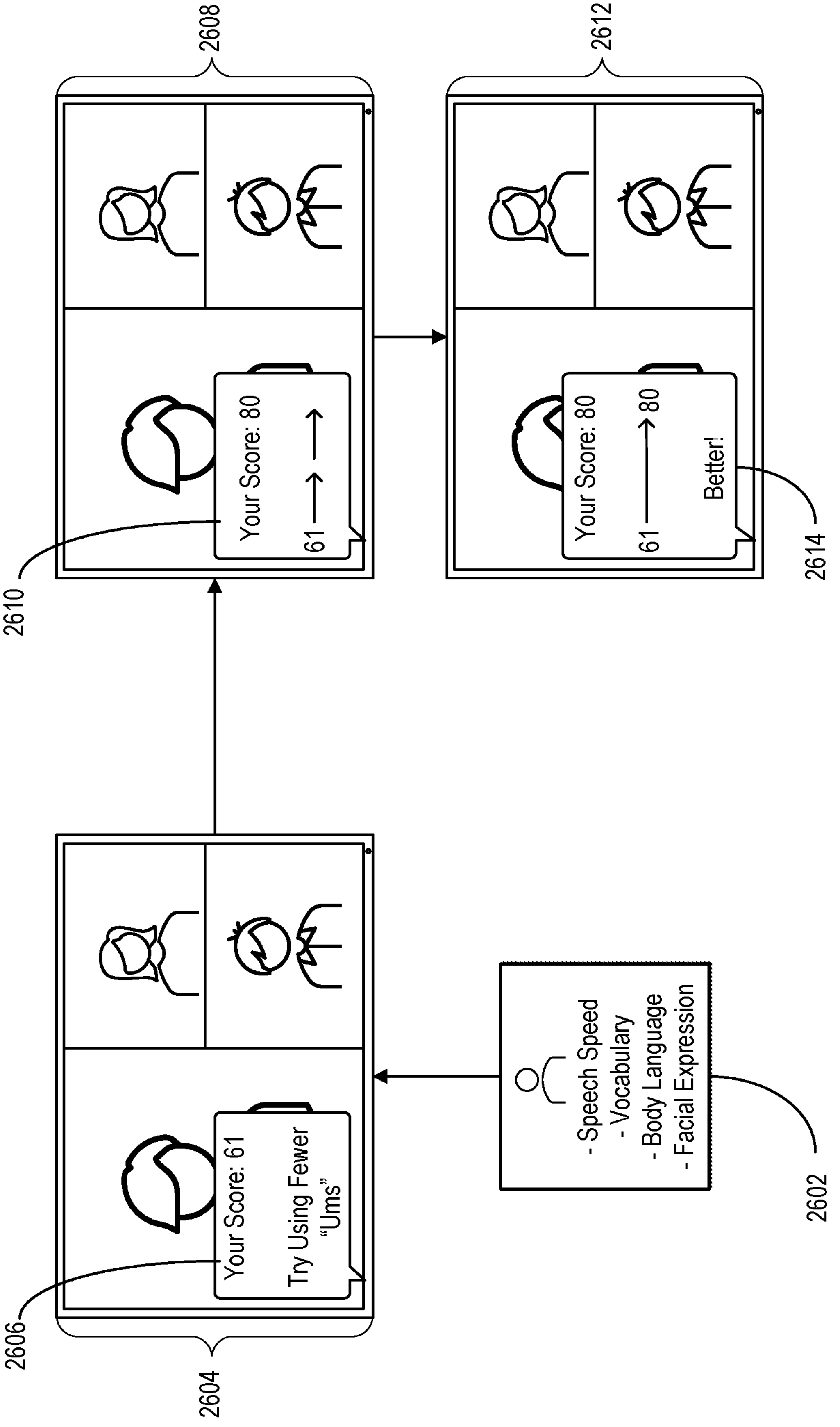
FIG. 26 illustrates an example diagram for generating and updating communication effectivity scores in accordance with one or more embodiments.

As mentioned, in certain described embodiments, the meeting insight system 102 generates and provides graphical visualizations of communication effectivity scores. In particular, the meeting insight system 102 can generate and provide a graphical visualization of a graphical visualization together with an effectiveness prompt that includes advice for improving a communication effectivity score. FIG. 26 illustrates an example diagram for generating and updating a graphical visualization of a communication effectivity score and/or an effectiveness prompt in accordance with one or more embodiments.

As illustrated in FIG. 26, the meeting insight system 102 determines or extracts video call data 2602 for a video call. In particular, the meeting insight system 102 extracts video call data 2602 upon completion of a first video call 2604 (or a first portion of a video call). The meeting insight system 102 thus generates a notification 2606 for display on a client device upon completion of the first video call 2604 (or the first portion of the video call). Indeed, the meeting insight system 102 generates the notification to visually indicate or depict the communication effectivity score (61) along with an effectiveness prompt ("Try using fewer 'um's") to improve the score. The meeting insight system 102 can generate the effectiveness prompt based on the video call data 2602 to indicate one or more portions of video call data to improve for a better communication effectivity score, such as vocabulary, body language, facial expression, tone, or speech speed.

As further illustrated in FIG. 26, upon completion of a second video call 2608 (or a second portion of the same video call) the meeting insight system 102 generates an updated notification 2610. Indeed, the updated notification 2610 includes a visual depiction of an improved communication effectivity score (from 61 to 80) along with an animation to graphically represent the change of the communication effectivity score. In some embodiments, the meeting insight system 102 generates the updated notification 2610 to include an indication of one or video call data that impacted the improvement in the score the most (e.g., "Great job making eye contact" or "Way to speak clearly with few filler words!"). As shown, the animation of the updated notification 2610 is a double arrow that may grow or repeat as the meeting insight system 102 determines the new communication effectivity score to provide based on new video call data from the second video call 2608 (or the second portion of the video call).

As also shown in FIG. 26, the meeting insight system 102 generates an updated notification 2614 based on new or updated video call data after completion of a third video call 2612 (or after completion of a third portion of the same video call). For example, the meeting insight system 102 generates the updated notification 2614 to present or depict a new communication effectiveness score after completion of an animation shown within the updated notification 2610 (e.g., as the arrows move from left to right from the initial score of 61 to reveal the new score of 80). In some cases, the meeting insight system 102 further provides an indication of a change in communication effectiveness score ("Better!") within the updated notification 2614.

In one or more embodiments, the meeting insight system 102 generates and provides other types of post-meeting coaching insights. For example, the meeting insight system 102 generates a notification to invite one or more additional user accounts to the next video call based on determining that a recently completed video call had a low video call effectiveness score (e.g., it did not accomplish a target goal). As another example, the meeting insight system 102 can generate a notification to share a particular content item for a subsequent video call based on determining that a completed video call mentioned (or otherwise related to) a topic of the content item. The meeting insight system 102 can generate and provide post-meeting notifications for display on a client device upon completion of a video call and/or upon initiation of a subsequent video call.

FIGS. 24-26, the corresponding text, and the examples provide a number of different systems and methods for generating and providing post-meeting insights including communication effectivity scores. In addition to the foregoing, implementations can also be described in terms of flowcharts comprising acts steps in a method for accomplishing a particular result. For example, FIG. 27 illustrates an example series of acts for generating and providing post-meeting insights including communication effectivity scores.

Figure 27:
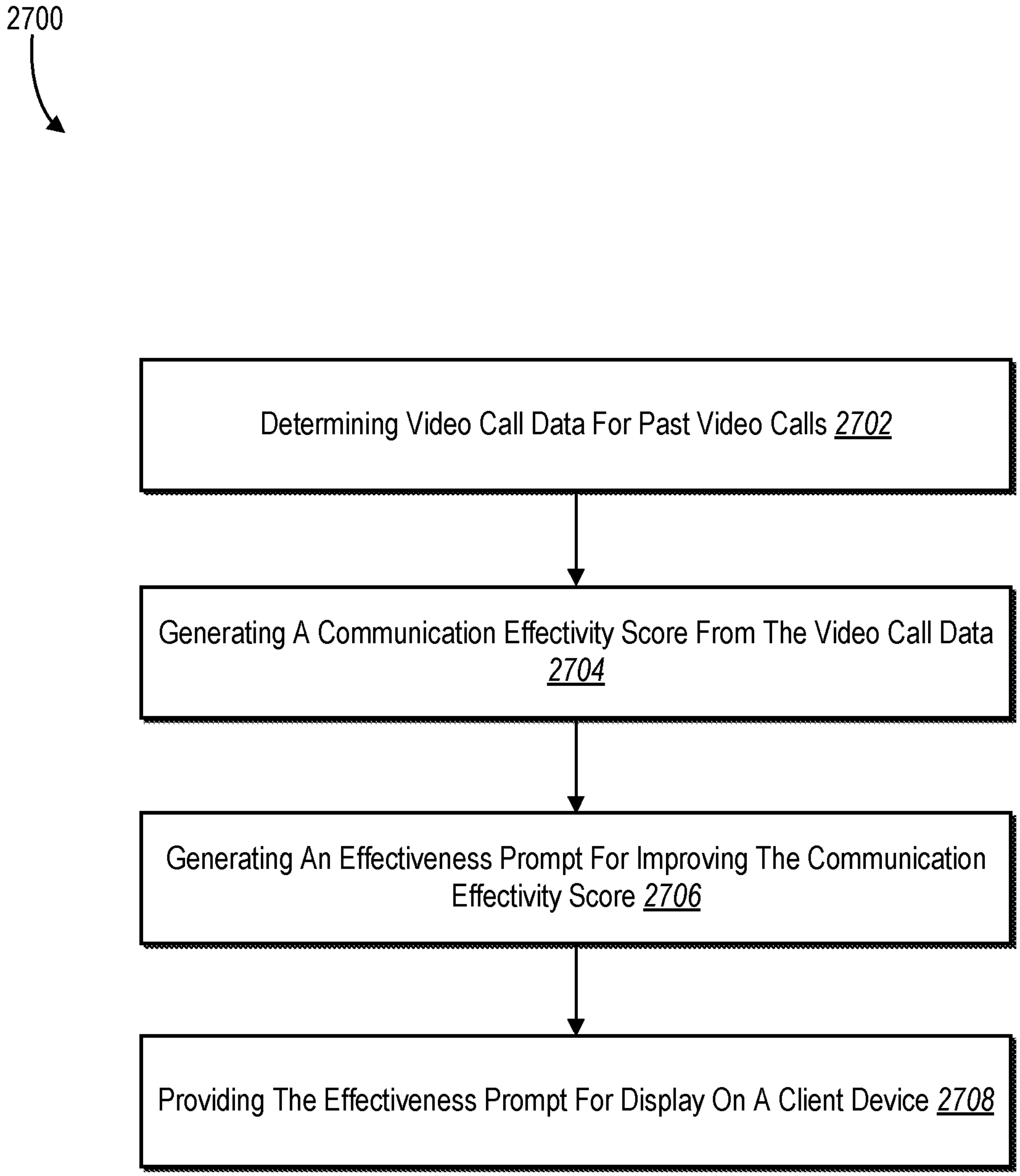
FIG. 27 illustrates an example series of acts for generating and providing post-meeting coaching insights in accordance with one or more embodiments.

While FIG. 27 illustrates acts according to certain implementations, alternative implementations may omit, add to, reorder, and/or modify any of the acts shown in FIG. 27. The acts of FIG. 27 can be performed as part of a method. Alternatively, a non-transitory computer readable medium can comprise instructions, that when executed by one or more processors, cause a computing device to perform the acts of FIG. 27. In still further implementations, a system can perform the acts of FIG. 27.

As illustrated in FIG. 27, the series of acts 2700 may include an act 2702 of determining video call data for past video calls. In particular, the act 2702 can involve determining video call data for one or more past video calls for a user account of a content management system. In addition, the series of acts 2700 can include an act 2704 of generating a communication effectivity score from the video call data. In particular, the act 2704 can involve generating, utilizing a communication effectivity model to process the video call data, a communication effectivity score indicating an effectiveness of communication for the user account. As shown, the series of acts 2700 can also include an act 2706 of generating an effectiveness prompt for improving the communication effectivity score. In particular, the act 2706 can involve generating, based on the communication effectivity score, an effectiveness prompt comprising a suggestion (or instructions) for improving the communication effectivity score. Further, the series of acts 2700 can include an act 2708 of providing the effectiveness prompt for display on a client device. In particular, the act 2708 can involve providing the effectiveness prompt for display on a client device associated with the user account of the content management system.

In some embodiments, the series of acts 2700 includes an act of determining the video call data for the one or more past video calls by determining one or more of vocabulary data for the user account, body language data for the user account, facial expression data for the user account, tone data for the user account, or speech speed data for the user account. In certain embodiments, the series of acts 2700 includes an act of generating the communication effectivity score by utilizing the communication effectivity model to predict a communication effectivity based on one or more of vocabulary data for the user account, body language data for the user account, facial expression data for the user account, tone data for the user account, or speech speed data for the user account.

The series of acts 2700 can include an act of generating the effectiveness prompt by generating instructions for changing one or more of vocabulary, body language, facial expression, tone, or speech speed. The communication effectivity model can include parameters trained to predict communication effectivity scores based on sample video call data from known effective communicators and corresponding ground truth communication effectivity scores. In addition, the series of acts 2700 can include an act of providing a graphical visualization of the communication effectivity score for display on the client device of the user account. In one or more embodiments, the series of acts 2700 includes an act of detecting a change in the communication effectivity score based on additional video call data for an ongoing video call and an act of providing a graphical visualization of the change in the communication effectivity score for display on the client device during the ongoing video call.

In some cases, the communication effectivity model includes parameters trained to predict communication effectivity scores based on sample video call data and corresponding ground truth communication effectivity scores. Additionally, the series of acts 2700 can include an act of providing a graphical visualization of the communication effectivity score for display on the client device of the user account. Further, the series of acts 2700 can include an act of updating the graphical visualization during an ongoing video call to reflect changes in the communication effectivity score over time throughout the ongoing video call.

In addition, the series of acts 2700 can include an act of determining the video call data for the one or more past video calls by determining vocabulary data, sentence structure data, and speech speed data for the user account. The series of acts 2700 can also include an act of generating the effectiveness prompt by determining changes to one or more of the vocabulary data, the sentence structure data, or the speech speed data to improve the communication effectivity score. In some embodiments, the series of acts 2700 can include an act of determining the video call data for the one or more past video calls by determining body language data and facial expression data for the user account. Additionally, the series of acts 2700 can include an act of generating the effectiveness prompt by determining changes to one or more of the body language data or the facial expression data to improve the communication effectivity score.

The series of acts 2700 can include acts of extracting additional video call data during an ongoing video call and modifying the communication effectivity score during the ongoing video call based on the additional video call data. In addition, the series of acts 2700 can include an act of providing, for display on the client device, a graphical visualization of modifying the communication effectivity score during the ongoing video call. Further, the series of acts 2700 can include an act of generating the communication effectivity score by utilizing the communication effectivity model to predict a communication effectivity based on one or more of vocabulary data for the user account, body language data for the user account, facial expression data for the user account, tone data for the user account, or speech speed data for the user account.

In some embodiments, the series of acts 2700 can include an act of generating the effectiveness prompt by generating instructions for changing one or more of vocabulary, body language, facial expression, tone, or speech speed. In addition, the series of acts 2700 can include an act of training the communication effectivity model to predict communication effectivity scores based on sample video call data and corresponding ground truth communication effectivity scores.

The components of the meeting insight system 102 can include software, hardware, or both. For example, the components of the meeting insight system 102 can include one or more instructions stored on a computer-readable storage medium and executable by processors of one or more computing devices. When executed by one or more processors, the computer-executable instructions of the meeting insight system 102 can cause a computing device to perform the methods described herein. Alternatively, the components of the meeting insight system 102 can comprise hardware, such as a special purpose processing device to perform a certain function or group of functions. Additionally or alternatively, the components of the meeting insight system 102 can include a combination of computer-executable instructions and hardware.

Furthermore, the components of the meeting insight system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the meeting insight system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 28:
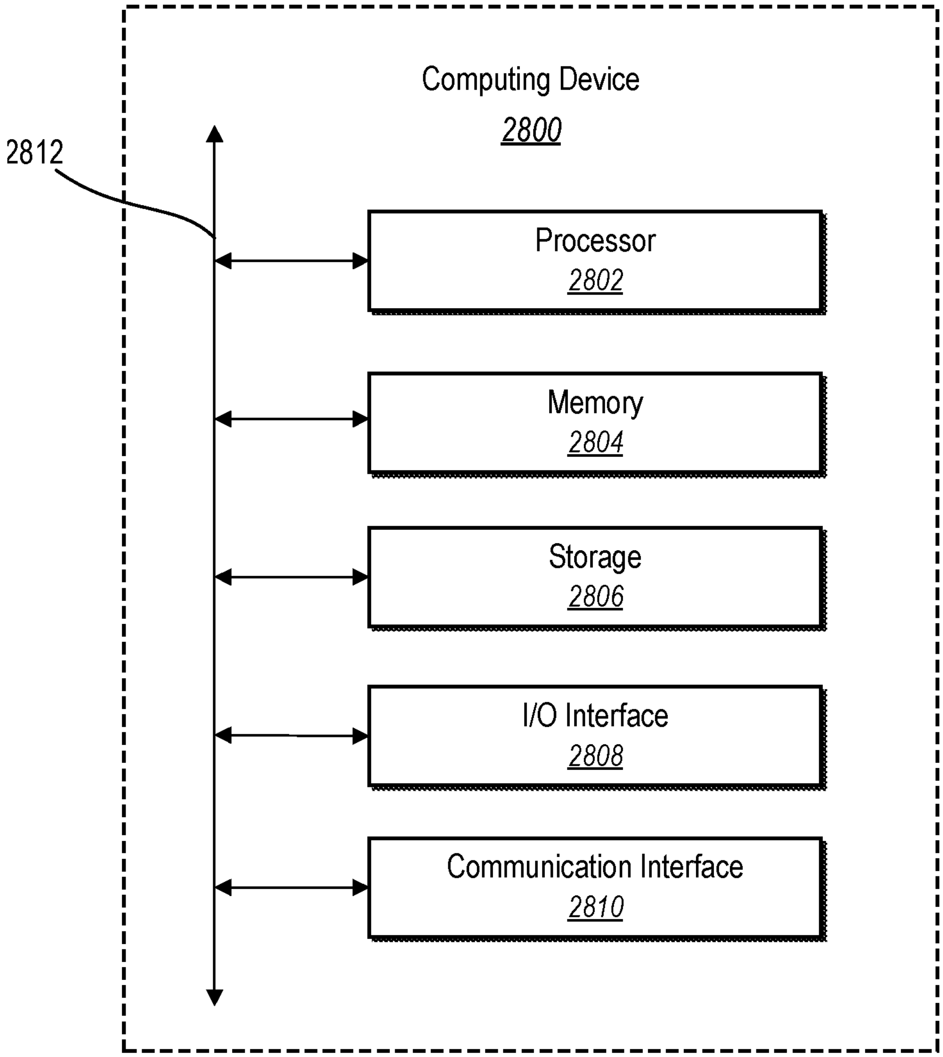
FIG. 28 illustrates a block diagram of an exemplary computing device in accordance with one or more embodiments.

FIG. 28 illustrates a block diagram of exemplary computing device 2800 (e.g., the server(s) 104 and/or the client device(s) 108*a*-108*n*) that may be configured to perform one or more of the processes described above. One will appreciate that server(s) 104 and/or the client device(s) 108*a*-108*n* may comprise one or more computing devices such as computing device 2800. As shown by FIG. 28, computing device 2800 can comprise processor 2802, memory 2804, storage device 2806, I/O interface 2808, and communication interface 2810, which may be communicatively coupled by way of communication infrastructure 2812. While an exemplary computing device 2800 is shown in FIG. 28, the components illustrated in FIG. 28 are not intended to be limiting. Additional or alternative components may be used in other implementations. Furthermore, in certain implementations, computing device 2800 can include fewer components than those shown in FIG. 28. Components of computing device 2800 shown in FIG. 28 will now be described in additional detail.

In particular implementations, processor 2802 includes hardware for executing instructions, such as those making up a computer program. As an example and not by way of limitation, to execute instructions, processor 2802 may retrieve (or fetch) the instructions from an internal register, an internal cache, memory 2804, or storage device 2806 and decode and execute them. In particular implementations, processor 2802 may include one or more internal caches for data, instructions, or addresses. As an example and not by way of limitation, processor 2802 may include one or more instruction caches, one or more data caches, and one or more translation lookaside buffers (TLBs). Instructions in the instruction caches may be copies of instructions in memory 2804 or storage device 2806.

Memory 2804 may be used for storing data, metadata, and programs for execution by the processor(s). Memory 2804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 2804 may be internal or distributed memory.

Storage device 2806 includes storage for storing data or instructions. As an example and not by way of limitation, storage device 2806 can comprise a non-transitory storage medium described above. Storage device 2806 may include a hard disk drive (HDD), a floppy disk drive, flash memory, an optical disc, a magneto-optical disc, magnetic tape, or a Universal Serial Bus (USB) drive or a combination of two or more of these. Storage device 2806 may include removable or non-removable (or fixed) media, where appropriate. Storage device 2806 may be internal or external to computing device 2800. In particular implementations, storage device 2806 is non-volatile, solid-state memory. In other implementations, Storage device 2806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 2808 allows a user to provide input to, receive output from, and otherwise transfer data to and receive data from computing device 2800. I/O interface 2808 may include a mouse, a keypad or a keyboard, a touch screen, a camera, an optical scanner, network interface, modem, other known I/O devices or a combination of such I/O interfaces. I/O interface 2808 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 2808 is configured to provide graphical data to a display for presentation to a user. The graphical data may be representative of one or more graphical user interfaces and/or any other graphical content as may serve a particular implementation.

Communication interface 2810 can include hardware, software, or both. In any event, communication interface 2810 can provide one or more interfaces for communication (such as, for example, packet-based communication) between computing device 2800 and one or more other computing devices or networks. As an example and not by way of limitation, communication interface 2810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 2810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 2810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 2810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 2812 may include hardware, software, or both that couples components of computing device 2800 to each other. As an example and not by way of limitation, communication infrastructure 2812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 29:
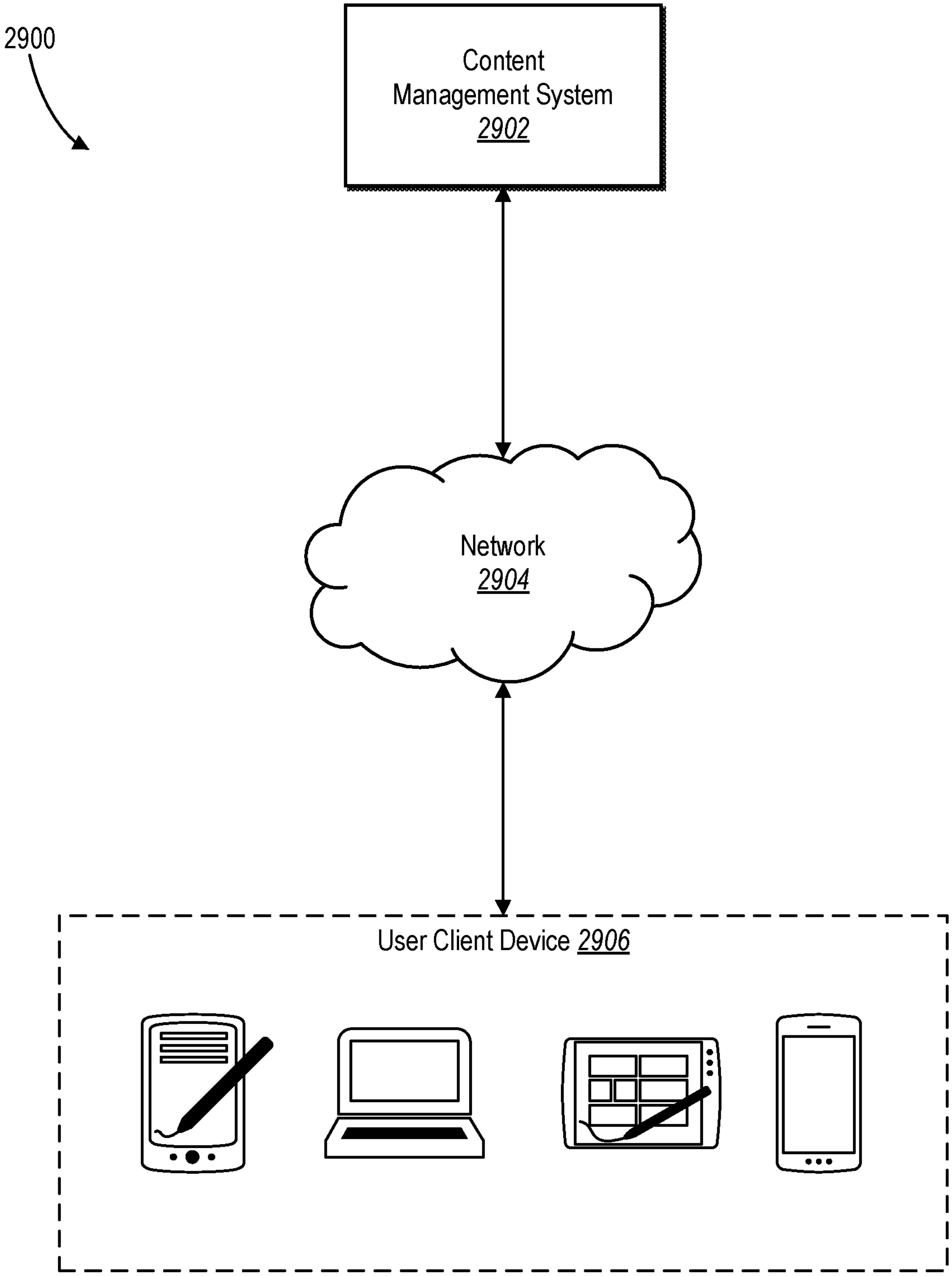
FIG. 29 illustrates an example environment of a networking system having the meeting insight system in accordance with one or more embodiments.

FIG. 29 is a schematic diagram illustrating environment 2900 within which one or more implementations of the meeting insight system 102 can be implemented. For example, the meeting insight system 102 may be part of a content management system 2902 (e.g., the content management system 106). Content management system 2902 may generate, store, manage, receive, and send digital content (such as digital content items). For example, content management system 2902 may send and receive digital content to and from client devices 2906 by way of network 2904. In particular, content management system 2902 can store and manage a collection of digital content. Content management system 2902 can manage the sharing of digital content between computing devices associated with a plurality of users. For instance, content management system 2902 can facilitate a user sharing a digital content with another user of content management system 2902.

In particular, content management system 2902 can manage synchronizing digital content across multiple client devices 2906 associated with one or more users. For example, a user may edit digital content using client device 2906. The content management system 2902 can cause client device 2906 to send the edited digital content to content management system 2902. Content management system 2902 then synchronizes the edited digital content on one or more additional computing devices.

In addition to synchronizing digital content across multiple devices, one or more implementations of content management system 2902 can provide an efficient storage option for users that have large collections of digital content. For example, content management system 2902 can store a collection of digital content on content management system 2902, while the client device 2906 only stores reduced-sized versions of the digital content. A user can navigate and browse the reduced-sized versions (e.g., a thumbnail of a digital image) of the digital content on client device 2906. In particular, one way in which a user can experience digital content is to browse the reduced-sized versions of the digital content on client device 2906.

Another way in which a user can experience digital content is to select a reduced-size version of digital content to request the full- or high-resolution version of digital content from content management system 2902. In particular, upon a user selecting a reduced-sized version of digital content, client device 2906 sends a request to content management system 2902 requesting the digital content associated with the reduced-sized version of the digital content. Content management system 2902 can respond to the request by sending the digital content to client device 2906. Client device 2906, upon receiving the digital content, can then present the digital content to the user. In this way, a user can have access to large collections of digital content while minimizing the amount of resources used on client device 2906.

Client device 2906 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 2906 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 2904.

Network 2904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 2906 may access content management system 2902.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:

extracting, utilizing a video call prediction model, natural language from an agenda for a video call of a user account within a content management system;

generating, utilizing the video call prediction model, a target goal embedding from the natural language from the agenda that encodes a target goal for the video call;

generating, utilizing the video call prediction model, from video call data captured from multiple video streams of participating client devices during the video call, a plurality of topic discussion embeddings that encode topics discussed during the video call;

identifying, utilizing the video call prediction model to compare the plurality of topic discussion embeddings and the target goal embedding in an embedding space of the video call prediction model, a binary dissonance indicator from the video call data based on determining that a subset of the plurality of topic discussion embeddings are not within a threshold distance of each other at a timestamp of the video call data;

generating, based on identifying the binary dissonance indicator, a dissonance score for the video call; and generating, utilizing the video call prediction model to compare the plurality of topic discussion embeddings and the target goal embedding in an embedding space of the video call prediction model and based on generating the dissonance score, a video call effectiveness score indicating a probability of accomplishing the target goal during the video call by determining a distance in the embedding space between a topic discussion embedding of the plurality of topic discussion embeddings and the target goal embedding.

2. The method of claim 1, wherein extracting the target goal embedding comprises utilizing the video call prediction model to generate a vector representation of the agenda from a plurality of meeting items included in the agenda.

3. The method of claim 1, wherein generating the plurality of topic discussion embeddings comprises:

utilizing the video call prediction model to extract a first vector representation of a first topic discussed at a first timestamp during the video call; and utilizing the video call prediction model to extract a second vector representation of a second topic discussed at a second timestamp during the video call.

4. The method of claim 1, wherein generating the video call effectiveness score comprises comparing the target goal embedding with the plurality of topic discussion embeddings to determine a probability of accomplishing the target goal during the video call.

5. The method of claim 1, further comprising:

determining, from the video call data captured from the multiple video streams, a plurality of user accounts attending the video call; and generating the video call effectiveness score based on the plurality of user accounts attending the video call.

6. The method of claim 1, further comprising generating the plurality of topic discussion embeddings by:

generating a video call timeline that corresponds to discussion topics for the video call;

identifying the topics discussed during the video call from different timestamps of the video call timeline.

7. The method of claim 1, further comprising generating, for display during the video call on a client device associated with the user account, a notification comprising a prompt for improving the video call effectiveness score.

8. A system comprising:

at least one processor; and a non-transitory computer readable medium comprising instructions that, when executed by the at least one processor, cause the system to:

extract, utilizing a video call prediction model, natural language from an agenda for a video call of a user account within a content management system;

generate, utilizing the video call prediction model, a target goal embedding from the natural language from the agenda that encodes a target goal for the video call;

generate, utilizing the video call prediction model, from video call data captured from multiple video streams of participating client devices during the video call, a plurality of topic discussion embeddings that encode topics discussed during the video call;

identify, utilizing the video call prediction model to compare the plurality of topic discussion embeddings and the target goal embedding in an embedding space of the video call prediction model, a binary dissonance indicator from the video call data based on determining that a subset of the plurality of topic discussion embeddings are not within a threshold distance of each other at a timestamp of the video call data;

generate, based on identifying the binary dissonance indicator, a dissonance score for the video call; and generate, utilizing the video call prediction model to compare the plurality of topic discussion embeddings and the target goal embedding in an embedding space of the video call prediction model and based on generating the dissonance score, a video call effectiveness score indicating a probability of accomplishing the target goal during the video call by determining a distance in the embedding space between a topic discussion embedding of the plurality of topic discussion embeddings and the target goal embedding.

9. The system of claim 8, further comprising instructions that, when executed by the at least one processor, cause the system to:

generate agenda item embeddings from items in the agenda utilizing the video call prediction model;

generate the plurality of topic discussion embeddings from the video call data in real time as topics are discussed during the video call; and compare the plurality of topic discussion embeddings with the agenda item embeddings to predict accomplishment of the items in the agenda.

10. The system of claim 8, further comprising instructions that, when executed by the at least one processor, cause the system to utilize the video call prediction model to:

classify, based on the agenda, the video call into a video call category from among a set of video call categories comprising a decision category, an information gathering category, and an information sharing category; and generate the video call effectiveness score based on determining, from the video call data captured from the multiple video streams of the video call, one or more category parameters met for the video call category.

11. The system of claim 8, further comprising instructions that, when executed by the at least one processor, cause the system to:

generate the video call effectiveness score at a first timestamp of the video call by comparing the target goal embedding with the plurality of topic discussion embeddings to determine a probability of accomplishing the target goal during the video call; and update the video call effectiveness score at a second timestamp of the video call based on comparing the target goal embedding with new topic discussion embeddings for new topic discussions after the first timestamp of the video call.

12. The system of claim 8, further comprising instructions that, when executed by the at least one processor, cause the system to generate the plurality of topic discussion embeddings by:

generating a video call timeline that corresponds to discussion topics for the video call;

identifying the topics discussed during the video call from different timestamps of the video call timeline.

13. The system of claim 8, further comprising instructions that, when executed by the at least one processor, cause the system to generate the video call effectiveness score by:

determining a trajectory for the video call based on a number of agenda items accomplished over an elapsed time within the video call; and determining a predicted percentage of the target goal that will be accomplished by termination of the video call based on the trajectory.

14. The system of claim 8, further comprising instructions that, when executed by the at least one processor, cause the system to generate, for display during the video call on a client device associated with the user account, a notification comprising instructions for improving the video call effectiveness score.

15. A non-transitory computer readable medium comprising instructions that, when executed by at least one processor, cause the at least one processor to:

extract, utilizing a video call prediction model, natural language from an agenda for a video call of a user account within a content management system;

generate, utilizing the video call prediction model, a target goal embedding from the natural language from the agenda that encodes a target goal for the video call;

generate, utilizing the video call prediction model, from video call data captured from multiple video streams of participating client devices during the video call, a plurality of topic discussion embeddings that encode topics discussed during the video call;

identify, utilizing the video call prediction model to compare the plurality of topic discussion embeddings and the target goal embedding in an embedding space of the video call prediction model, a binary dissonance indicator from the video call data based on determining that a subset of the plurality of topic discussion embeddings are not within a threshold distance of each other at a timestamp of the video call data;

generate, based on identifying the binary dissonance indicator, a dissonance score for the video call; and generate, by comparing the plurality of topic discussion embeddings and the target goal embedding utilizing the video call prediction model in an embedding space of the video call prediction model and based on generating the dissonance score, a video call effectiveness score indicating a probability of accomplishing the target goal during the video call by determining a distance in the embedding space between a topic discussion embedding of the plurality of topic discussion embeddings and the target goal embedding.

16. The non-transitory computer readable medium of claim 15, further comprising instructions that, when executed by the at least one processor, cause the at least one processor to generate the video call effectiveness score by:

determining a trajectory for the video call based on a number of agenda items accomplished up to a timestamp within the video call; and determining a predicted percentage of agenda items that will be accomplished by a scheduled end of the video call based on the trajectory.

17. The non-transitory computer readable medium of claim 15, further comprising instructions that, when executed by the at least one processor, cause the at least one processor to generate, for display during the video call on a client device associated with the user account, a notification comprising instructions for improving the video call effectiveness score.

18. The non-transitory computer readable medium of claim 15, further comprising instructions that, when executed by the at least one processor, cause the at least one processor to:

generate the video call effectiveness score at a first timestamp of the video call by comparing the target goal embedding with the plurality of topic discussion embeddings to determine a probability of accomplishing the target goal during the video call; and update the video call effectiveness score at a second timestamp of the video call based on comparing the target goal embedding with new topic discussion embeddings for new topic discussions after the first timestamp of the video call.

19. The non-transitory computer readable medium of claim 15, further comprising instructions that, when executed by the at least one processor, cause the at least one processor to:

determine, from the video call data captured from the multiple video streams, a plurality of user accounts attending the video call; and generate the video call effectiveness score based on the plurality of user accounts attending the video call.

20. The non-transitory computer readable medium of claim 15, further comprising instructions that, when executed by the at least one processor, cause the at least one processor to generate the plurality of topic discussion embeddings by:

generating a video call timeline that corresponds to discussion topics for the video call;

identifying the topics discussed during the video call from different timestamps of the video call timeline.

* * * * *